US011982584B2

(12) United States Patent
Gadini et al.

(10) Patent No.: US 11,982,584 B2
(45) Date of Patent: May 14, 2024

(54) DETECTION DEVICE FOR BEARINGS

(71) Applicant: ELTEK S.p.A., Casale Monferrato (IT)

(72) Inventors: Costanzo Gadini, Casale Monferrato (IT); Marco Pizzi, Casale Monferrato (IT); Massimo Zanin, Casale Monferrato (IT); Stefano Allera, Casale Monferrato (IT)

(73) Assignee: ELTEK S.p.A., Casale Monferrato (Alessandria) (IT)

( * ) Notice: Subject to any disclaimer, the term of this patent is extended or adjusted under 35 U.S.C. 154(b) by 487 days.

(21) Appl. No.: 17/295,909

(22) PCT Filed: Nov. 22, 2019

(86) PCT No.: PCT/IB2019/060071
§ 371 (c)(1),
(2) Date: May 21, 2021

(87) PCT Pub. No.: WO2020/105008
PCT Pub. Date: May 28, 2020

(65) Prior Publication Data
US 2022/0018392 A1 Jan. 20, 2022

(30) Foreign Application Priority Data
Nov. 22, 2018 (IT) .................. 102018000010522

(51) Int. Cl.
*G01L 3/10* (2006.01)
*F16C 19/52* (2006.01)
(Continued)

(52) U.S. Cl.
CPC ............ *G01L 3/101* (2013.01); *F16C 19/527* (2013.01); *F16C 43/00* (2013.01); *G01L 1/183* (2013.01);
(Continued)

(58) Field of Classification Search
CPC . G01L 3/101; G01L 1/183; G01L 1/18; G01L 3/108; G01L 5/0019; G01L 5/0009;
(Continued)

(56) References Cited

U.S. PATENT DOCUMENTS 5,221,146 A 6/1993 Maruyama
5,677,488 A 10/1997 Monahan et al.
(Continued)

FOREIGN PATENT DOCUMENTS

CN 103982543 A 8/2014
CN 105659478 A 6/2016
(Continued)

OTHER PUBLICATIONS

International Search Report and Written Opinion of the ISA for PCT/IB2019/060071, dated Jan. 14, 2020, 16 pages.

*Primary Examiner* — Benjamin R Schmitt
(74) *Attorney, Agent, or Firm* — Nixon & Vanderhye P.C.

(57) ABSTRACT

A bearing detection device comprises a housing body, to be fixed to a stationary ring of a bearing, and a detection arrangement on the housing body, comprising a piezoelectric transducer. The detection arrangement also comprises: a floating body, mounted on the housing body and suitable for mechanically transmitting vibrations of the bearing, and a sensor unit, which is mounted in a stationary position on the housing body and has a detection surface configured for receiving thereon a corresponding surface of the floating body. The piezoelectric transducer defines at least part of the detection surface and is configured for generating an electrical potential difference that is substantially proportional to the magnitude of a stress exerted by the floating body on the piezoelectric transducer.

20 Claims, 27 Drawing Sheets

(51) Int. Cl.
*F16C 43/00* (2006.01)
*G01L 1/18* (2006.01)
*G01L 5/00* (2006.01)
*G01M 13/045* (2019.01)

(52) U.S. Cl.
CPC ............ *G01L 3/108* (2013.01); *G01L 5/0019* (2013.01); *G01M 13/045* (2013.01); *F16C 2202/36* (2013.01); *F16C 2233/00* (2013.01)

(58) Field of Classification Search
CPC ...... G01M 13/04; G01M 13/045; G01D 5/14; F16C 19/527; F16C 43/00; F16C 2202/36; F16C 2233/00
See application file for complete search history.

(56) References Cited

U.S. PATENT DOCUMENTS

| | | |
|---|---|---|
| 6,176,622 B1 | 1/2001 | Nicot |
| 2004/0118209 A1 | 6/2004 | Mol et al. |
| 2009/0266169 A1 | 10/2009 | Marconnet et al. |
| 2012/0318071 A1 | 12/2012 | Biehl et al. |
| 2016/0011076 A1 | 1/2016 | Hamilton et al. |
| 2016/0161299 A1 | 6/2016 | Campbell et al. |
| 2016/0169278 A1 | 6/2016 | Campbell et al. |
| 2016/0248296 A1 | 8/2016 | Nakano et al. |
| 2018/0149200 A1 | 5/2018 | Higashiyama et al. |
| 2019/0032710 A1 | 1/2019 | Campbell et al. |

FOREIGN PATENT DOCUMENTS

| | | | |
|---|---|---|---|
| CN | 110168330 A | 8/2019 | |
| DE | 3908175 A1 | 9/1989 | |
| DE | 19522543 A1 | 2/1996 | |
| DE | 10136438 A1 * | 3/2002 | ............ F16C 19/522 |
| DE | 10 2004 024 851 | 12/2005 | |
| DE | 102011054967 A1 | 5/2013 | |
| EP | 2327895 A1 | 6/2011 | |
| GB | 2533175 A | 6/2016 | |
| GB | 2542565 | 3/2017 | |
| JP | H04-316712 A | 11/1992 | |
| JP | H11-2239 A | 1/1999 | |
| JP | 2001-074767 A | 3/2001 | |
| JP | 2002-146568 A | 5/2002 | |
| JP | 2002-357220 A | 12/2002 | |
| JP | 2004-169756 A | 6/2004 | |
| JP | 2006-258571 A | 9/2006 | |
| JP | 2007-333169 A | 12/2007 | |
| JP | 2009-248208 A | 10/2009 | |
| JP | 2011-191091 A | 9/2011 | |
| NL | 1017977 C2 | 11/2002 | |
| WO | 02/088653 | 11/2002 | |
| WO | WO-2005059492 A2 * | 6/2005 | ............ D06F 37/04 |

* cited by examiner

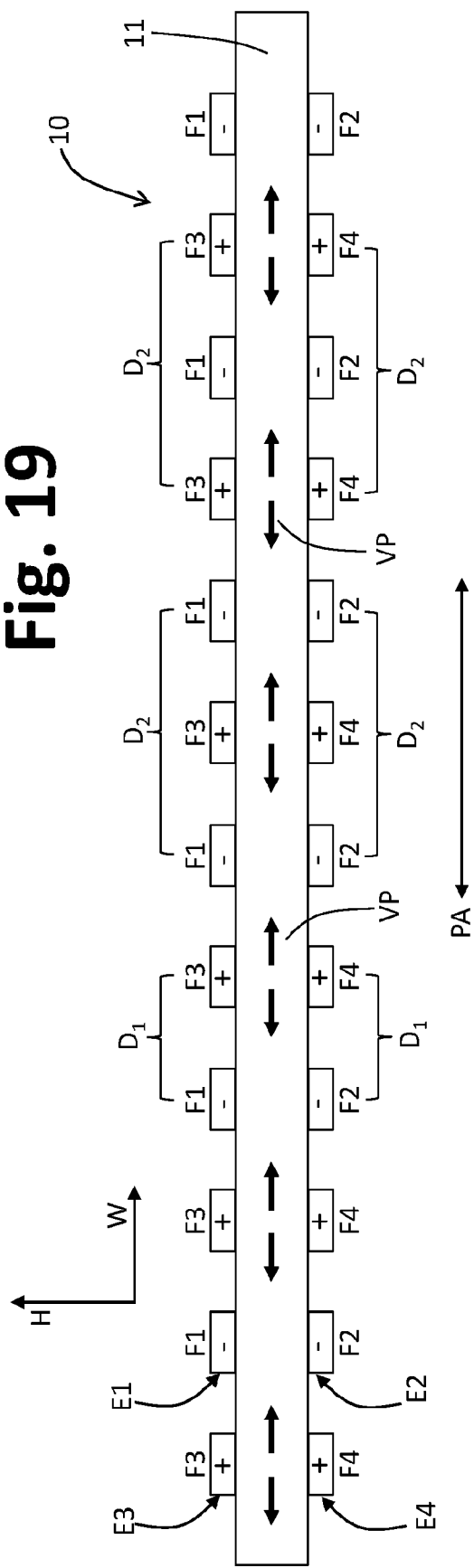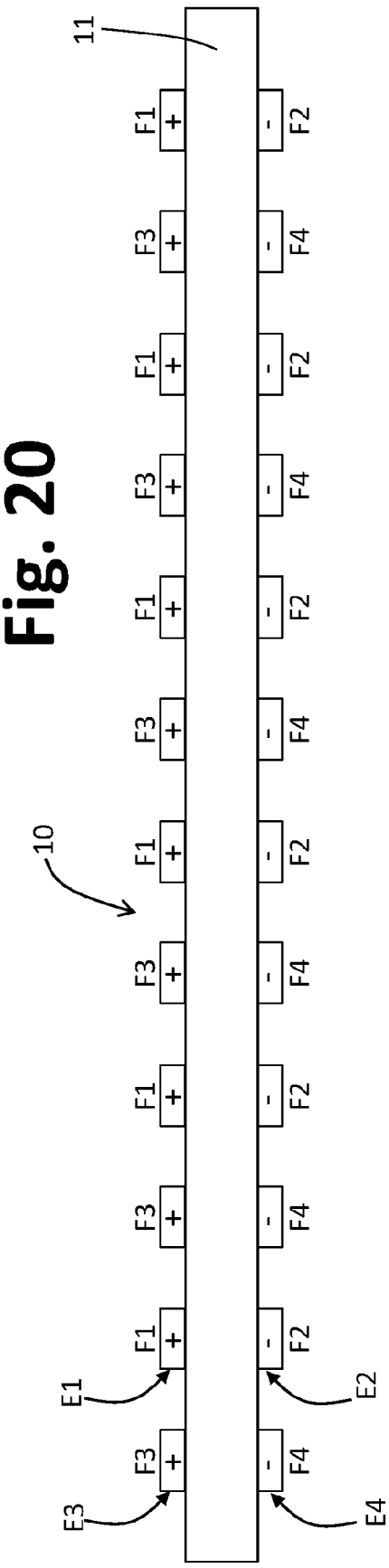

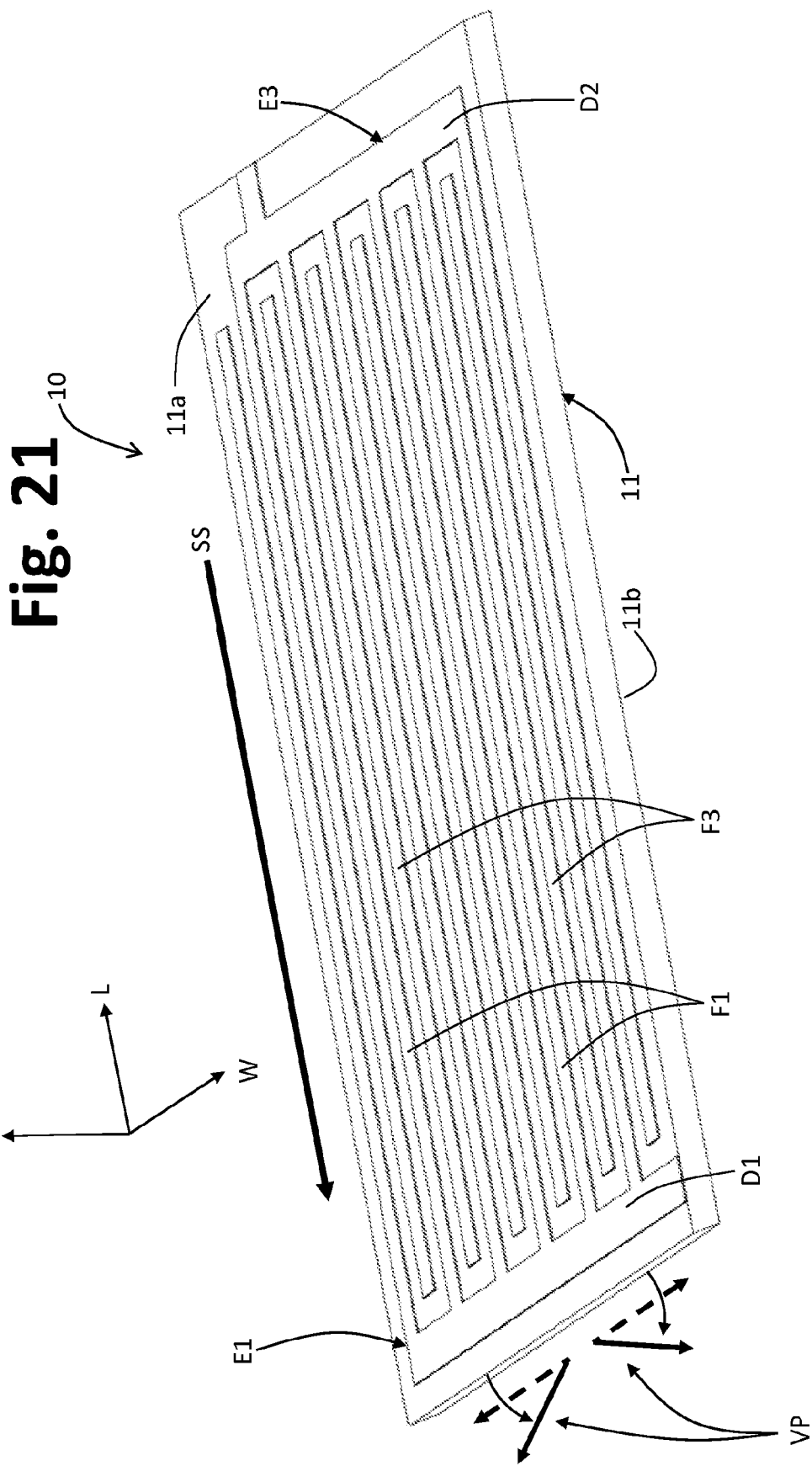

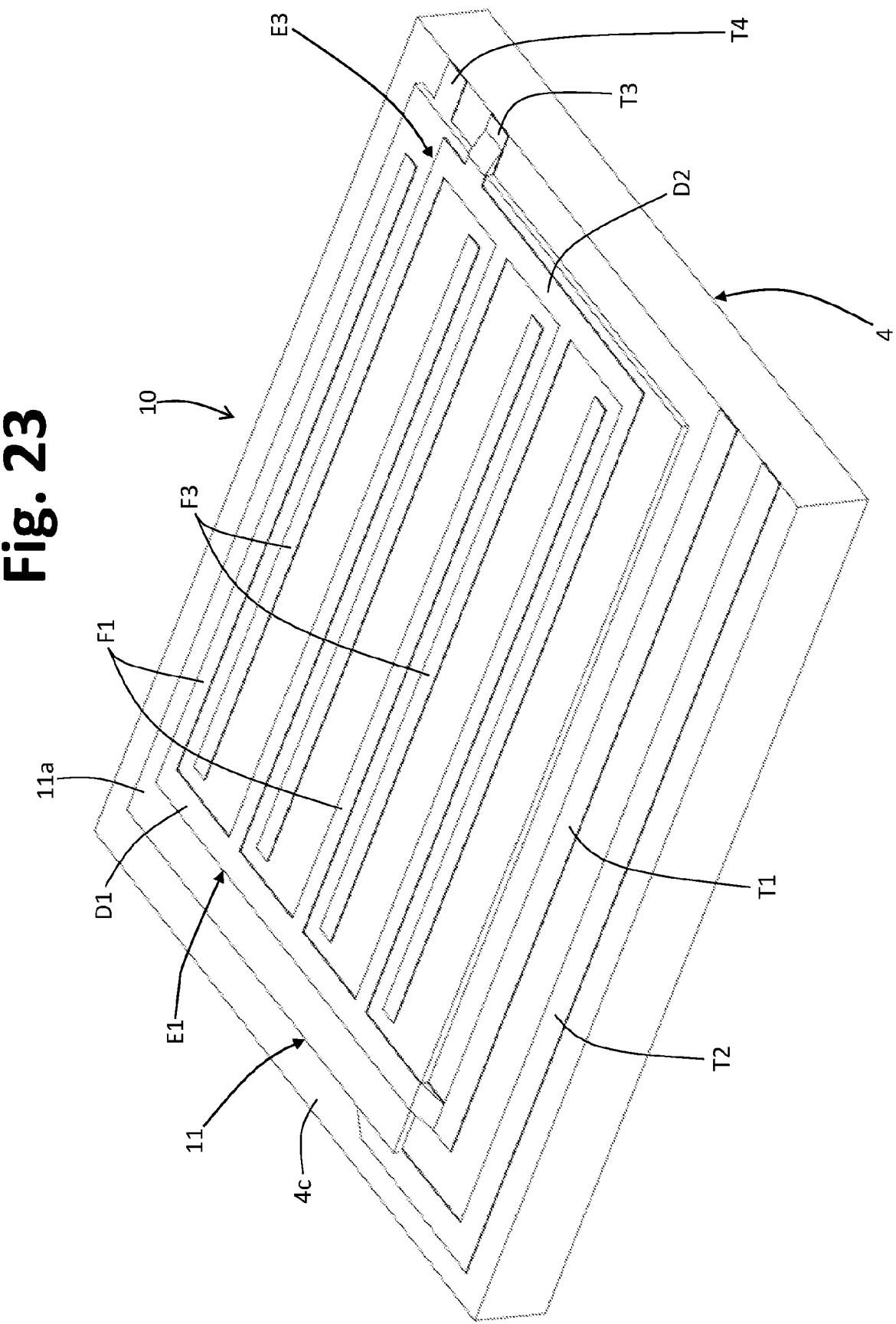

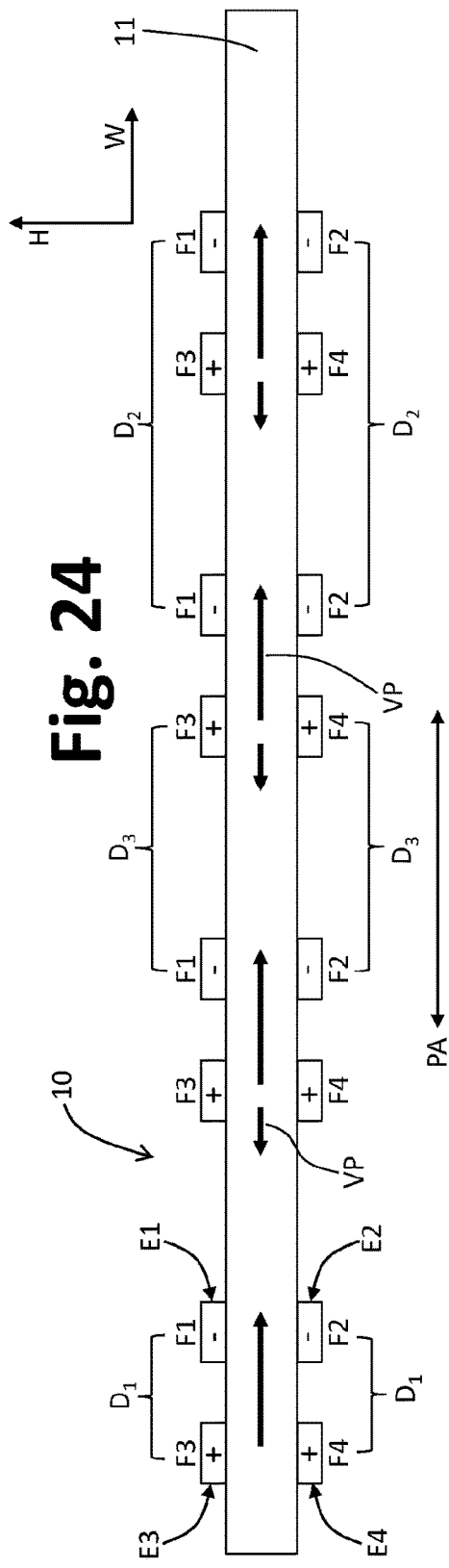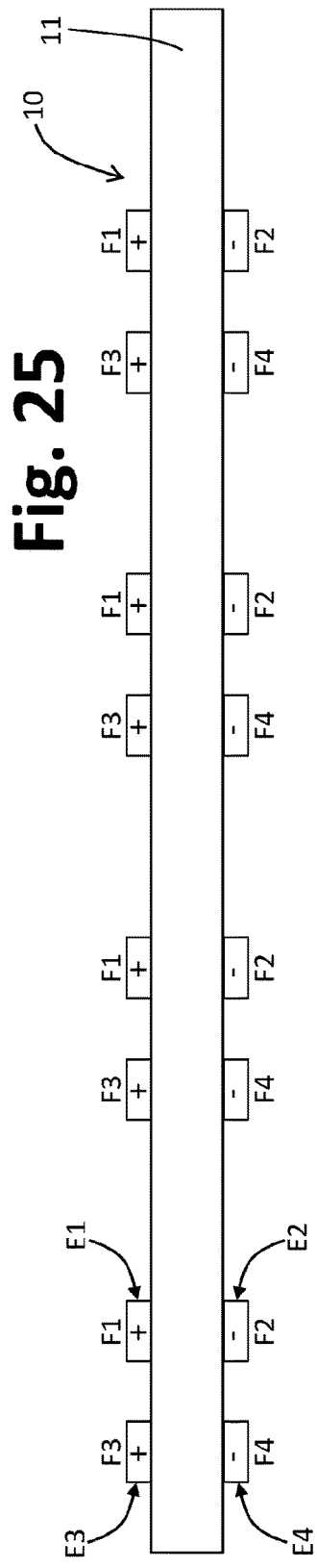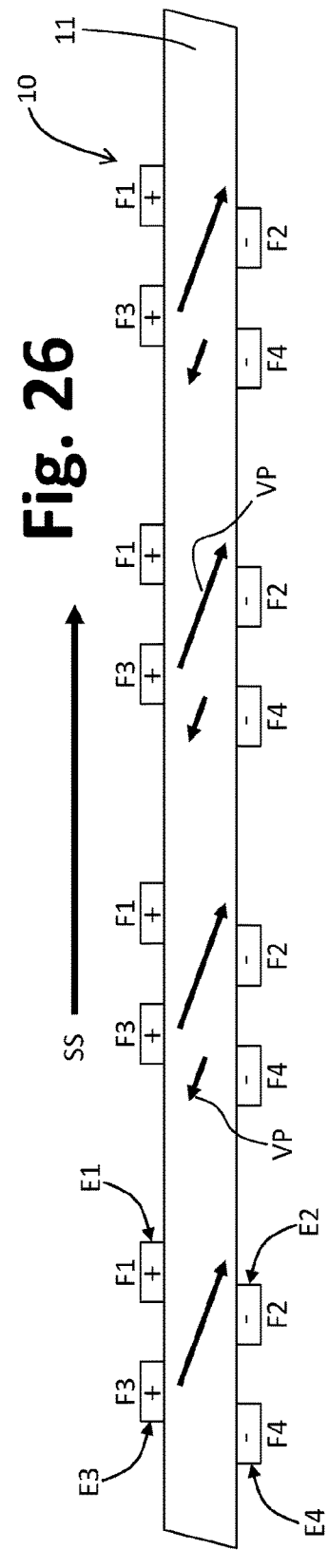

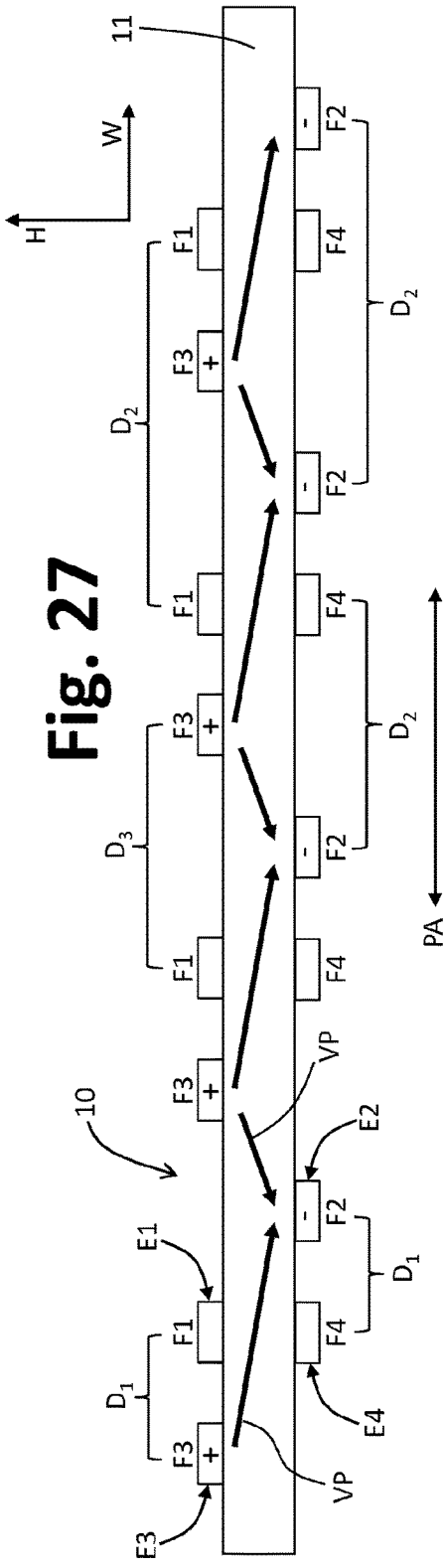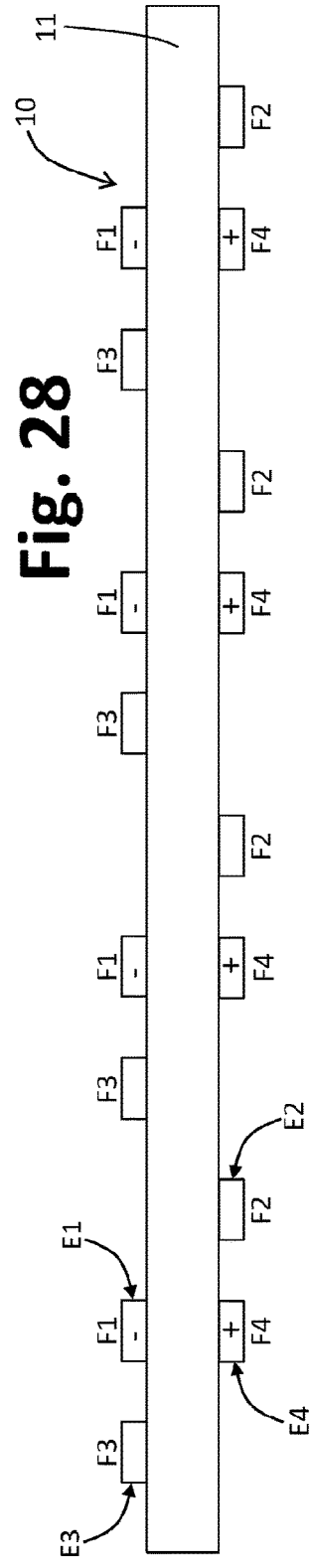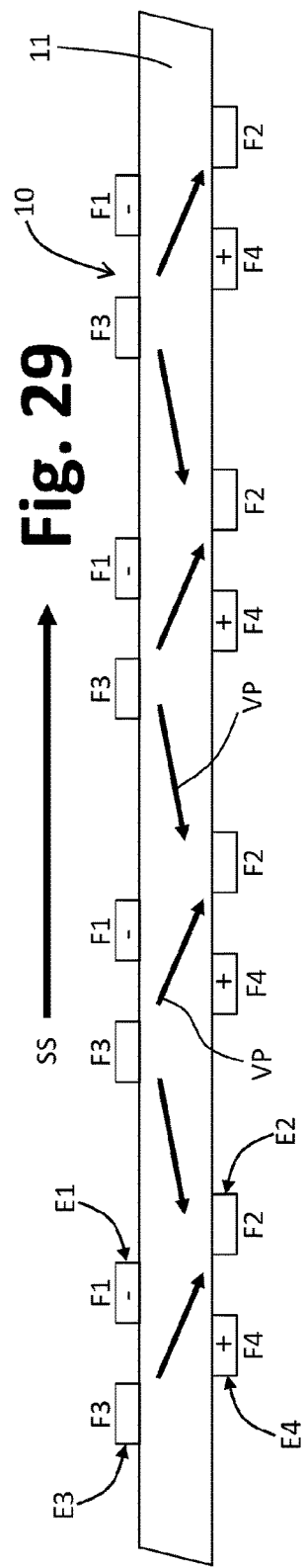

Fig. 32
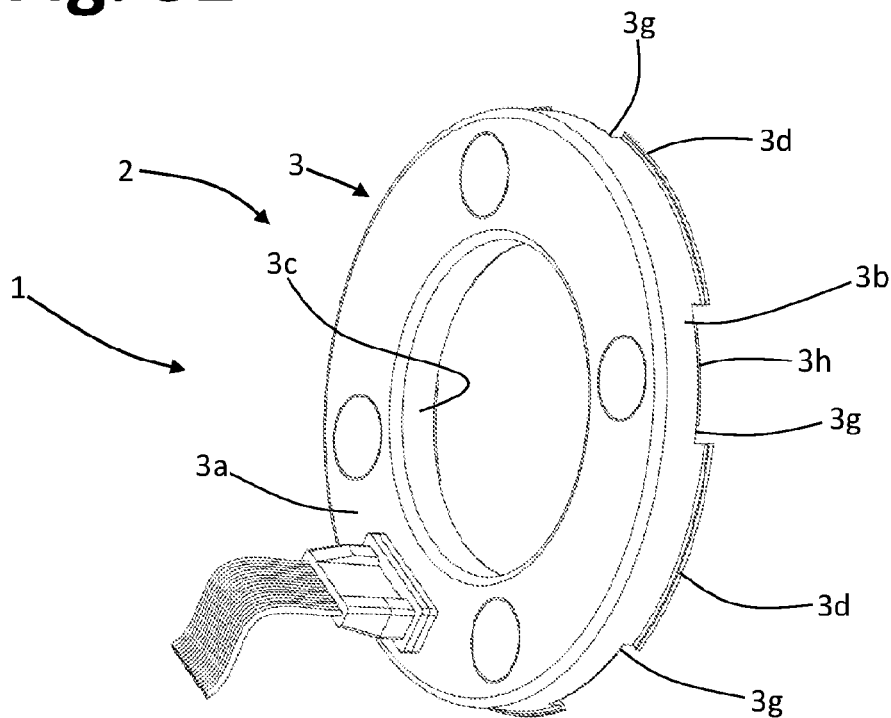
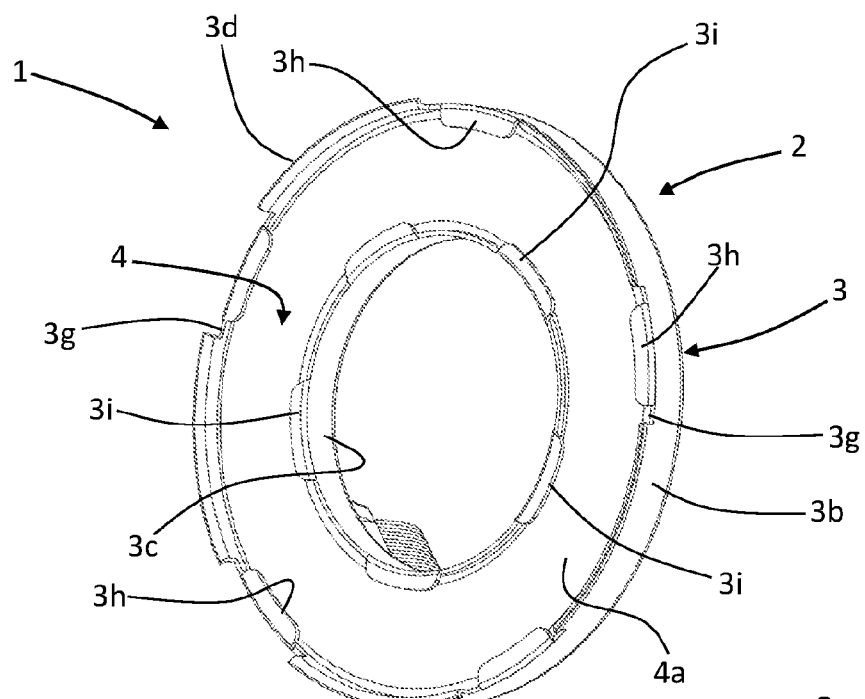
Fig. 33

Fig. 40     Fig. 41
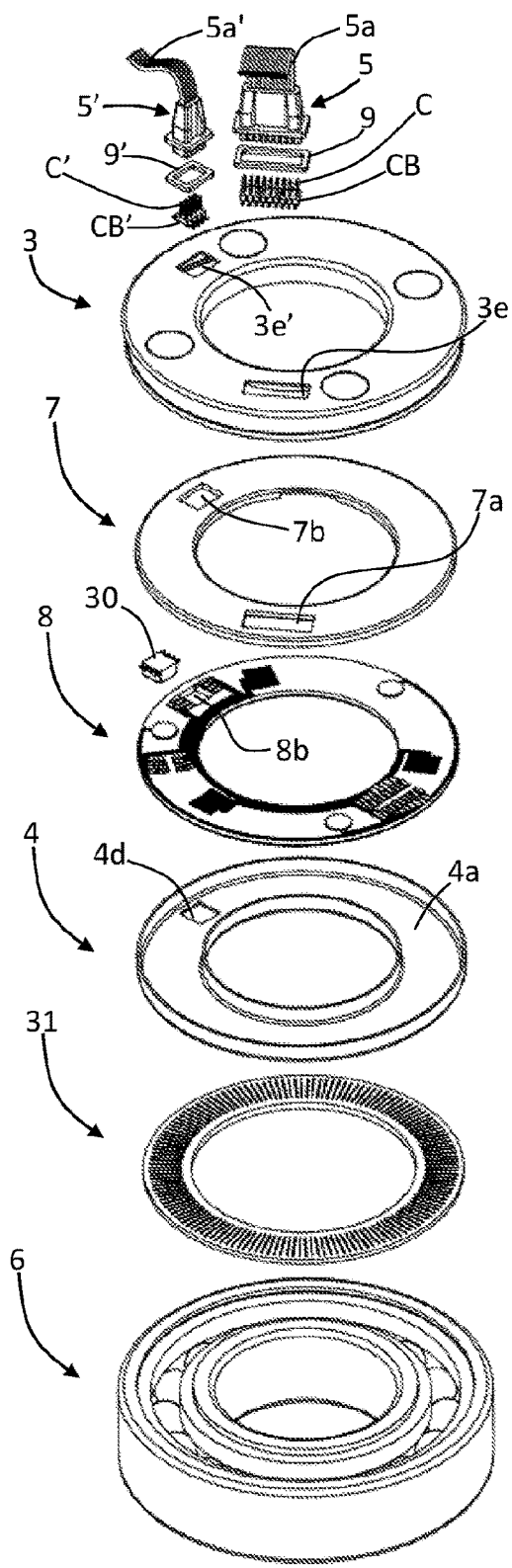
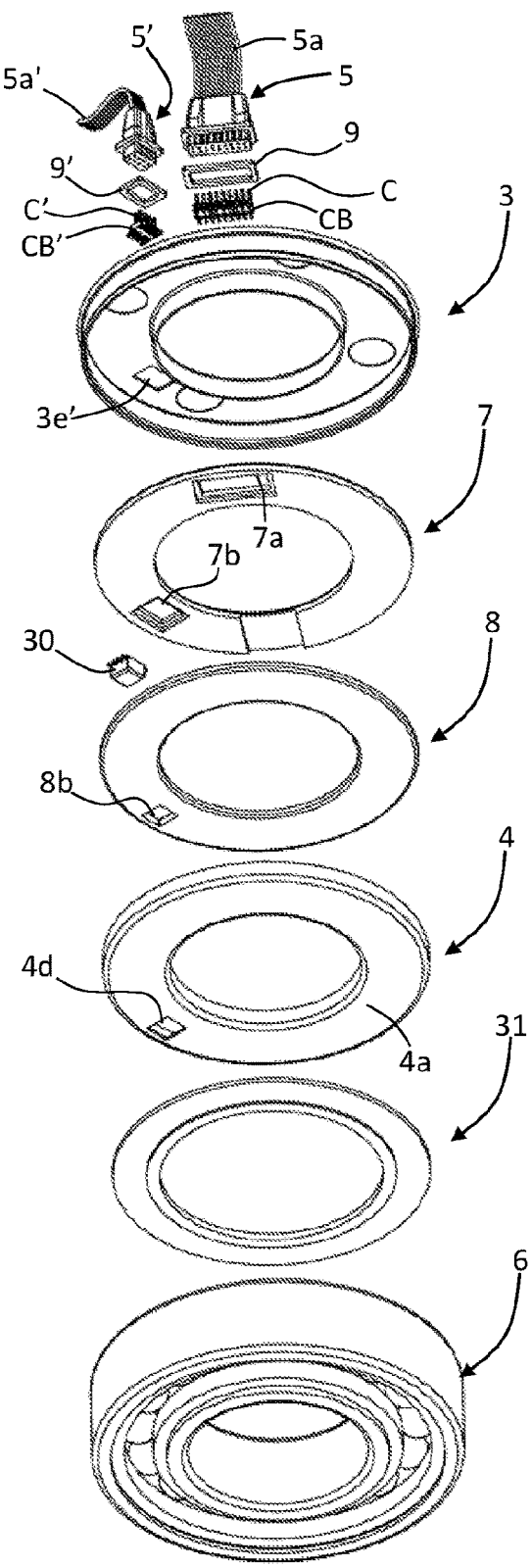

DETECTION DEVICE FOR BEARINGS

TEXT OF THE DESCRIPTION

This application is the U.S. national phase of International Application No. PCT/IB2019/060071 filed 22 Nov. 2019, which designated the U.S. and claims priority to IT Application No. 102018000010522 filed 22 Nov. 2018, the entire contents of each of which are hereby incorporated by reference.

FIELD OF THE INVENTION

The present invention relates to detection devices for bearings, comprising at least one sensor element configured for detecting vibrations, movements, or displacements of a bearing or of a part thereof. The invention has been developed with particular reference to detection devices that are to be mounted directly on the stationary part of a bearing, at one of its two opposite lateral faces.

PRIOR ART

As is known, bearings are devices that are designed to enable constrained relative movement between two parts and that can be used in machinery of various types for withholding and supporting rotating components.

In use, the bearing is subjected to different loads, both static and dynamic Static loads are typically proportional to the weight supported by the bearing, whereas dynamic loads typically depend upon the conditions of use of the bearing. In many systems it is thus desirable to be able to monitor the loads that act on a bearing: for example, in the automotive sector, information of loading of the bearings of wheel hubs may be advantageously used by systems for control of stability of a vehicle.

For this purpose, it is known to provide the bearings with devices for detecting parameters of rotation, which in general comprise a sensor unit secured to one side of the bearing, exploiting an annular groove provided in the stationary outer ring of the bearing. The sensor unit typically comprises at least one encoder element, such as a phonic wheel, fixed with respect to the rotary inner ring, which hence turns in front of one or more sensors carried by the sensor unit associated to the stationary ring. Devices of this type enable detection of rotation of the bearing and obtain parameters such as its velocity of rotation and its angular acceleration.

Vibrations represent a further parameter of some importance, which is able to provide indications on the conditions of a bearing, for example, if it is considered that excessive vibrations may be a sign of the fact that a bearing is wearing out or is approaching the end of its service life. In addition to the loads withstood by the bearing, it may hence prove useful to monitor also the corresponding vibrations. There have thus been proposed also detection devices that are able to detect this parameter, some of which are based upon the use of piezoelectric materials.

For instance, U.S. Pat. No. 5,677,488 A, on which the preamble of claim 1 is based, describes a device for detecting vibrations in bearings, which comprises at least one transducer constituted by a film made of a piezoelectric homopolymer or copolymer, this film being directly glued on a stationary ring of the bearing, or else being glued on an element which is in turn fixed to the aforesaid stationary ring. In one embodiment, the device includes a substantially annular housing body, having a substantially U-shaped cross section, fixed, either directly or indirectly, to the stationary part of the bearing, where at least one arched piezoelectric film is glued to the bottom wall or a circumferential wall of the aforesaid housing body. Production of the device is generally complicated and implies risks of tearing of the piezoelectric polymeric film, both during assembly of the device and when the element on which the film is glued is to be mechanically fixed to the corresponding part of the bearing.

Also known from WO 02/088653 A1 is a sensorized bearing, having an arrangement for detecting radial loads, which includes a piezoelectric plate of a commercial type, having millimetric dimensions, for example 5 mm×5 mm, with a thickness of 0.4 mm. Defined in one of the inner ring and the outer ring of the bearing is a cavity, set on the bottom wall of which—the one closer to the axis of rotation of the bearing—is the piezoelectric plate, with at least one spring set between the plate and the opposite wall of the cavity, the spring thus exerting its force of reaction in a radial direction of the bearing. In this way, the piezoelectric plate enables measurement of radial loads on the bearing. In a different embodiment, set between the piezoelectric plate and the spring is an intermediate body urged by the spring on the piezoelectric plate in order to enable also detection of vibrations of the bearing. Also this type of structure is generally complicated to produce, both in relation to the need to obtain the housing cavity in one of the rings of the bearing and in relation to assembly of the components of the detection system inside the cavity.

AIM AND SUMMARY OF THE INVENTION

In its general terms, the aim of the present invention is basically to provide a detection device, of the type designed to be secured to a stationary part of a bearing, that is simple to manufacture, compact and inexpensive, but distinguished by improved detection and/or a high precision of detection and reliability of operation.

The above and other aims, which will emerge more clearly hereinafter, are achieved according to the present invention by a bearing detection device having the characteristics specified in the annexed claims. The claims constitute an integral part of the technical teaching provided herein in relation to the invention.

BRIEF DESCRIPTION OF THE DRAWINGS

Further aims, characteristics, and advantages of the invention will emerge clearly from the ensuing detailed description, with reference to the annexed drawings, which are provided purely by way of explanatory and non-limiting example and in which:

FIGS. 19 and 20 are schematic representations in front elevation of a piezoelectric transducer of a sensor unit of a detection device according to first possible embodiments of the invention, in two different configurations of electrical connection;

FIG. 21 is a schematic perspective view aimed at exemplifying the operating principle of a piezoelectric transducer of a sensor unit of a detection device according to possible embodiments of the invention;

FIG. 23 is a view similar to that of FIG. 14, regarding a piezoelectric transducer of a sensor unit of a detection device according to further possible embodiments of the invention;

FIGS. 24 and 25 are schematic representations similar to those of FIGS. 19 and 20, regarding a transducer of the type shown in FIG. 23;

FIG. 26 is a view similar to that of FIG. 25, aimed at exemplifying the operating principle of a piezoelectric transducer of the type shown in FIG. 23;

FIGS. 27, 28, and 29 are schematic representations similar to those of FIGS. 24, 25, and 26, regarding a piezoelectric transducer of a sensor unit of a detection device according to further possible embodiments of the invention;

FIGS. 30-31 and 32-33 are schematic perspective views, from different angles, of detection devices according to further possible embodiments of the invention;

FIGS. 40 and 41 are exploded schematic views, from different angles, of a detection device of the type shown in FIG. 38;

DETAILED DESCRIPTION OF PREFERRED EMBODIMENTS OF THE INVENTION

Figure 1:
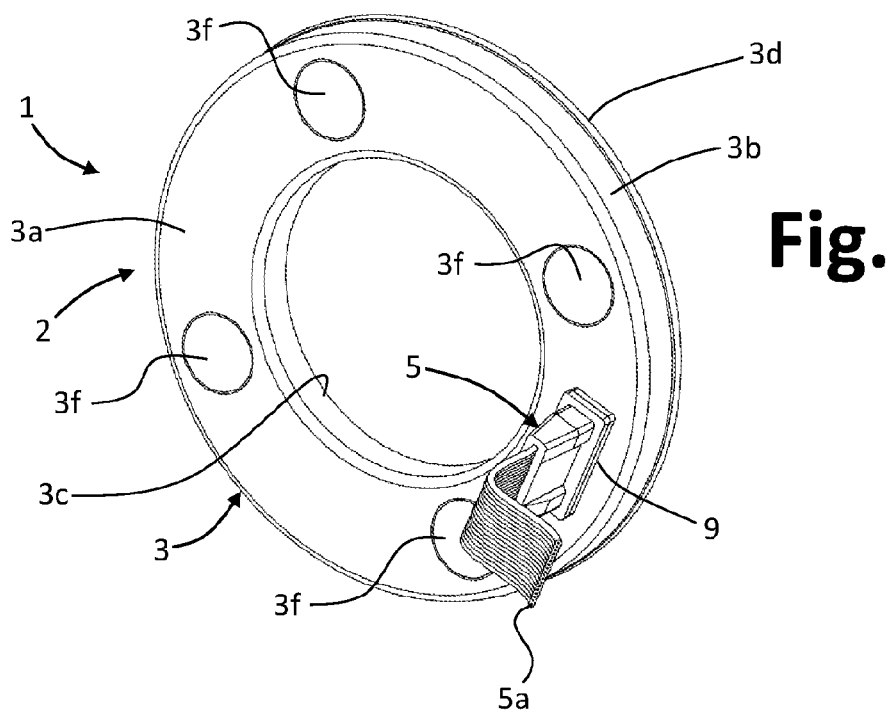
FIGS. 1 and 2 are schematic perspective views, from different angles, of a detection device according to possible embodiments of the invention.

Reference to "an embodiment", "one embodiment", "various embodiments", and the like, in the framework of this description is meant to indicate that at least one particular configuration, structure, or characteristic described in relation to an embodiment is comprised in at least one embodiment. Hence, phrases such as "in an embodiment", "in one embodiment", "in various embodiments", and the like that may be present in various points of this description do not necessarily refer to one and the same embodiment, but may instead refer to different embodiments. Moreover, particular conformations, structures, or characteristics defined in the framework of this description may be combined in any adequate way in one or more embodiments, even different from the ones shown. The reference numbers and spatial references (such as "upper", "lower", "top", "bottom", "front", "back", "vertical", etc.) used herein, in particular with reference to the examples in the figures, are only provided for convenience and hence do not define the sphere of protection or the scope of the embodiments. In the present description and in the attached claims, the generic term "material" is to be understood as comprising also mixtures, compositions, or combinations of a number of different materials. In the present description and in the attached claims, the generic terms "force" and "stress" are to be understood as comprising also vector physical quantities, preferably of a dynamic type, determined by mechanical loads and/or vibrations and/or albeit minimal movements or displacements of at least one part undergoing detection. In the present description and in the attached claims, the directions referred to as "axial direction" and "radial direction" are to be understood as directions parallel to the axis of rotation and to the radius, respectively, of a bearing to which a device according to the invention is to be associated. In the drawings, the same reference numbers are used to designate elements that are similar or technically equivalent to one another.

Figure 2:
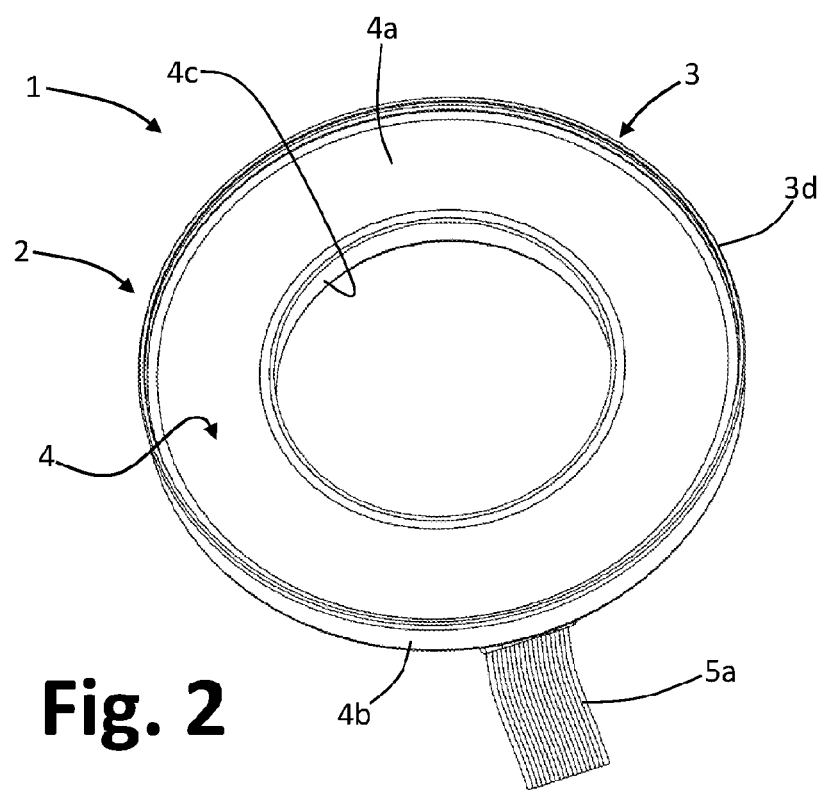
Figure 3:
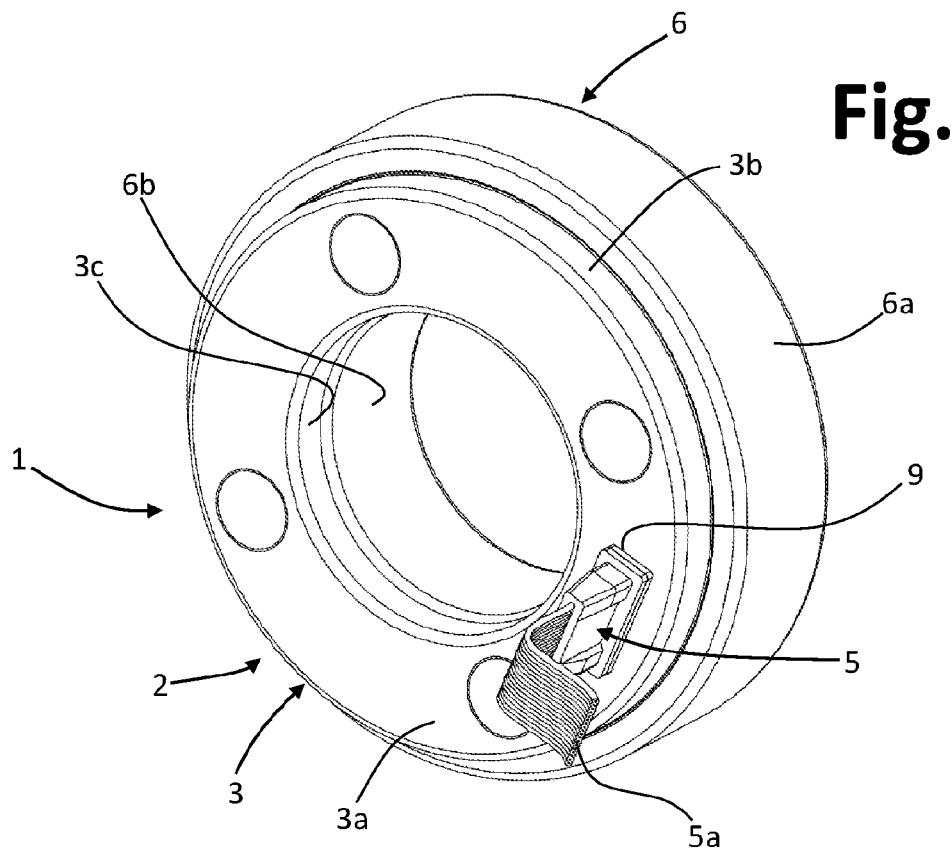
FIGS. 3 and 4 are schematic perspective views, from different angles, of a detection device according to possible embodiments of the invention, mechanically secured to a bearing, in FIG. 4 the device being partially sectioned.
Figure 4:
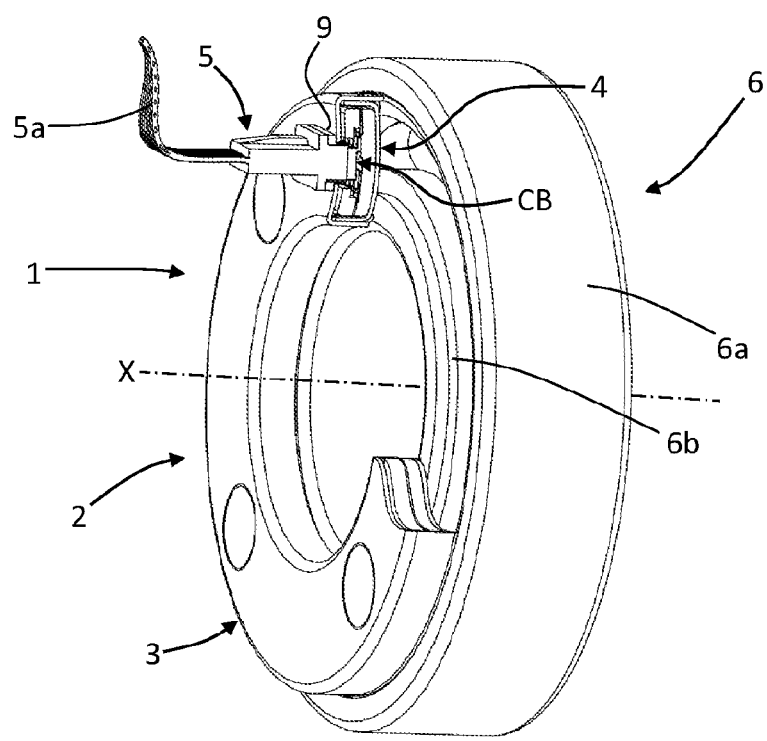
Figure 5:
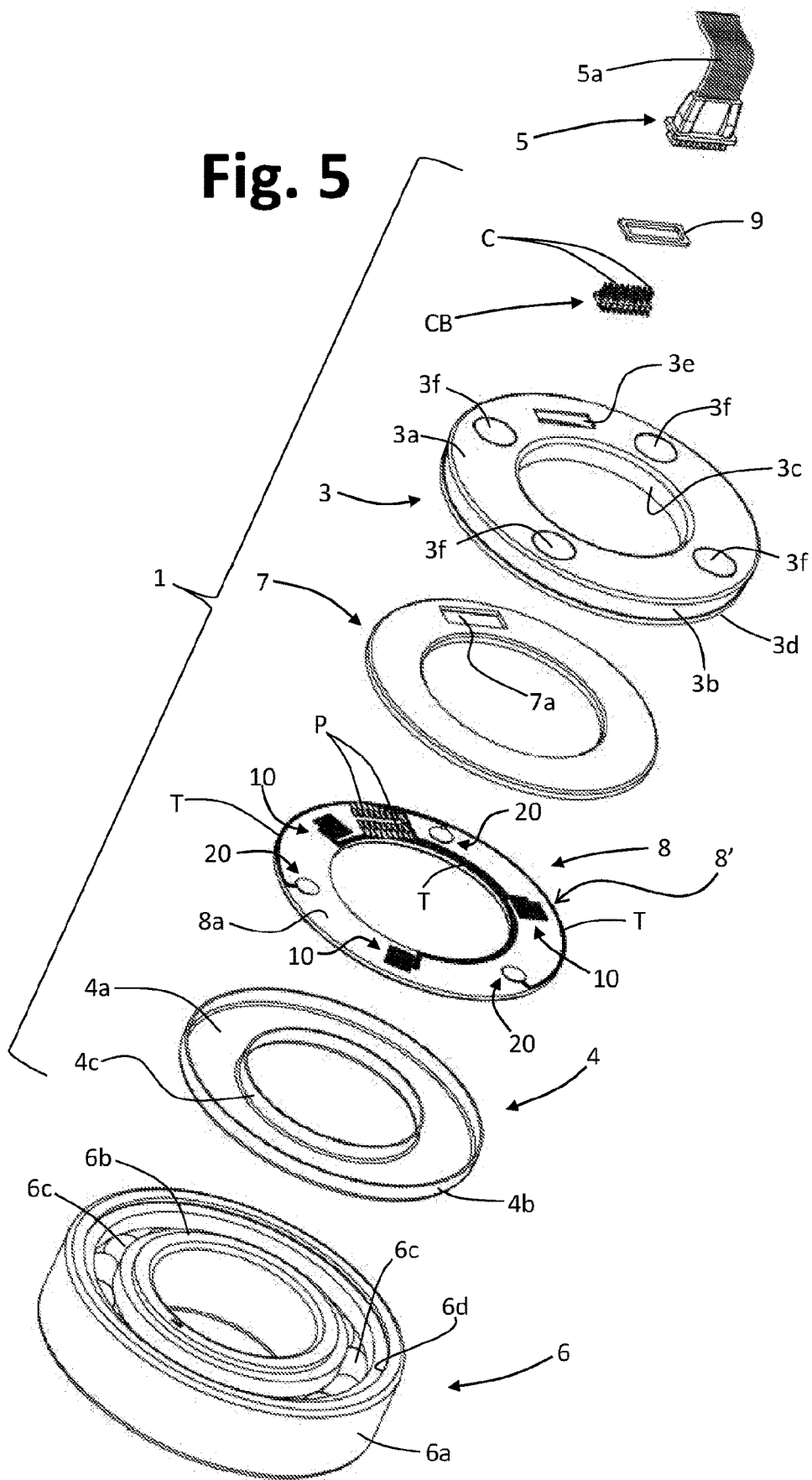
FIG. 5 is an exploded perspective view of the detection device of FIGS. 3 and 4.

In FIGS. 1-5, designated as a whole by 1 is a detection device for bearings according to possible embodiments of the invention: in FIGS. 1-2, the device 1 is shown in isolation, in FIGS. 3-4 the device 1 is shown in a mounted condition, i.e., laterally secured to a generic bearing, and in FIG. 5 the device 1 is represented in exploded view.

The device 1 includes a housing body 2, preferably made of metal material, albeit not excluded is the possibility of it being made of polymeric material or combinations of metal and polymeric materials. In various preferred embodiments, the housing body 2 has a substantially annular shape and is made up of at least two parts coupled together (however, other shapes are possible, such as the shape of an arc of circumference). In the case exemplified, the body 2 comprises two substantially annular body parts 3 and 4, referred to hereinafter for simplicity as "lid" and "base", respectively, which are coupled together to define an annular or toroidal housing or chamber.

Figure 6:
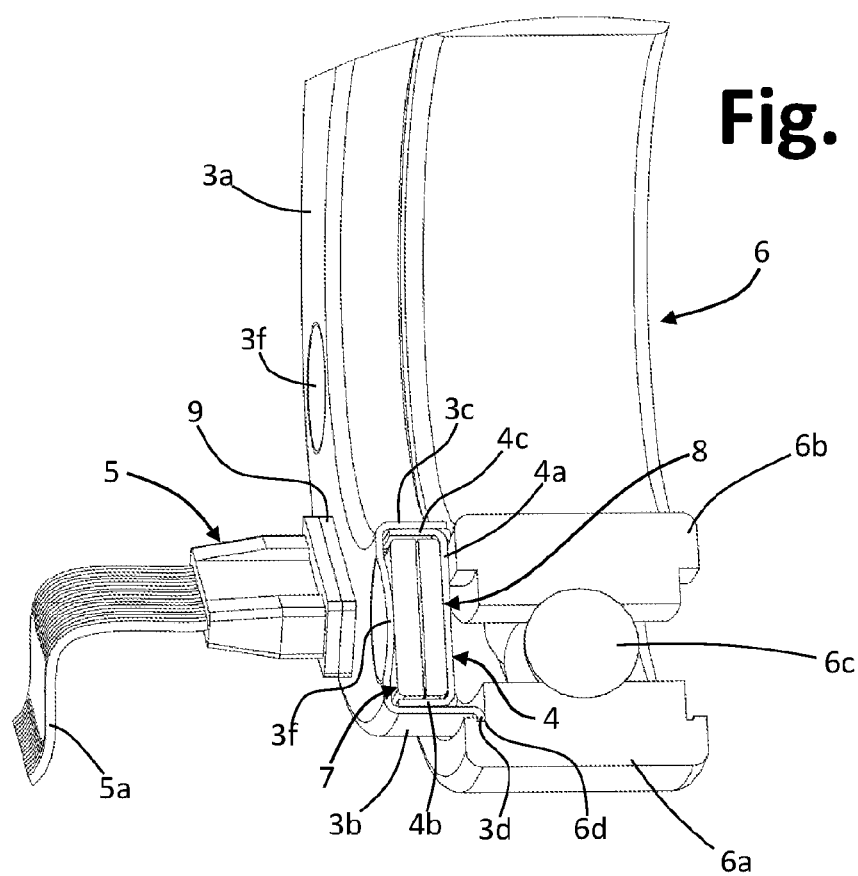
FIGS. 6 and 7 are partial and schematic sectioned perspective views of detection devices according to possible embodiments of the invention, secured to corresponding bearings.

In various embodiments, the base 4 and the lid 3 have a substantially U-shaped cross section, i.e., comprising two circumferential walls and a bottom wall: in the figures, designated by 3a, 3b, and 3c are the bottom wall, the outer circumferential wall, and the inner circumferential wall of the lid 3, whereas designated by 4a, 4b, and 4c are the homologous bottom, outer, and inner walls of the base 4. The aforesaid inner and outer walls may have different diameters, in such a way that the base 4 can be partially received in the lid 3, as in the case illustrated, or vice versa. With reference also to FIG. 6, in various embodiments, when the housing body 2 is in the assembled condition, the outer surfaces of the circumferential walls of the base 4 are adjacent to the inner surfaces of the circumferential walls of the lid 3.

In various embodiments, the base 4 and the lid 3 are fixed together, for example via welding, or coupling, or upsetting, or gluing of a part on the other so as to enclose at least partially within the body 2 a detection arrangement, described hereinafter. In the figures, designated by 5 is the connector of a wiring 5a, for electrical connection of the electrical and/or electronic componentry of the aforesaid detection arrangement to an external control system, not represented, for example an on-board control unit of a vehicle.

The housing body 2 is prearranged for being mechanically secured with respect to the stationary ring of a rotary bearing, designated as a whole by 6, of the type that comprises an outer ring 6a, an inner ring 6b, and a plurality of rolling elements 6c set between the two rings, with a possible cage or retainer. The structure of the bearings that may be used in combination with the detection devices 1 may in any case be of any known type and is irrespective of the purposes of the invention. In what follows, it is to be assumed that the stationary ring of the bearing is the outer ring 6a, albeit not excluded from the scope of the invention is fixing of the device to the inner ring 6b, if this is stationary, via appropriate modifications of the coupling system (for example, envisaging elements for fixing the device 1 with respect to the inner ring 6b that are substantially similar to those described with reference to fixing of the device 1 with respect to the outer ring 6a).

In various embodiments, the housing body 2 has at least one coupling edge configured for coupling with the corresponding stationary ring 6a of the bearing 6. In the example, the aforesaid edge, designated by 3d, is substantially annular and is defined by the outer wall 3b of the lid 3. In the example of FIGS. 1-5, the aforesaid coupling edge 3d is substantially defined by an end portion of the outer wall 3b, bent outwards so as to be able to engage an annular seat or groove defined in the stationary ring 6a of the bearing 6, as may be seen in FIG. 6. In the example, the above annular groove, designated by 6d in FIG. 5, is provided at the inner side of the ring 6a, i.e., its circumferential side facing the outer circumferential side of the ring 6b: grooves of this type are provided in various bearings available on the market, for example for fixing of a shielding ring for protection against penetration of dirt. In this perspective, in various embodiments, the housing body 2 of the device 1 is preferably shaped so as to provide a protection or shielding against any possible infiltration of dirt in the area where the rolling elements 6c of the bearing 6 are located.

Figure 7:
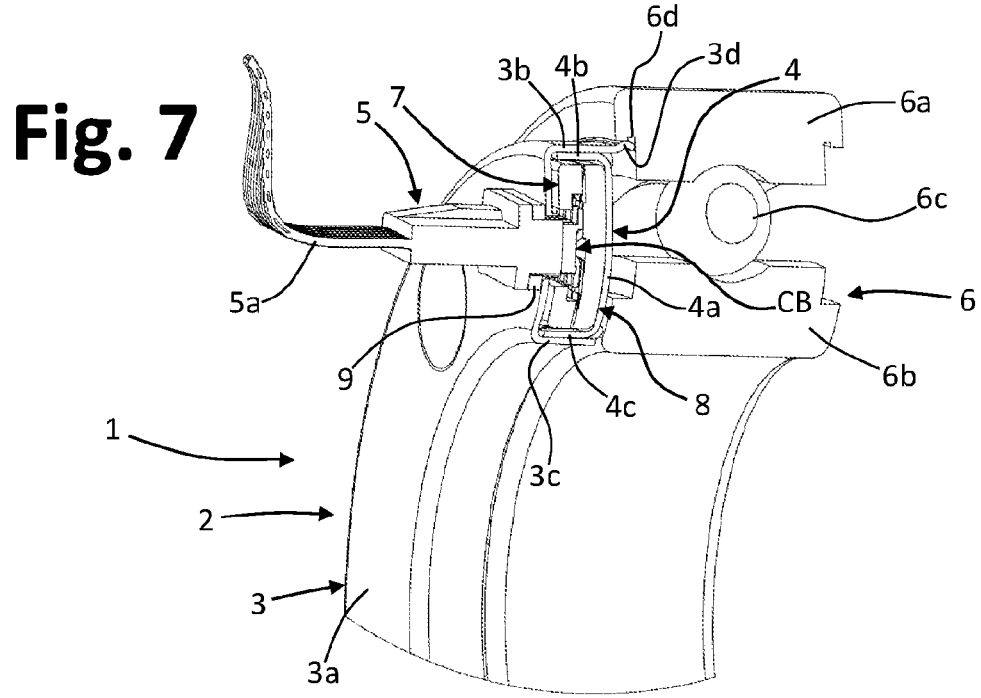

In other embodiments, the end portion of the wall 3b may be differently shaped, for example so as to define an annular relief that can be engaged with respect to an edge of the aforesaid annular groove 6d, as exemplified in FIG. 7, while at the same time maintaining a substantially elastic or snap-action coupling of the body 2 to the ring 6a. Such a relief may have a shaped profile, for example substantially curved or inclined in opposite directions to form a V or a U, defined by a rounded or bent portion of the wall 3b in order to enable quick or snap-action insertion/extraction. With such a structure, following upon an axial thrust exerted on the device 1 towards the bearing 6 during assembly, the aforesaid portion can bend—thanks to an albeit minimal elasticity of the wall 3b— and slide on the surface of the corresponding ring of the bearing (here the ring 6a), and then open out elastically, engaging in the corresponding groove 6d. An opposite behaviour occurs in the case where a pulling action is applied to the device 1 to separate it from the bearing 6, for example using an extractor device of the type described hereinafter.

Figure 35:
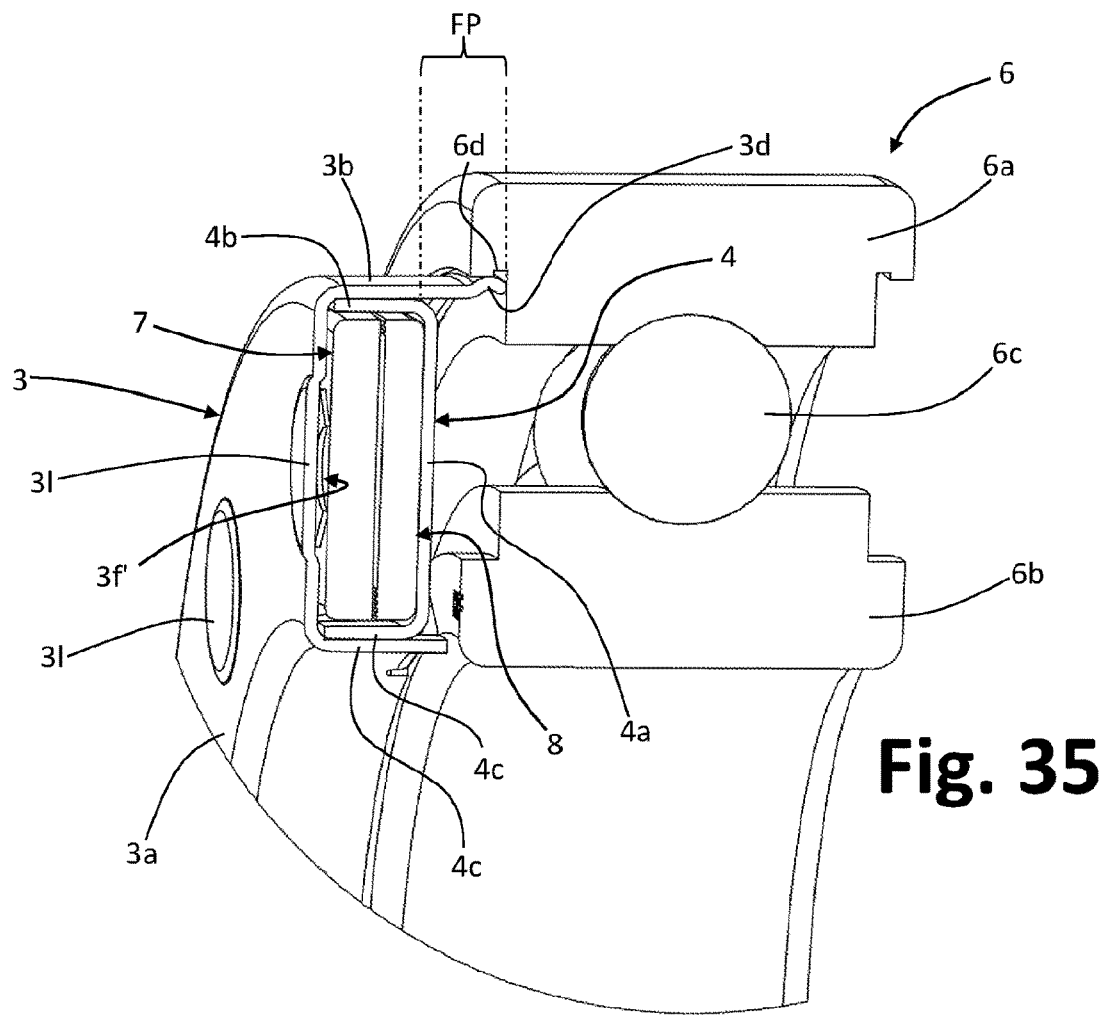

Irrespective of the specific shape, in various preferential embodiments, the wall of the housing body that defines the coupling edge comprises an elastically flexible portion, which extends in an axial direction beyond a bottom wall of the housing body facing the bearing (see, for reference, the portion of wall designated by FP in FIG. 35, which extends beyond the bottom wall 4a of the body 2). Once again in general terms, the coupling edge is preferentially shaped (for example, rounded or inclined) so as to be able to slide on at least one edge or surface of the corresponding ring of the bearing (such as the ring 6a), with the respective wall portion (such as the aforementioned portion FP) that can bend at least at, or in the proximity of, the aforesaid bottom wall (such as the wall 4a).

In various embodiments, the housing body 2 is designed to be positioned, in its mounted condition, in a position corresponding to a face or an axial end of the bearing 6, as may be clearly noted, for example, from FIGS. 3 and 4, or so as to be set alongside the bearing 6. In various embodiments of this type, the dimension of lateral encumbrance or diameter of the body 2 is preferably smaller than the diameter of the outer ring of the bearing; instead, the perimetral dimension or diameter of the central passage of the body 2 is preferably greater than the corresponding passage of the inner ring 6b of the bearing 6.

Mounted on the housing body 2 is the aforesaid detection arrangement, provided with sensor means. This arrangement comprises at least one body mounted floating, designated as a whole by 7 in FIG. 5, which preferentially has a substantially annular shape and is able to transmit mechanically stresses induced by the bearing 6 on the housing body 2, as will be explained hereinafter.

The floating body 7 may be made of an electrically insulating material, or else a metal material at least locally coated with an electrically insulating material (or else a sensor means that is to co-operate with the floating body could be coated in an electrically insulating way).

With reference once again to FIG. 5, the detection arrangement further comprises a sensor unit, designated as a whole by 8, which has a supporting body 8' preferably having a substantially annular shape and mounted in a substantially stationary position on the housing body 2, or within the corresponding housing. The sensor unit 8, or its supporting body 8', has sensor means 10 and 20, and in particular at least stress-sensor means, which are designed to detect mechanical stresses and/or vibrations and/or movements or displacements of the floating body 7 with respect to the housing body 2. As will be seen, the aforesaid stress-sensor means associated to the body 8' comprise at least one piezoelectric transducer, in particular of the type designed to generate a potential difference or voltage and/or an electric current in response to stresses and/or mechanical loads and/or vibrations, such as variations of the force or stress that is induced in the above sensor means or transducer.

The supporting body 8' likewise envisages electrical-connection conductive tracks, some of which are designated by T. In the example of FIG. 5, the conductive tracks T terminate in pads P, associated to which are respective electrically connection terminals C, forming part of a connector designated by CB, configured for coupling with the connector 5 provided at the proximal end of the wiring 5a. For this purpose, the body 2 is provided with a passage 3e to enable access to the connector CB, to this passage there being preferentially associated—as represented schematically by the element designated by 9—at least one from among a seal, an adhesive, and a frame, for withholding and/or positioning and/or fixing of the connector itself; in the example, the passage 33 and the element 9 are on the lid 3, in particular on its bottom wall 3a.

In various embodiments, the floating body 7 is set between the lid 3 and the sensor unit 8 (i.e., the sensor unit 8 is set between the floating body 7 and the base 4): for this reason, also the floating body 7 is preferably provided with a passage 7a, where the connector CB carried by the unit 8 is positioned, which is sized so as to prevent any mechanical interference between the parts in question (alternatively, the passage 7a could correspond to an interruption of the floating body 7, which in this case would have the shape of an arc of circumference).

The body 8' of the sensor unit 8 has a detection surface—designated by 8a in the figures—that is at least locally defined by the aforesaid stress-sensor means. In various embodiments, the detection surface 8a (or a corresponding sensor means 10, 20 that defines it at least in part) is at least locally in contact with a corresponding facing surface of the corresponding floating body 7 (in particular at the part or parts of the surface 8a defined by the stress-sensor means). In other embodiments, set between the detection surface 8a and the aforesaid facing surface of the floating body 7 is at least one further intermediate element or layer (for example, a layer of resin, or an adhesive layer, or a polymeric layer), which in any case is designed to transmit mechanical stresses from the floating body 7 to the sensor unit 8, or to the corresponding sensor means.

In the assembled condition of the device 1, the sensor unit 8 is hence mounted within the housing body 2, with the body 8' preferably constrained in a fixed position, with the facing surface of the floating body 7 that rests (either directly or with interposition of some other possible element, for example a resin) on the detection surface 8a. Fixing of the body 8' on the housing body may be obtained by gluing, or else by mechanical interference between the two parts in question, or by providing a shape fit between them.

In various preferred embodiments, the device 1 includes at least one elastic element, prearranged for pushing the floating body 7 towards the sensor unit 8, in particular in a direction at least approximately parallel to the axis of rotation of the bearing (this axis being designated by X in FIG. 4). In various particularly advantageous embodiments, the aforesaid at least one elastic element is defined integrally by the housing body 2 of the device, for example, in its lid 3. Such a case is exemplified in FIGS. 1-5, where the bottom wall 3a of the lid 3 is shaped so as to define a plurality of embossings 3f, which project towards the inside of the body 2. These embossings 3f are in contact with the upper surface of the floating body 7, as may be clearly seen, for example, in FIG. 6, and operate as springs, in the sense of urging the floating body 7 towards the sensor unit 8. In the example, a plurality of embossings 3f are provided angularly distributed along the wall 3a of the lid 3. As explained hereinafter, it is also possible to provide elastic elements configured as distinct parts with respect to the housing body 2 and mounted thereon, such as Belleville washers or the like.

As may be appreciated, and with reference for example to FIG. 5, assembly of the device 1 is very simple: the unit 8 and the floating body 7 are positioned in the base 4, with the passage 7a of the floating body 7 in a position corresponding to the connector CB, which has been previously connected to the pads P; next, coupled on the base 4 is the lid 3, with the corresponding passage 3e in a position corresponding to the connector CB, the frame 9 being mounted on this passage; the two parts 3, 4 of the housing body 2 may then be fixed together, for example welded. The device 1, or its body 2, can then be engaged to the bearing 6, as described previously, and the connector 5 can be coupled to the connector CB accessible through the passage 3e and the frame 9.

Figure 8:
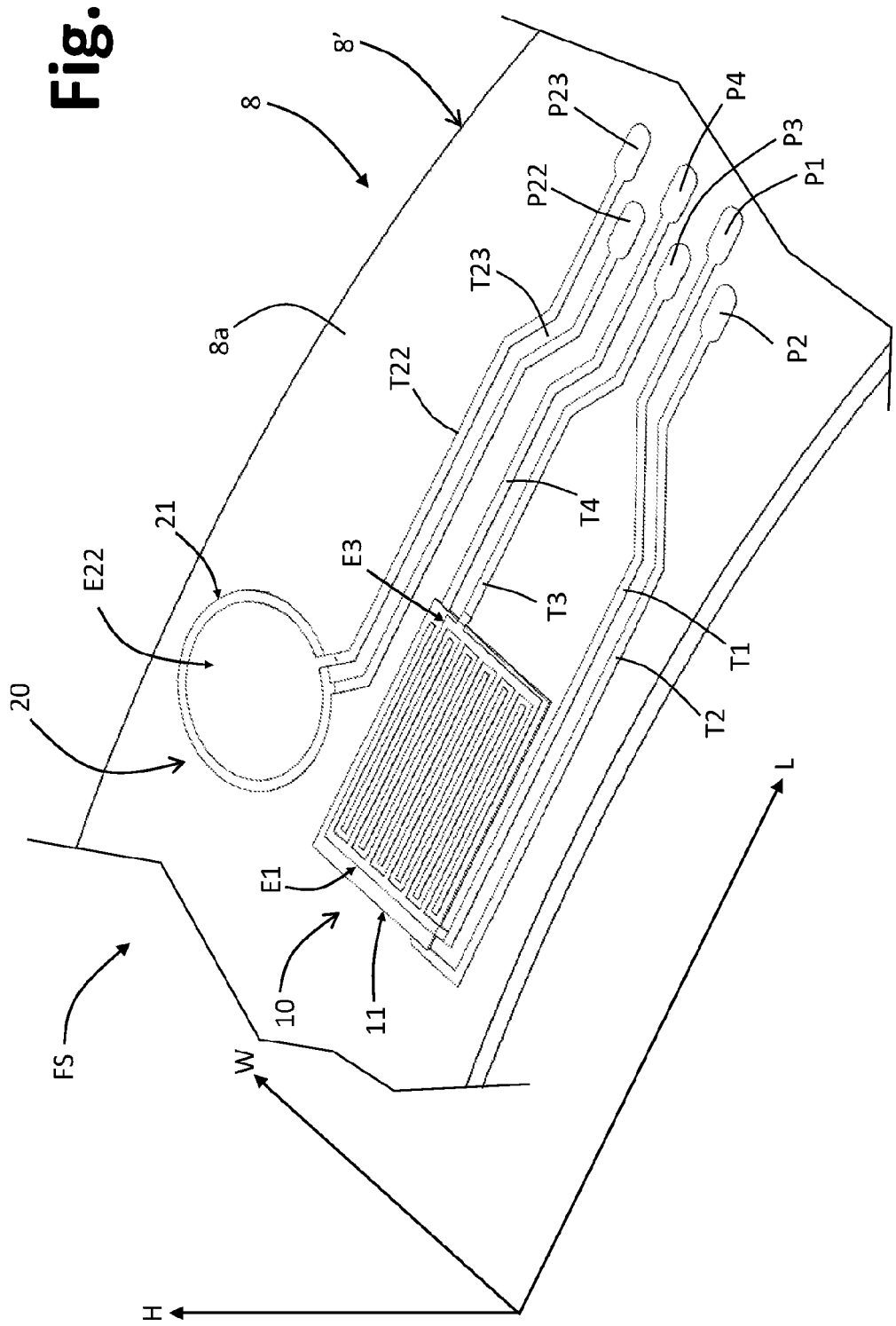
FIG. 8 is a schematic perspective view of a portion of a sensor unit of a detection device according to possible embodiments of the invention.

FIG. 8 illustrates, merely by way of example, a portion of a supporting body 8' of a sensor unit 8, having an arrangement of the corresponding stress-sensor means 10 and 20 that differs from the one visible in FIG. 5, but is implemented according to the same principles.

In various embodiments, the body 8' basically provides a substrate, preferably but not necessarily planar. The body 8' may indicatively have a thickness of between 0.5 and 4 mm. The body 8' may be made of electrically insulating material (for example, a ceramic material) or may be made of an electrically conductive material coated at least in part with an electrically insulating material, for example, a metal or a metal alloy (e.g., steel), and coated with a layer of dielectric material (for example, a polymer or a metal oxide or mixtures of oxides), or else may be made of a ceramic material or a ceramic oxide or mixtures of ceramic oxides (for example, alumina or mixtures of alumina and zirconia). In various preferred embodiments, the body 8' is formed as an ordinary printed-circuit board (PCB), for example made of vetronite or any other material—not necessarily a composite material—suitable for producing printed-circuit boards.

Provided at a major face or surface of the body 8' of the base 4—corresponding to the detection surface 8a— is at least one first transducer, which comprises at least one layer of piezoelectric material, having a length, a width, and a thickness that extend in the directions denoted by L, W, and H, respectively, in FIG. 8. These directions L, W and H will be also referred to hereinafter as longitudinal direction, transverse direction, and normal direction, respectively, with reference to the plane of the body 8'.

In various embodiments, the aforesaid first piezoelectric transducer, designated by 10, is in particular configured for detecting shear stresses, i.e., stresses that have at least one component in the longitudinal direction L and/or in the transverse direction W. The aforesaid transducer is designed to co-operate with the floating body 7 in order to generate an electrical signal representative of a shear stress determined by the floating body. Preferably, in various embodiments, at the same sensorized face of the body 8' there may be provided at least one second piezoelectric transducer, substantially of the same type as the first transducer, but configured for detecting shear stresses in a direction different from that of the aforesaid first transducer. Preferably, in various embodiments, at the same sensorized face of the body 8' there may be provided at least one further transducer, which is also preferably of a piezoelectric type, in particular configured for detecting normal stresses, i.e., stresses that have at least one component in the axial direction of the bearing: such a transducer is designated by 20 in FIGS. 5 and 8.

As has been mentioned, in various embodiments, on the upper part of at least one transducer 10, i.e., its side opposite to the body 8', there is to be rested or connected the floating body 7, which—following upon loads exerted on the bearing 3 or generated thereby—is able to perform albeit minimal movements relative to the housing body 2: hence, in other words, the bearing 3 transmits to the housing body 2 a force having at least one component in the directions L and/or W and/or H, of which it is desired measure the magnitude through one or more piezoelectric transducers 10 and/or 20: this force is transferred from the housing body 2 to the floating body 7, which basically operates as inertial mass, and is then detected and measured by the transducer 10 and/or 20.

Given that the sensor unit 8 is in a fixed position relative to the floating body 7, a force applied on the latter in the direction W and/or in the direction L causes a stress on the transducer 10, which—by the piezoelectric effect—generates across corresponding electrodes an electrical potential difference proportional to the magnitude of the shear stress induced. In this way, it is possible to obtain information corresponding to the direction of the load imparted on the body 2 by the bearing 6.

The floating body 7 can be also rested on, or associated to, the upper part of a piezoelectric transducer 20: when to the floating body 7 an axial force is applied having at least one component in the direction H a corresponding stress is set up in the transducer 20, which, by the piezoelectric effect, generates across corresponding electrodes a potential difference representing the magnitude of the normal stress induced.

In various preferred embodiments, the detection arrangement of the device according to the invention comprises a single floating body 7 and a single sensor unit 8, preferably both having a substantially annular shape, as exemplified in the figures. However, according to other embodiments, there may be provided a number of distinct floating elements of a different shape (for example, arched), each of which is functionally combined with at least one respective piezoelectric transducer 10 and/or 20. For these cases, the various piezoelectric transducers may all be provided on one and the same sensor unit 8, for example, having an annular shape, or else there may be provided a number of distinct sensor units of a different shape (for example, arched), each of which is functionally combined with at least one respective floating body.

In various embodiments, the transducer, or each transducer, comprises at least one element or layer of piezoelectric material (referred to hereinafter, for simplicity, as "piezoelectric layer") and at least two electrodes, each of which is associated to a major face of the piezoelectric layer. Preferentially, the electrodes are defined by tracks made of electrically conductive material (referred to hereinafter, for simplicity, as "conductive tracks"), with these tracks that may possibly define—at their end opposite to the corresponding electrode—terminal connection portions, for example in the form of pads. With reference, for example, to FIG. 8, where the piezoelectric layers of the transducer 10 and of the transducer 20 are designated by 11 and 21, respectively, the letters "T", "E", and "P" (followed by corresponding reference numbers) identify the aforesaid conductive tracks, some of the corresponding electrodes, and the corresponding terminal portions or pads, respectively. It should be noted that the electrodes E and the tracks T do not necessarily have to be formed integrally: for example, it is possible to form the piezoelectric layer 11 or 21 as a stand-alone body, with a plate or laminar shape, then form the electrodes E on the opposite major faces of the corresponding piezoelectric layer 11 or 21, then form the tracks T with the corresponding pads P on the sensorized surface 8a of the body 8' of the sensor unit 8, and finally secure the layer 11 or 21 carrying the electrodes E on the sensorized surface, providing the necessary connections between the electrodes E and the corresponding tracks T. This solution is similar to mounting of electronic components of the SMD type, where the component provided with electrodes is positioned on an electrical circuit such as a PCB or hybrid circuit and subsequently soldered.

Preferably, the piezoelectric layer 11 and/or 21, the tracks T, and the electrodes E are substantially planar and lie substantially parallel to one another and to the surface of the corresponding face of the body 8'.

In various embodiments, the transducer 10 and/or 20, i.e., or the piezoelectric layer 11 and/or 21, is obtained via deposition of material on the body 8' and/or at least in part on the lower electrodes, for example via screen printing or spin coating.

Preferentially, also the electrodes E, or the conductive tracks T, are formed using deposition processes, for example with screen-printing techniques, or sputtering techniques, or techniques of thermal evaporation, or by dispensing or, more in general, with any known technique designed for deposition of electrically conductive materials on a corresponding substrate.

In various preferential embodiments, the entire transducer 10 and/or 20 is obtained via deposition of successive layers of different materials on the body 8', i.e., first by depositing the electrically conductive parts that are to be set at least in part on the lower face of the layer 11 and/or 21, then depositing the piezoelectric layer 11 and/or 21, and finally depositing the electrically conductive tracks that are to be at least in part on the upper face of the layer 11 and/or 21.

Deposition in stacked layers is preferentially obtained using screen-printing techniques, in which case the piezoelectric layer 11 and/or 21 may have a thickness of between 20 and 300 μm, preferably approximately 100 μm, with the electrodes E and the tracks T having, instead, a thickness of between 8 and 25 μm, preferably approximately 15 μm. Alternatively, the piezoelectric layer (and the electrodes E and/or the tracks T) may be deposited using thin-film techniques (such as sol-gel, sputtering or CVD—Chemical Vapour Deposition), in which case the layer may have a thickness of between 50 and 2000 nm, preferably between 500 and 800 nm (the tracks/electrodes may have a thickness of between 50 and 200 nm, preferably between 80 and 120 nm, and may be deposited by sputtering, thermal evaporation, or screen printing with metalorganic inks).

The layer 11, or each layer 11 and/or 21, may be deposited using pastes with piezoelectric ceramic (piezoceramic) base, whereas the electrodes E may be obtained using pastes with a metal base, preferably of noble metals (for example, pastes with a base of platinum, or silver, or silver-palladium, or silver-platinum).

The piezoelectric layer, or each piezoelectric layer, may be obtained also with techniques different from those exemplified above and/or not necessarily via deposition or growth of material on a substrate: for example, a piezoelectric layer could be configured as a body made of piezoelectric ceramic obtained by compression of powders and their subsequent sintering, on the two major faces of which the electrodes E are next deposited or applied, and are then connected to the corresponding tracks T provided, instead, on the corresponding face of the body 8'. Also in this case, as described previously, the process is similar to a mounting of the SMD type of the piezoelectric-ceramic element on a PCB or on a hybrid circuit.

Figure 9:
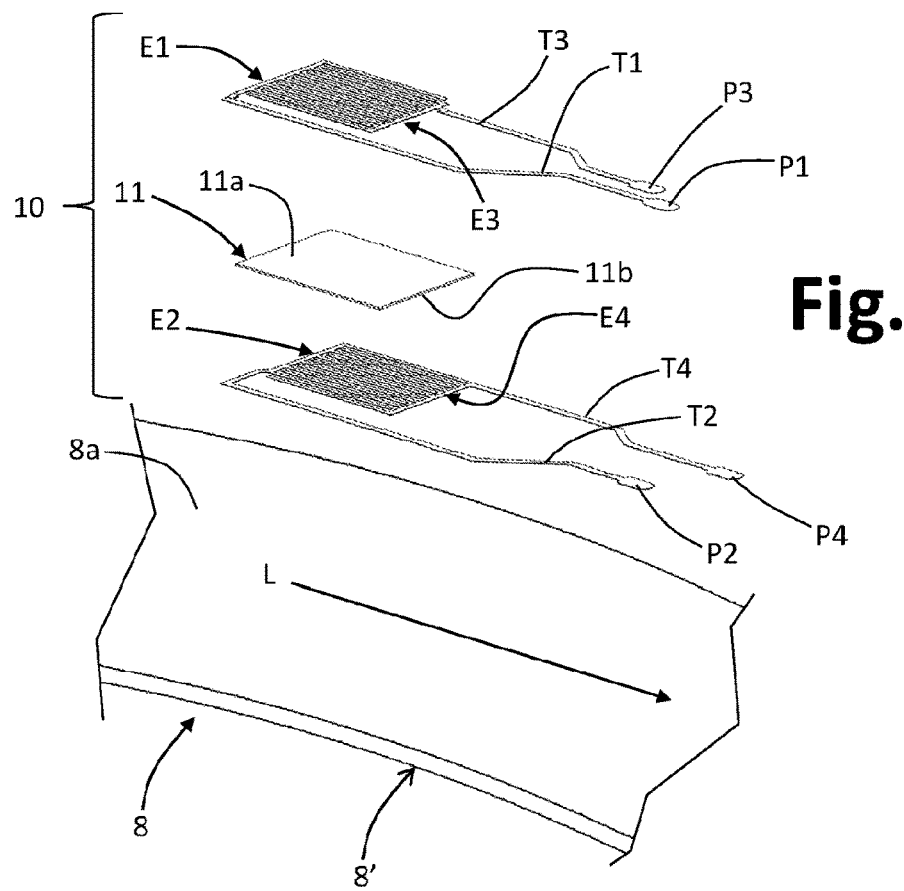
FIG. 9 is an exploded schematic view of a first piezoelectric transducer of a sensor unit of a detection device according to possible embodiments of the invention.

In FIG. 9, a transducer 10 is represented schematically in exploded view. As may be noted, in various embodiments, the piezoelectric layer 11 extends in the longitudinal direction L and has two opposite major faces 11a and 11b, at which there are at least one first electrode E1 and one second electrode E2, respectively. Preferentially associated to each electrode E1 and E2 is a corresponding conductive tracks T1 and T2, deposited or in any case obtained at least in part on the face 8a of the body 8', which defines a respective connection pad P1 and P2.

Figure 10:
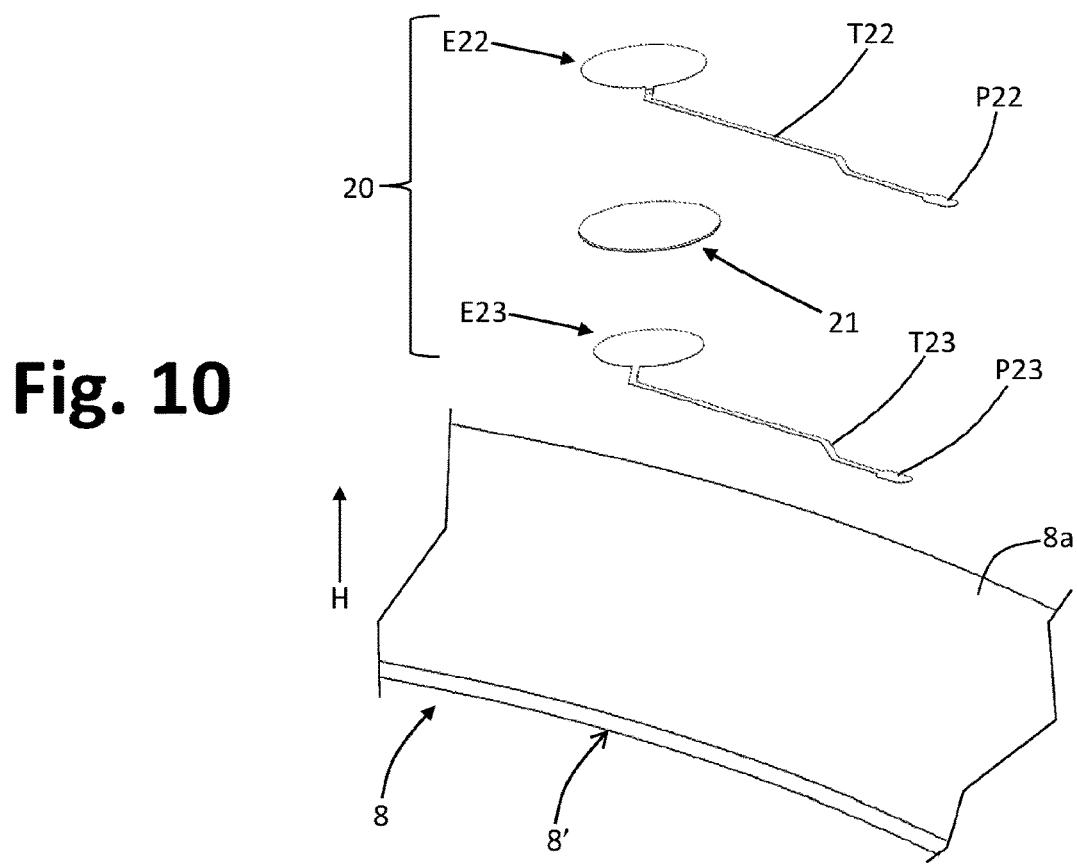
FIG. 10 is an exploded schematic view of a second piezoelectric transducer of a sensor unit of a detection device according to possible embodiments of the invention.

An embodiment of this sort is shown in FIG. 10 for a transducer 20, where the piezoelectric layer 21 has a circular shape, and associated to its opposite major faces 21a and 21b are respective electrodes E22 and E23, which are also preferably circular.

Also associated to each electrode E22 and E23 is a corresponding conductive track T22 and T23, provided at least in part on the face 8a of the body 8', which defines a respective connection pad P22 and P23. It should be noted that the circular shape of the piezoelectric layer 21 and of the corresponding electrodes E22, E23, albeit preferable, is not imperative.

As has been said, assuming a deposition in stacked layers of the type exemplified above for the transducers 10 and 20 of FIG. 8, for example by screen printing, on the face 8a of the body 8' first the tracks T2 and T23 that define the electrodes E1 and E23 with the corresponding pads P2 and P23 are deposited, next on the face 8a and on the parts of the tracks T2 and T23 that define the electrodes E2 and E23 the piezoelectric layers 11 and 21 are deposited, and finally the tracks T1 and T22 are deposited, with their part (comprising the pads P1 and P22) that extends on the face 8a, and with their part defining the electrodes E1 and E22 that extends, instead, on the upper faces of the piezoelectric layers 11 and 21, respectively.

As has been said, in any case, the electrodes may be configured as distinct parts formed on the opposite major faces of layers 11 and/or 21 previously obtained by sintering or in some other way, and then be connected electrically during assembly of the transducers 10 and 20 on the body 8', on which the tracks T1, T2 and T22, T23 are, instead, obtained.

Irrespective of how the electrodes E1 and E2 are obtained, they are preferably comb-like electrodes, namely, electrodes each having at least a plurality of portions, or teeth, or fingers, which extend on the two opposite major faces 11a and 11b of the piezoelectric layer 11, respectively, in a direction of extension of the latter, here the longitudinal direction L.

According to a preferential aspect of the invention, and with reference in particular to FIG. 9, a piezoelectric transducer 10 comprises at least one third electrode E3 and at least one fourth electrode E4, which are also preferably comb-like electrodes, or in any case each have a plurality of fingers that extend in the longitudinal direction L at the two opposite major faces 11a and 11b of the piezoelectric layer 11, respectively. Once again according to the aforesaid preferential aspect of the invention, the fingers of the third electrode E3 are in a configuration interdigitated or alternating with the fingers of the first electrode E1, and the fingers of the fourth electrode E4 are in a configuration interdigitated or alternating with the fingers F2 of the second electrode E2.

The electrodes E3 and E4 are preferentially obtained using the same technique as the one used for forming the electrodes E1 and E2, and in the same production steps. Consequently, with reference once again to the aforementioned example of deposition in superimposed layers via the screen-printing technique, the track T4 with the electrode E4 will be formed in the same deposition step as that in which the track T2 with the electrode E2 on the body 8' is obtained, whereas the track T3 with the electrode E3 will be formed in the same deposition step as that in which the track T1 with the electrode E1, in part on the piezoelectric layer 11 and in part on the body 8', is obtained.

Figure 11:
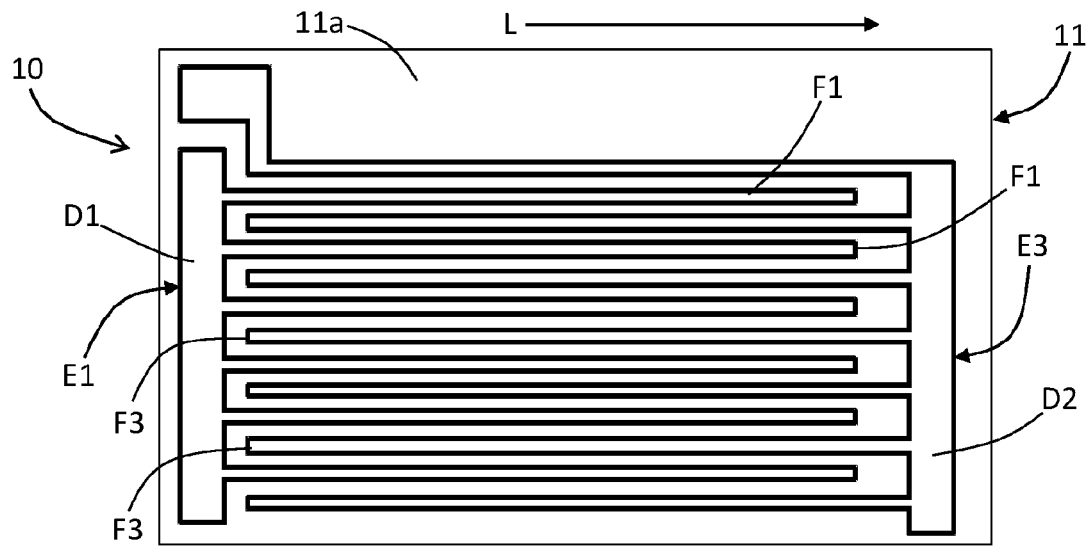
FIGS. 11 and 12 are schematic representations from above and from beneath, respectively, of a piezoelectric transducer of the type shown in FIG. 9.
Figure 12:
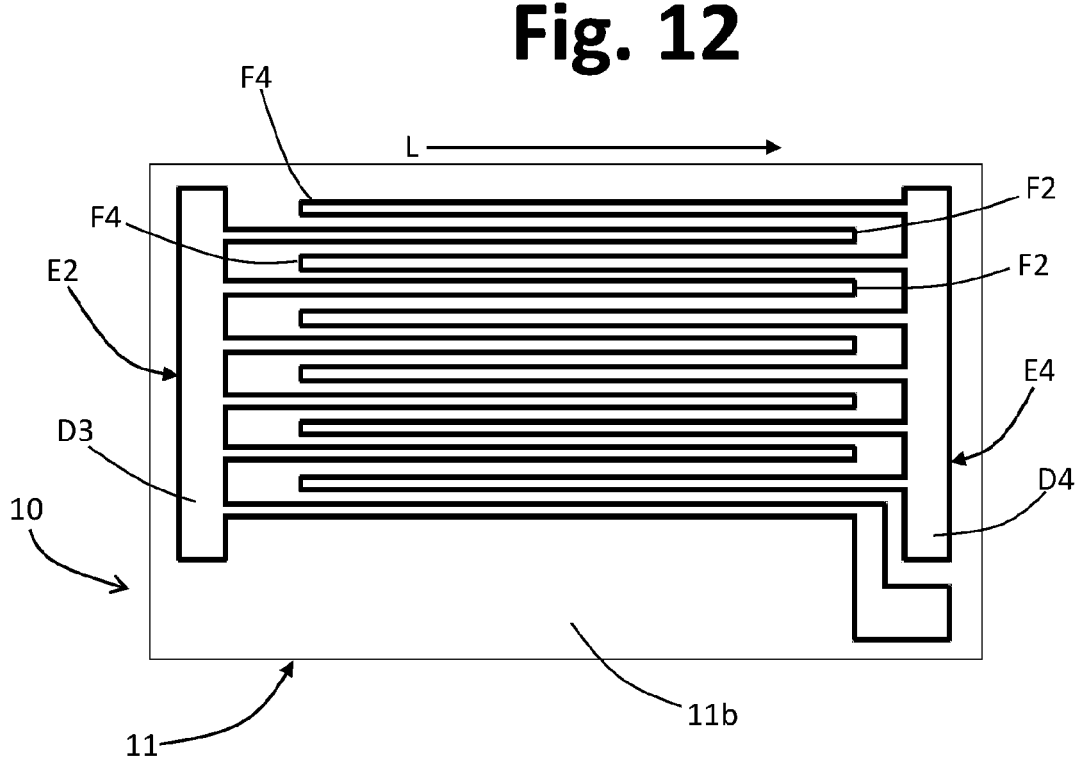

FIGS. 11 and 12 exemplify schematically possible geometries of the electrodes E1 and E3 at the upper face 11a of the layer 11 (FIG. 11), and of the electrodes E2 and E4 at the lower face 11b of the layer 11 (FIG. 12). As may be appreciated, in the non-limiting example, the above electrodes E1-E4 are comb-like electrodes, and hence comprise a series of portions or teeth or fingers that preferably extend substantially parallel to one another, here in the longitudinal direction L of the layer 11, and/or preferably equidistant (i.e., at a substantially constant distance apart from one another), starting from respective collector or distribution portions.

With reference, for example, to FIGS. 11 and 12, the letters "D" and "F", followed by the number identifying the corresponding electrode, denote, precisely, the aforesaid distribution portions of the electrodes E, as well as the corresponding fingers, respectively. As has been said, the fingers F of the electrodes E that are located on one and the same face of the layer 11 are interdigitated. In the preferential configuration, the fingers F of each comb-like electrode E are substantially rectilinear, but this—albeit preferable—does not constitute an essential characteristic, it being possible for the fingers to have, for example, also a different development. In the example, also the distribution portions D of two electrodes E that are located on one and the same face of the layer 11 are substantially parallel to one another, but neither is this characteristic to be deemed essential.

Figure 13:
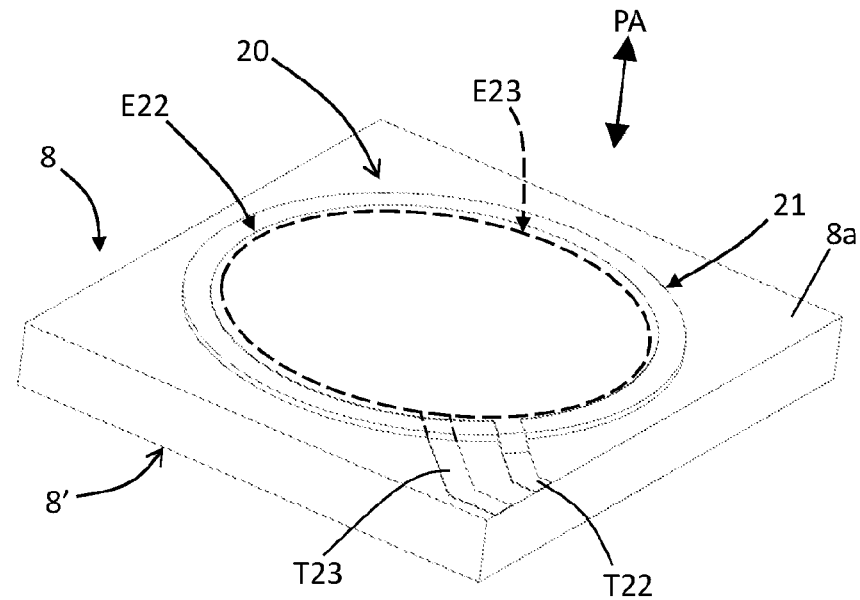
FIG. 13 is a schematic perspective view of a portion of a sensor unit of a detection device according to possible embodiments of the invention.

Visible in FIG. 13 is a portion of a sensor unit 8 at which a transducer 20 is located, that, as has been said, comprises an upper electrode E22 and a lower electrode E23, set between which is the corresponding piezoelectric layer 21.

Preferentially, when the transducer 20 is obtained by deposition of successive layers on the body 8', it is preferable for the layer 21 to have perimetral dimensions (here the circumference) greater than those of the electrodes E22 and E23, which are preferably substantially the same as one another: the larger perimetral size of the layer 21 as compared to the electrodes E22 and E23 simplifies stacking of the various layers of material during the deposition process, for example via screen printing. The transducer 20 basically operates as pressure sensor; namely, the layer 21 generates a voltage (or electrical potential difference) when the layer 21 is compressed, i.e., when the upper electrode E22 is pushed towards the lower electrode E23, i.e., when the floating body 7 is urged on the detection surface 8a in a direction substantially parallel to the axis X of the bearing.

Figure 14:
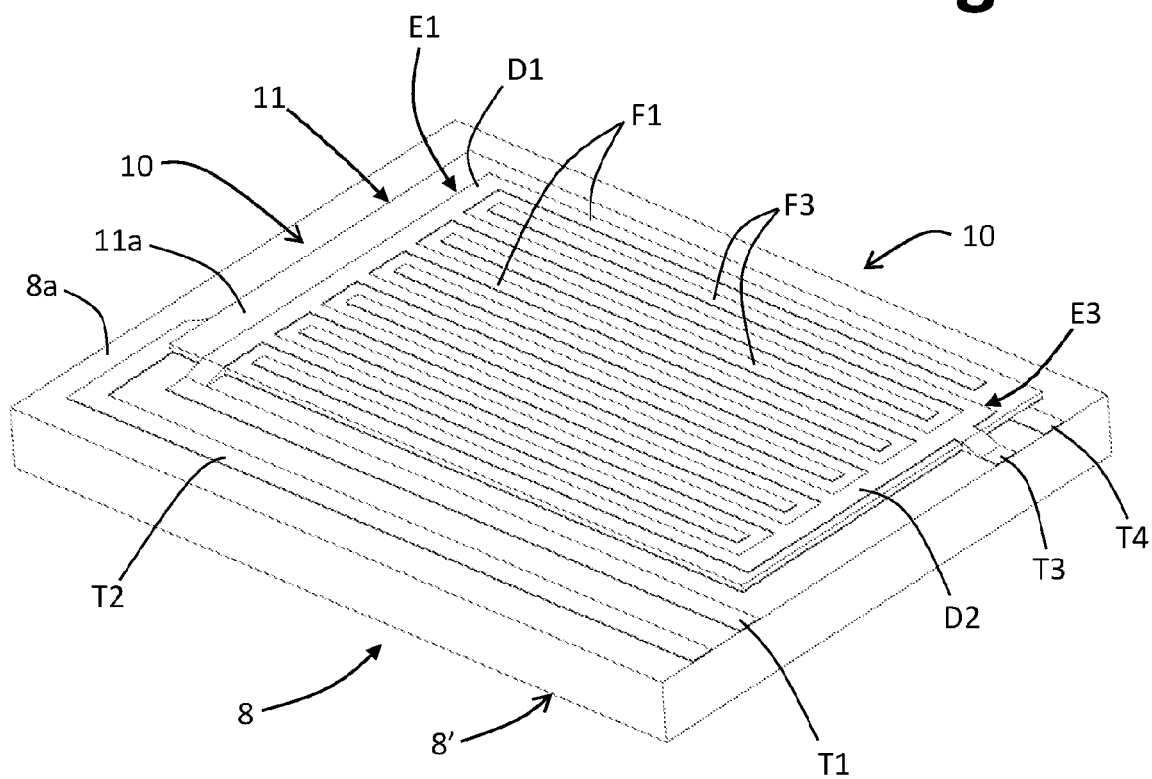
FIG. 14 is a schematic perspective view of a portion of a sensor unit of a detection device according to possible embodiments of the invention.
Figure 15:
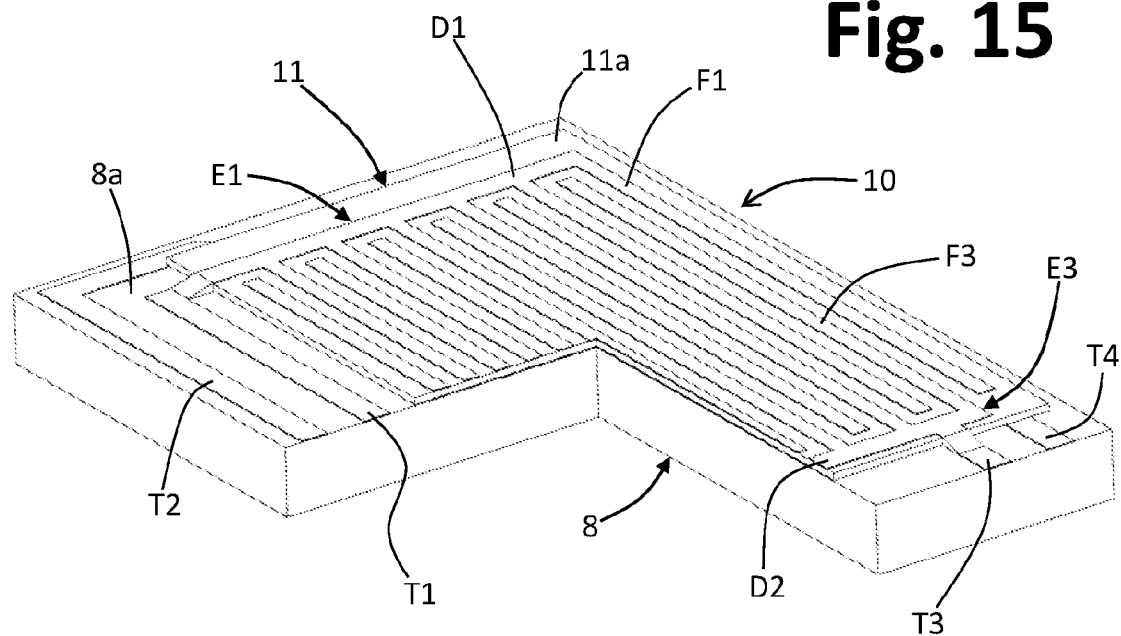
FIG. 15 is a first sectioned perspective view of the portion of the sensor unit of FIG. 14.
Figure 16:
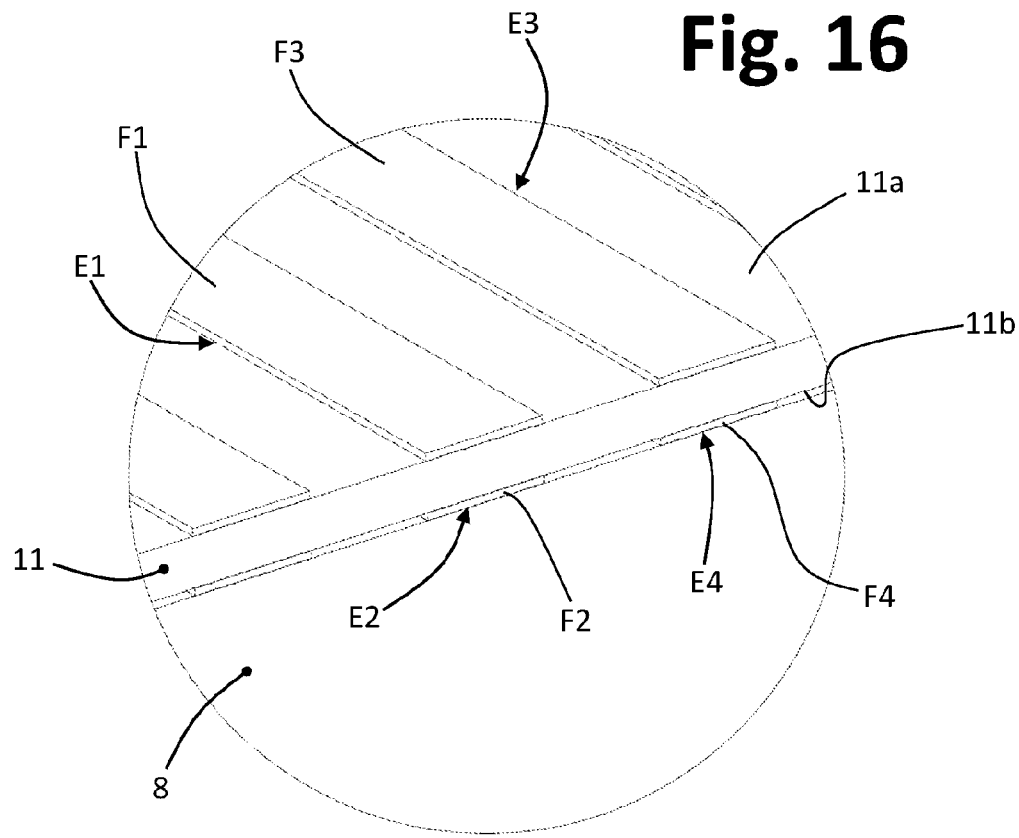
FIG. 16 is a detail of FIG. 15 at a larger scale.
Figure 17:
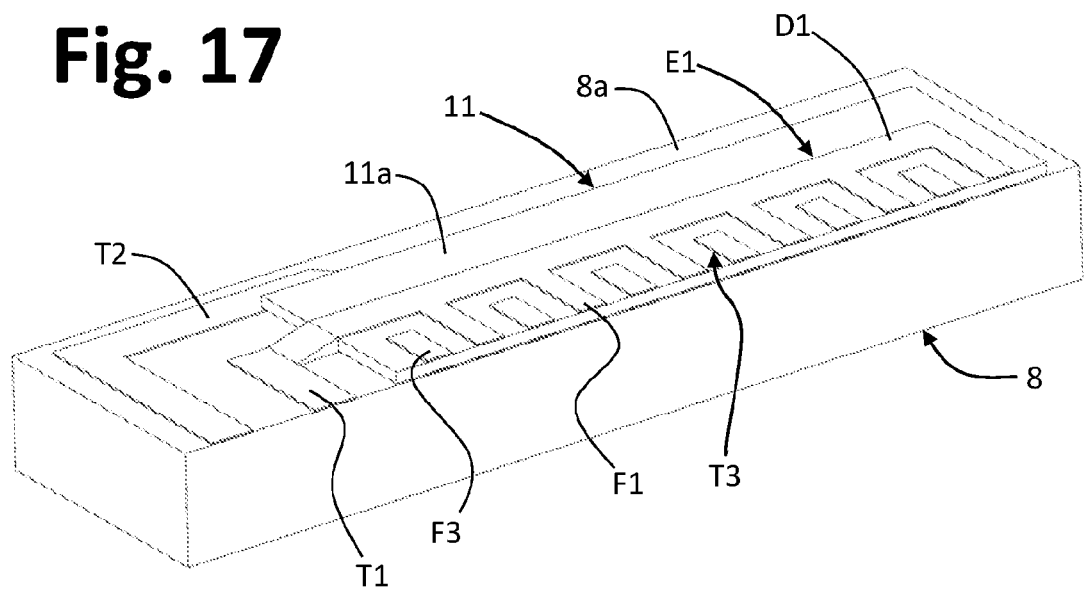
FIG. 17 is a second sectioned perspective view of the portion of the sensor unit of FIG. 14.
Figure 18:
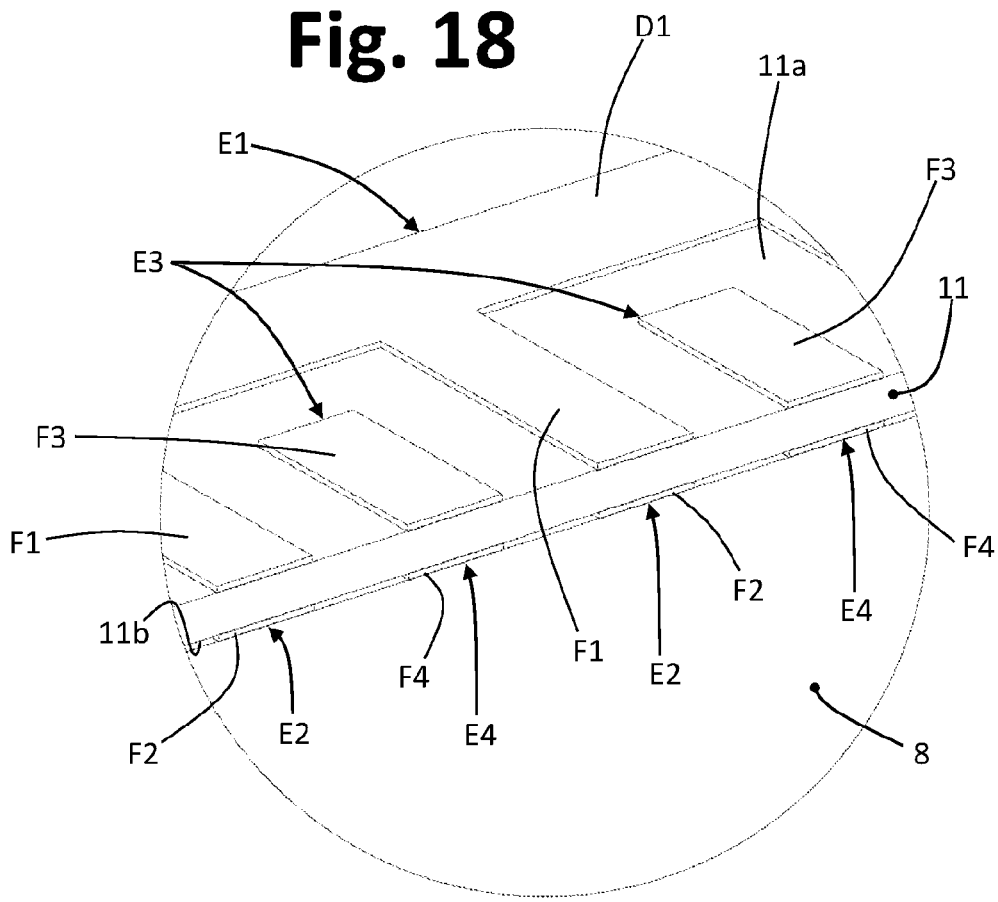
FIG. 18 is a detail of FIG. 17 at a larger scale.

Visible in FIG. 14 is a portion of a unit 8 at which a transducer 10 is located, that, as has been said, comprises the piezoelectric layer 11, with at least two lower comb-like electrodes (here not visible) in an interdigitated or alternating configuration, and at least two upper comb-like electrodes E1 and E3 in an interdigitated or alternating configuration. The area of the layer 11—which may, for example, be comprised between 1 and 600 mm$^2$, preferably between 2 and 100 mm$^2$—is such as to cover the lower electrodes E2, E4, or at least the prevalent part of their fingers F2 and F4.

From the cross-sectional views of FIGS. 15-19 it may be noted how, in various embodiments, the fingers F of the various electrodes E are substantially symmetrical and in mutually facing or opposed positions. In particular, each finger F1 of the upper electrode E1 is in a position substantially superimposed to, or aligned with, a respective finger F2 of the lower electrode E2, and preferably has a shape and size that are substantially the same as those of the latter; likewise, each finger F3 of the upper electrode E3 is in a position substantially superimposed to, or aligned with, a respective finger F4 of the lower electrode E4, and preferably has a shape and size that are substantially the same as those of the latter.

With reference, for example, to FIG. 19, in embodiments of this type, the adjacent fingers F1 and F3 of the upper electrodes E1 and E3 extend substantially at a first distance $D_1$ from one another, whereas the distance $D_2$ between two successive fingers F1 of the electrode E1, respectively between two successive fingers F3 of the electrode E3, is substantially not less than twice the first distance $D_1$, preferably substantially twice the distance $D_1$. On the other side, also the adjacent fingers F2 and F4 of the lower electrodes E2 and E4 extend substantially at the aforesaid first distance $D_1$ from one another, and the distance $D_2$ between two successive fingers F2 of the electrode E2, and, respectively, between two successive fingers F4 of the electrode E4, is likewise substantially not less than twice the first distance $D_1$, preferably substantially twice the distance $D_1$.

The piezoelectric layer 11 is preferentially made of a ceramic material, such as a PZT (lead zirconate titanate), which must previously be subjected to a polarization process, in particular when it is necessary to obtain polarization of the piezoelectric material with an orientation different from the one for subsequent mechanical excitation. For this purpose, between at least one of the lower electrodes E2 and E4, on one side, and at least one of the upper electrodes E1 and E3, on the other side, an electrical field (indicatively comprised between 1 and 5 kV/mm) is applied such as to orient the electric dipoles inside the layer 11 all in the same direction (this operation being in general known as "poling"). As is known, for carrying out the polarization step, the transducer 10—i.e., its layer 11—is normally heated to a given temperature, for example comprised between the 120° C. and 140° C., normally in any case less than the Curie temperature, which varies according to the piezoelectric material chosen (here the case is considered of a piezoelectric ceramic with a Curie temperature of approximately 350° C.). After this temperature has been reached, the voltage is applied for a certain lapse of time, for example comprised between 1 and 50 minutes, preferably between 10 and 20 minutes, this voltage then being maintained also during subsequent cooling of the material when heating ceases.

It is to be recalled that the piezoelectric effect (i.e., the capacity of a material to present a potential difference when it undergoes mechanical stress, or else its capacity to undergo deformation when it is subjected to an electrical field), is essentially based upon distortions of its crystal lattice. A very common type of piezoelectric ceramic, such as PZT, is distinguished by a face-centred cubic (FCC) lattice when it is at a temperature higher than the Curie temperature, where at the vertices of the faces there are metal atoms (for example, lead atoms), at the centre of the faces there are oxygen atoms, and at the centre of the lattice there is an atom heavier than oxygen (for example, titanium or zirconium). Below the Curie temperature the lattice is tetragonal or rhombohedral, according to the relative percentage of titanium and zirconium. Normally, concentrations close to 50% are used, where both phases are present. It might be advantageous to use PZT compositions unbalanced on titanium, which present higher Curie temperatures, for example with approximately 60% titanium and 40% zirconium. In the case where temperatures in the region of 200° C. are not exceeded it is in any case advisable to remain in the proximity of the boundary between the morphotropic zones, which are comprised between 45% and 55% of relative concentration, preferably for a relative concentration of 52% titanium. It is moreover advantageous to use dopants, for example niobium, to improve the response of the piezoelectric sensors (preferred concentration of less than 1 wt %).

The heavier central atom can assume an asymmetrical stable position, causing an imbalance in the charges that results in formation of an electric dipole. The piezoelectric materials are hence polarized by means of an intense electrical field, normally supported by heating, which orients the dipoles thereof as desired, and causes a collective polarization that is stable in the limits of mechanical, thermal, or electrical stress of the material. At the end of the polarization process, the lattice of the material is distorted and reacts to mechanical or electrical stresses with the same mechanism of displacement of mass and charge, and generates a variation of charge on its surfaces. If the material is not polarized, the phenomenon occurs even so but, since the various domains are arranged randomly, the various effects cancel out.

Polarization is in the plane of the piezoelectric layer 11, in a direction alternating between polarization electrodes at the positive potential (+) and electrodes at the negative potential (−). It has recently been proven how the polarization step causes migration of the oxygen vacancies towards the polarization pole at the negative potential (see, for example, G. Holzlechner et al., "*Oxygen vacancy redistribution in PbZrxTi1—xO3 (PZT) under the influence of an electric field*", in Solid State Ionics 262:625-629, 2014). It has moreover been proven how a greater concentration of oxygen vacancies causes a reduction in polarization of the piezoelectric ceramic (see, for example, A. B., Joshi et al., "Effect of oxygen vacancies on crystallisation and piezoelectric performance of PZT", in Ferroelectrics Vol. 494, 117-122, 2016.

In the specific case considered herein, there will hence be obtained a higher quality of the piezoelectric material of the layer 11 in the proximity of the electrodes that, during polarization, have been set at the positive potential: by "quality of the material" is understood in this case a more orderly structure of the crystal lattice, due to a lower concentration of oxygen vacancies or, conversely, to a higher concentration of oxygen ions, which, in the ideal case, come to occupy all the O available sites in a form of crystal, for example of the type $ABO_3$, where in the most common case, which is that of PZT, A corresponds to lead (A=Pb) and B corresponds to zirconium or titanium (B=Zr, or else B=Ti). Polarization of the material is hence more intense in the proximity of the electrodes connected to the positive potential, where the (negative) oxygen ions have migrated, leaving the (positive) oxygen vacancies in the proximity of the electrodes connected to the negative potential.

According to a further preferential aspect of the invention, polarization of the piezoelectric layer 11 is obtained with a configuration of electrical connection of the various upper and lower comb-like electrodes that differs from the configuration of electrical connection of the same electrodes that is subsequently used when the piezoelectric transducer 10 is employed for detecting a shear stress. In other words, the layer 11 is provided with electrodes that serve at least in part both for the purposes of polarization of the layer of piezoelectric material and for the purposes of a subsequent measurement or detection of an electrical signal generated by the layer 11 itself.

FIG. 19 is, precisely, a schematic representation of a possible step of polarization of a transducer 10, or its piezoelectric layer 11, where the electrodes E1 and E2 are electrically connected together to the negative potential (−), whereas the electrodes E3 and E4 are electrically connected together to the positive potential (+) and are electrically insulated from the electrodes E1 and E2. The oxygen ions will hence tend to concentrate in the proximity of the areas comprised between the fingers F3 and F4, in part in the area underlying the electrodes and in part in the area without electrodes, between the pairs of fingers F3-F4 and F1-F2 in the area closest to F3-F4, which is positively charged, whereas the oxygen vacancies will tend to concentrate in the proximity of the areas comprised between the fingers F1 and F2, in part in the area underlying the electrodes and in part in the area without electrodes, between the pairs of fingers F3-F4 and F1-F2 in the area closest to F1-F2, which is negatively charged.

In FIG. 19 the small arrows VP at the centre of the layer 11 represent by way of example the polarization vectors, determined by application of the potential difference between the electrodes E1 and E3, on one side, and the electrodes E2 and E4, on the other side. As may be appreciated, the polarization axis, designated by PA, extends in the direction W; i.e., it is transverse to the longitudinal direction L. The areas of the piezoelectric material that extend axially (direction H) between each pair of superimposed fingers F1-F2 and F3-F4 are less polarized than the areas of the material that extend in a transverse direction (direction W) between the aforesaid pairs of fingers: this is basically due to the deformation of the polarized areas that are set between the aforesaid pairs of fingers, which tend to thin out and lengthen.

FIG. 20 illustrates, instead, how, in subsequent use of the transducer 10 for detection purposes, the electrodes E1-E4 are exploited with a configuration of electrical connection that differs from the one used in the step of polarization of the layer 11.

In particular, the upper electrodes E1 and E3 are electrically connected together (here, purely by way of example, to the positive potential +), whereas the lower electrodes E2 and E4 are electrically connected together (here, purely by way of example, to the negative potential −) and are electrically insulated from the other two electrodes E1 and E3. In this way, a shear stress induced in the piezoelectric layer 11 having at least one component in the longitudinal direction L generates between the electrodes E1 and E3, on one side, and the electrodes E2 and E4, on the other side, a potential difference, the value of which is substantially proportional to the shear stress induced.

FIG. 21 is aimed precisely at highlighting in a schematic way the behaviour of the polarization vectors VP, just two of which are represented schematically at a larger scale. When the layer 11 is subjected to a shear stress SS having at least one component in the direction of extension of the fingers F (here substantially in the longitudinal direction L), and hence substantially transverse or perpendicular to the polarization axis, an anisotropic rotation of the vectors VP occurs, which causes onset of a charge between the upper electrodes E1 and E3 and the lower electrodes E3 and E4.

It will be appreciated in any case that, by providing on the sensor unit 8 a number of transducers 10 oriented in different ways, it is possible to detect, via the floating body 7, both the magnitude of the stresses that the bearing 6 imparts on the housing body 2 and the direction in which these stresses occur.

Figure 22:
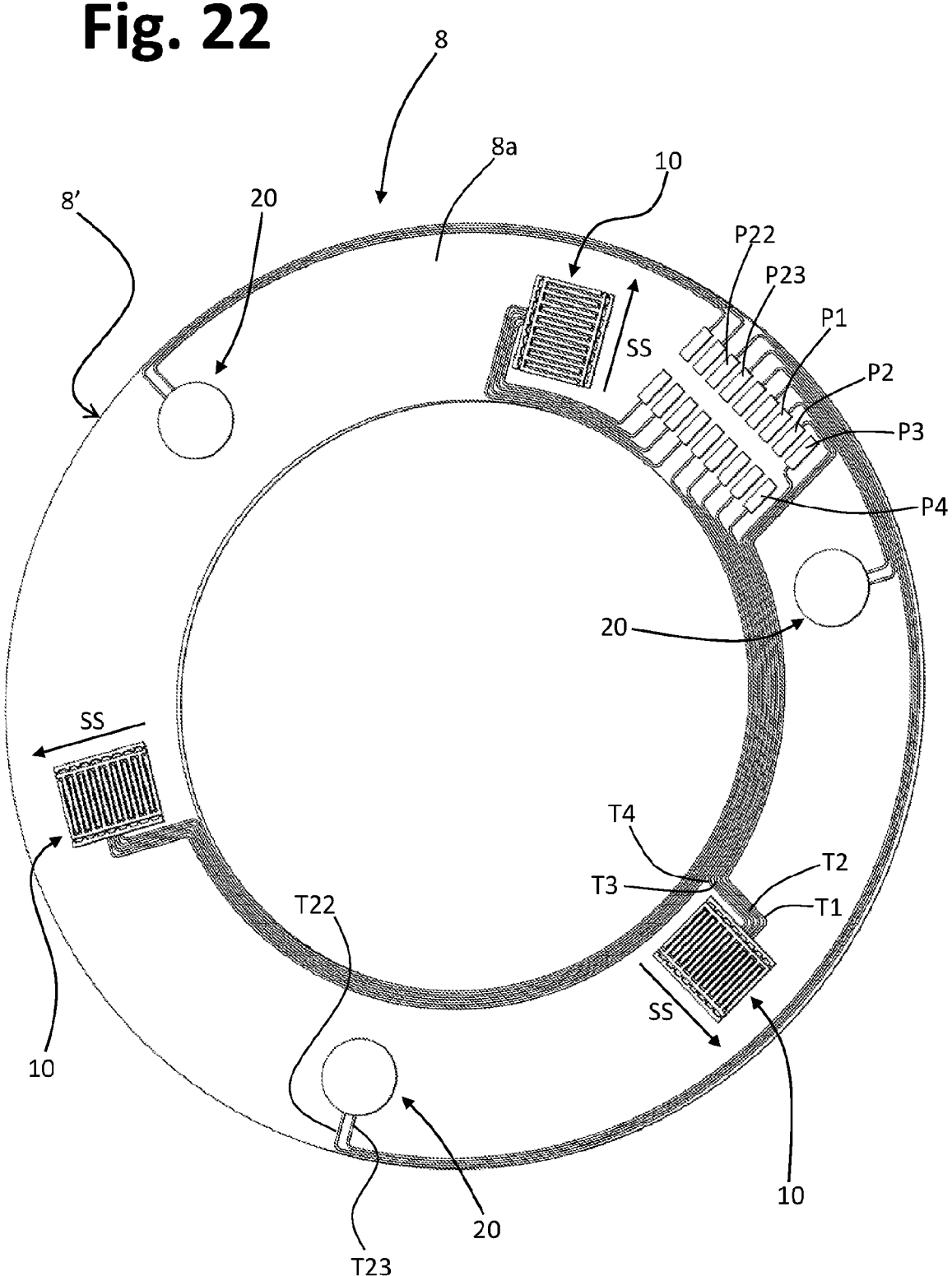
FIG. 22 is a schematic top plan view of a sensor unit of a detection device according to possible embodiments of the invention.

An example of this type is illustrated in FIG. 5 and, more in detail, in FIG. 22, where the sensor unit 8 includes three transducers 10 angularly distributed along the circumference of the unit itself so as to detect shear stresses SS oriented substantially at 120° with respect to one another. In the non-limiting example of FIGS. 5 and 22, likewise provided are three transducers 20 for detecting normal stresses, i.e., stresses in the axial direction X of the bearing. Of course, in the sensor unit 8 a different number of transducers 10 and/or 20 may be envisaged.

The embodiments described with reference to FIGS. 19-21—distinguished by a symmetrical arrangement between the fingers F1 and F3 of the upper electrodes E1 and E3 and the fingers F2 and F4 of the lower electrodes E2 and E4, with the fingers of the former substantially facing, or stacked on, the fingers of the latter—enable detection of deformations of the layer 11 that occur (or have at least one component) in the longitudinal direction (L) of the corresponding layer of piezoelectric material 11. This type of operation is based upon the asymmetry of polarization obtained on account of migration of the oxygen vacancies previously mentioned: however, this does not constitute an essential characteristic of the invention, since with different relative positionings between the fingers F and/or different configurations of electrical connection of the electrodes E during polarization and use different operating modes may be obtained.

For instance, FIGS. 23-26 refer to embodiments distinguished by an asymmetrical arrangement between the upper electrodes E1, E3 and the lower electrodes E2, E4, i.e., between the corresponding fingers. From FIG. 23 it may be noted how the general structure of the transducer 10 is substantially similar to the one already described previously, as likewise similar may be the modalities of manufacture, for example using techniques of silk-screen deposition in stacked layers. The arrangement of the fingers F of the electrodes E is, instead, different: in particular, the distance between adjacent fingers of two different electrodes is smaller than the distance between two successive fingers of one and the same electrode.

With reference in particular also to FIG. 24, in various embodiments of this type, the adjacent fingers F1 and F3 closer to one another of the upper electrodes E1 and E3 extend (here in the longitudinal direction L) substantially at a first distance $D_1$ from one another, whereas the distance $D_2$ between two successive fingers F1 of the electrode E1 is greater than twice the distance $D_1$ (in the example, approximately three times $D_1$); also the successive fingers F3 of the electrode E3 are substantially at the distance $D_2$ apart. It should be noted that also the adjacent fingers F1 and F3 that are less close to one another of the upper electrodes E1 and E3 extend at a distance $D_3$ apart that is less than the distance $D_2$ ($D_3$, in the example, is approximately twice $D_1$).

On the other side, the adjacent fingers F2 and F4 that are closer to one another of the lower electrodes E2 and E4 extend (here in the longitudinal direction L) substantially at the aforesaid first distance $D_1$ from one another, and the successive fingers F2 of the electrode E2, respectively the successive fingers F4 of the electrode E4, are substantially at the aforesaid distance $D_2$. Also the adjacent fingers F2 and F4 that are less close to one another of the lower electrodes E2 and E4 extend substantially at the distance $D_3$ from one another.

From FIG. 24 it may likewise be noted how each finger F1 of the electrode E1 is in a position substantially superimposed to, or aligned with, a respective finger F2 of the electrode E2, and each finger F3 of the electrode E3 is in a position substantially superimposed to, or aligned with, a respective finger F4 of the electrode E4.

Also in this case, polarization of the piezoelectric layer 11 is obtained with a configuration of electrical connection of the various electrodes that differs from the configuration of electrical connection that will then be used when the piezoelectric transducer 10 is to detect a shear stress.

In fact, FIG. 24 represents schematically a possible step of polarization of the transducer 10, or of the piezoelectric layer 11, during which the electrodes E1 and E2 are electrically connected together to the negative potential (−), and the electrodes E3 and E4 are electrically connected together to the positive potential (+) and electrically insulated from the other two electrodes E1 and E2. Also in this case, the arrows VP at the centre of the layer 11 represent by way of example the polarization vectors, which are determined by application of the potential difference between the electrodes E1 and E2, on one side, and the electrodes E3 and E4, on the other side.

FIG. 25 illustrates, instead, how, during effective use of the transducer 10 for purposes of detection of a shear stress, the configuration of electrical connection of the electrodes E1-E4 is different from the one used during polarization of the layer 11. In particular, the upper electrodes E1 and E3 are electrically connected (here, purely by way of example) to the positive potential (+), and the lower electrodes E2 and E4 are electrically connected (here, purely by way of example) to the negative potential (−) and are electrically insulated from the other two electrodes E1 and E3.

In this way, as exemplified in FIG. 26, a shear stress SS induced in the layer 11 in a direction transverse to the longitudinal direction L (i.e., in the direction W), generates between the electrodes E1 and E3, on one side, and the electrodes E2 and E4, on the other side, a potential difference of a value proportional to the aforesaid shear stress SS. The variation of the polarization vector that generates a charge on the electrodes can be viewed as a rotation of the polarization vector caused by the shear stress. Reading could also be made by connecting just one pair of electrodes on the opposite faces, for example the electrodes E1 and E2.

As may be appreciated, by providing, for example, on the unit 8 a first transducer 10 according to FIGS. 14-21 and a second transducer 10 according to FIGS. 23-26, but with the respective fingers F all oriented in one and the same direction, it will in any case be possible to detect both the loads that act substantially in a first direction (for example, corresponding to the longitudinal direction L) via the first transducer and the loads that act in a second direction substantially perpendicular to the first direction (for example, corresponding to the transverse direction W) via the second transducer. An embodiment of this sort enables, for example, simplification of the step of silk-screen deposition of the transducers.

The same result may, for instance, be obtained also by providing on the unit 8 a first transducer 10 and a second transducer 10 of the same type (for example, according to FIGS. 14-21), but with the fingers of the former oriented in a different way with respect the fingers of the latter, for example perpendicular thereto: such an embodiment makes it possible to obtain from the transducers signals that are more similar to one another.

FIGS. 27-29 refer to other embodiments, distinguished by an asymmetrical arrangement between the upper electrodes E1, E3 and the lower electrodes E2, E4, i.e., between the corresponding fingers F, in particular, an arrangement where the fingers of at least one of the upper electrodes E1, E3 are staggered with respect to the fingers of at least one of the lower electrodes E2, E4 in the direction W.

The general structure of the transducer 10 is substantially similar to the one illustrated with reference to the previous figures, apart from the aforementioned staggered arrangement, as likewise similar may be the modalities of manufacture, for example using techniques of silk-screen deposition in stacked layers. From FIGS. 27-29 there may be appreciated, in fact, the different arrangement of the fingers F of the electrodes E: also in this case, the distance between the adjacent fingers of two different electrodes is smaller than the distance between two successive fingers of one and the same electrode, but the fingers F of an upper electrode are at least in part in a staggered position with respect to the fingers F of a lower electrode.

With reference, in particular, to FIG. 27, in various embodiments of this type, the adjacent fingers F1 and F3 that are closer to one another of the upper electrodes E1 and E3 extend (here in the longitudinal direction L) substantially at a first distance $D_1$ from one another, whereas the distance $D_2$ between two successive fingers F1 of the electrode E1 is greater than twice the distance $D_1$ (in the example, approximately three times $D_1$); also the successive fingers F3 of the electrode E3 are substantially at the distance $D_2$ apart. It should be noted that also the adjacent fingers F1 and F3 that are less close to one another of the upper electrodes E1 and E3 extend at a distance $D_3$ apart that is less than the distance $D_2$ (in the example, $D_3$ is approximately twice $D_1$). On the other side, the adjacent fingers F2 and F4 that are closer to one another of the lower electrodes E2 and E4 extend (here in the longitudinal direction L) substantially at the first distance $D_1$ from one another, and the successive fingers F2 of the electrode E2, respectively the successive fingers F4 of the electrode E4, are substantially at the distance $D_2$ apart. Also the adjacent fingers F2 and F4 that are less close to one another of the lower electrodes E2 and E4 extend substantially at the distance D3 apart.

What differentiates the arrangement of FIGS. 27-29 from that of FIGS. 19-20 and 24-26 is that each finger F3 of the upper electrode E3 is in a staggered position with respect to a respective finger F4 of the lower electrode E4, and each finger F1 of the upper electrode E1 is in a staggered position with respect to a respective finger F2 of the lower electrode E2, preferably with each finger F1 of the upper electrode E1 in a position substantially superimposed to, or aligned with, a respective finger F4 of the lower electrode E4. More in general, each finger F of one of the two upper electrodes E1 and E3 is in a position substantially superimposed to, or aligned with, a respective finger F of one of the two lower electrodes E2 and E4, whereas each finger F of the other one of the two upper electrodes E1 and E3 is in a position substantially staggered with respect to a respective finger F of the other one of the two lower electrodes E2 and E4. As has been said, in the example illustrated, the fingers F1 of the upper electrode E1 are in a position superimposed to, or aligned with, the fingers F4 of the lower electrode E4, whereas the fingers F3 of the upper electrode E3 are in a staggered position with respect to the fingers F2 of the lower electrode E2.

Also in this case, polarization of the piezoelectric layer 11 is obtained with a configuration of electrical connection of the various electrodes that differs from the configuration used when the piezoelectric transducer 10 is employed for detecting a shear stress.

In fact, FIG. 27 represents schematically the step of polarization of the transducer 10, or of the piezoelectric layer 11, during which the four electrodes E1, E2, E3, and E4 are electrically insulated from one another, and the potential difference is applied between one of the two upper electrodes—here the electrode E3, set at the positive potential (+)— and one of the two lower electrodes—here the electrode E2, set at the negative potential (−)— where the two electrodes to which the potential difference is applied are preferably those whose fingers F are in a staggered position with respect to one another (here the fingers F3 and F2 of the electrodes E3 and E2). Again, the arrows VP at the centre of the layer 11 represent by way of example the polarization vectors, determined by application of the potential difference between the electrodes E3 and E2. A signal corresponding to the shear stress would be obtained also by carrying out the polarization step between the electrodes E1 and E4 and then measuring the deformation between the electrodes E3 and E2, but there would be a greater effect on the signal from the normal compression, which, instead, it would in general be desirable to decouple.

The polarization vectors VP may have a different value in the presence of a different distance between the fingers F3 of the electrodes E3 set at the positive potential (+) and respective fingers F2 of the bottom electrodes E2 set at the negative potential (−); the layer 11 may have areas with different polarization.

FIG. 28 illustrates, instead, how, during effective use of the transducer 10, the electrodes E1-E4 are electrically connected in a configuration different from the one used during polarization of the layer 11. In particular, the four electrodes E1, E2, E3, and E4 are always electrically insulated from one another, and between the electrodes E1 and E4 the potential difference induced in the layer 11 following upon a shear stress is detected (in the non-limiting example illustrated, the electrode E1 detects the negative potential − and the electrode E4 detects the positive potential +). It will hence be appreciated that, preferentially, the electrodes E used for the purposes of detection of a shear stress are the electrodes, the fingers of which are in a position substantially superimposed, or aligned, to one another.

In this way, as exemplified in FIG. 29, a shear stress SS induced in the layer 11 in a direction transverse to the longitudinal direction L generates between the electrodes E1 and E4 a potential difference having a value proportional to the aforesaid shear stress SS. The variation of the polarization vector that generates a charge on the electrodes may be viewed as a rotation of the polarization vector caused by the shear stress.

In various examples of embodiment described previously, associated to the piezoelectric layer 11 are two upper comb-like electrodes E1 and E3 and two lower comb-like electrodes E2 and E4: however, in other embodiments, the number of comb-like electrodes could be greater and/or the number of upper electrodes and/or fingers could be different from the number of lower electrodes and/or fingers.

Of course, also the piezoelectric layer 21 of a transducer 20 must be previously subjected to polarization. In the case of the piezoelectric layer 21, the corresponding polarization axis PA extends in a direction (H) transverse to a plane identified by the layer 21, as represented in FIG. 13: in this case, the electrodes used during measurement coincide with those used during polarization.

In general, the direction of polarization is perpendicular to the piezoelectric layer 11 or 21 in the case where the polarization and measurement electrodes coincide.

As mentioned previously—see, for example, FIGS. 4 and 7—preferably associated to the sensor unit 8 is a connector CB for electrical connection to an external system, comprising a plurality of terminals C (FIG. 5), each having one end in electrical contact with a respective pad P provided on the body 8'. FIG. 22 exemplifies the case of eighteen pads P, and hence eighteen terminals C (four for each transducer 10, and two for each transducer 20), but evidently this number depends upon the number and type of piezoelectric transducers envisaged (whether with two or four or six electrodes, etc), possibly with some connections in common.

The connector CB may advantageously be exploited for connection to production equipment used for the purposes of polarization, i.e., with a first configuration of electrical connection in line with what has been described previously (see, for example, FIG. 19). Subsequently, upon installation of the device 1, the connector 5 and the wiring 5a may used for electrical connection of the transducers 10 and/or 20 to an external system that uses the corresponding detections, with a second configuration of electrical connection in line with what has been described previously (see, for example, FIG. 20).

Figure 30:
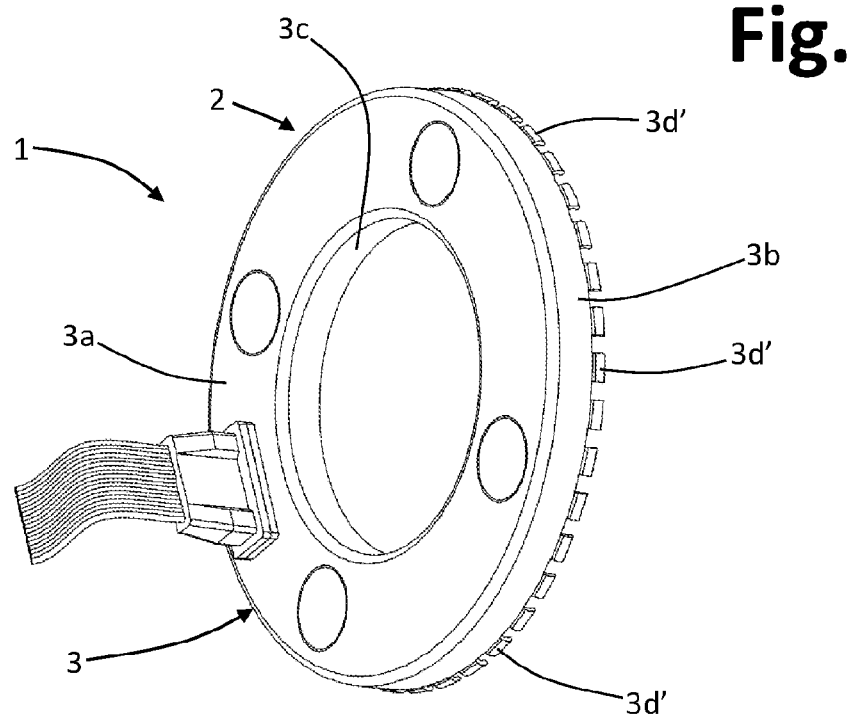
Figure 31:
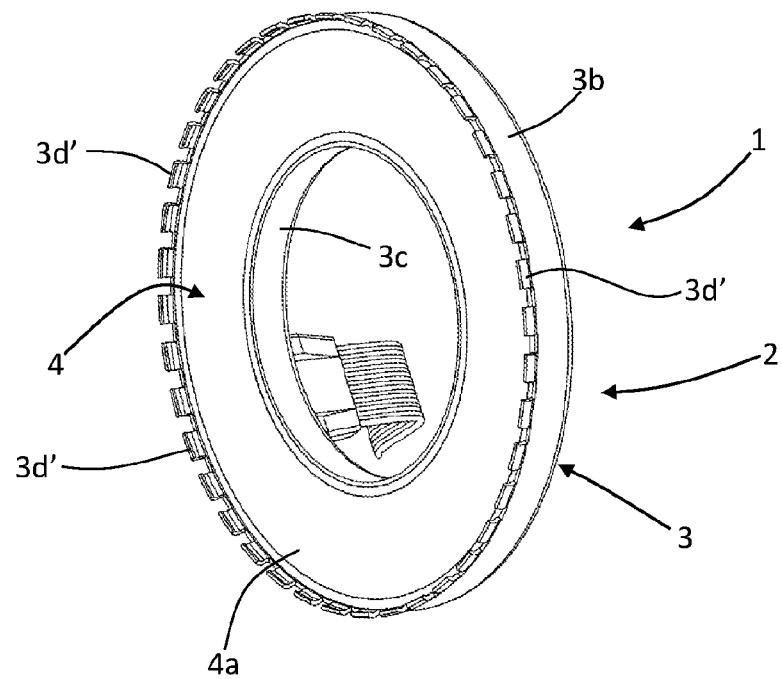

FIGS. 30-31 illustrate an embodiment in which the coupling edge of the housing body 2, instead of being a continuous edge, is defined by a series of tabs or teeth $3d'$, in particular projecting in an axial direction from the wall $3b$ of the lid 3. FIGS. 30-31 also illustrate the case of a wall of the housing body having a plurality of axial interruptions in order to define a plurality of flexible tabs, each defining a respective part of the coupling edge.

FIGS. 32-33 refer, instead, to a different embodiment, where the housing body 2 comprises two parts 3, 4 secured to one another via upsetting, i.e., bending of one or more portions of one body part on the other body part. In the example, the outer wall $3b$ of the lid 3 has recesses $3g$, on which the wall $3b$ defines tabs $3h$, which are bent back against the bottom wall $4a$ of the base 4. Preferably, also the inner wall $3c$ of the lid 3 has similar tabs $3i$ bent back against the wall $4a$ of the base 4.

Figure 34:
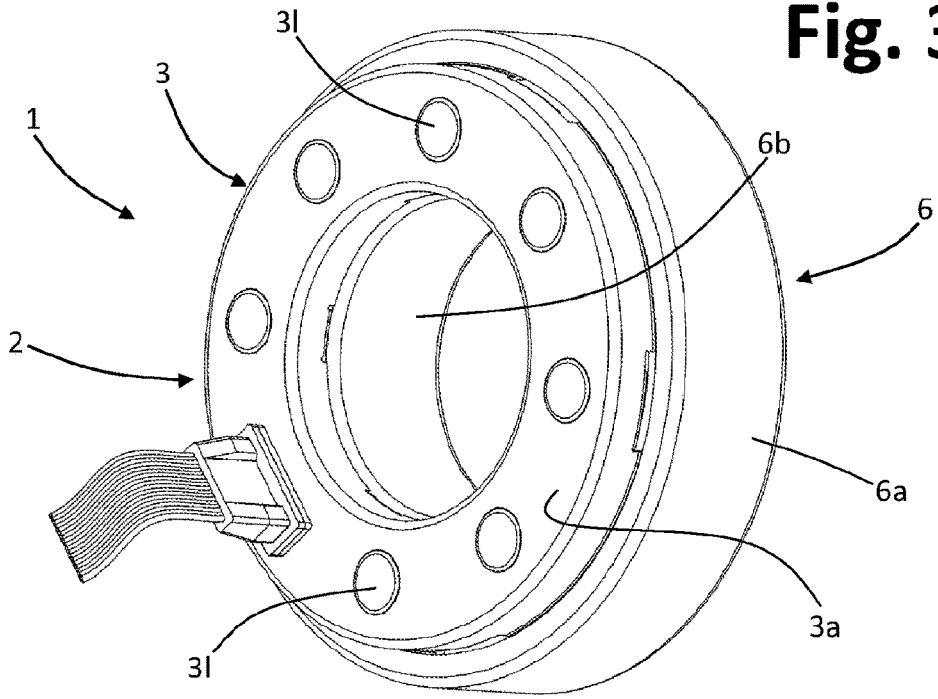
FIGS. 34 and 35 are schematic perspective views of a detection device according to further possible embodiments of the invention, secured to a corresponding bearing, FIG. 35 being a partial and sectioned view.

FIGS. 34 and 35 correspond to a variant embodiment, in which the elastic means that urge the floating body 7 towards the sensor unit 8 are constituted by elements distinct from the housing body 2. In this example, provided in the wall 3a of the lid 3 are embossings 3l facing the outside of the body 2 for positioning respective elastic elements, for example leaf springs or Belleville washers, one of which is designated by 3f' in FIG. 35.

Figure 36:
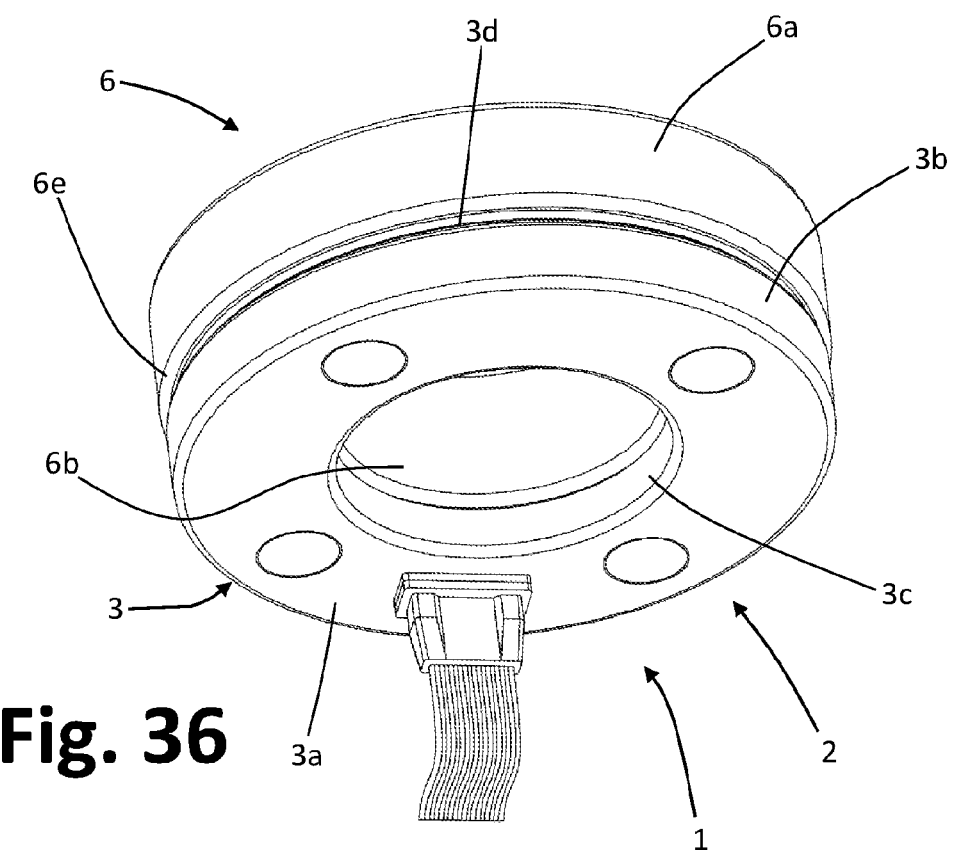
FIGS. 36 and 37 are schematic perspective views of a detection device according to further possible embodiments of the invention, secured to a corresponding bearing, FIG. 37 being a partial and sectioned view.
Figure 37:
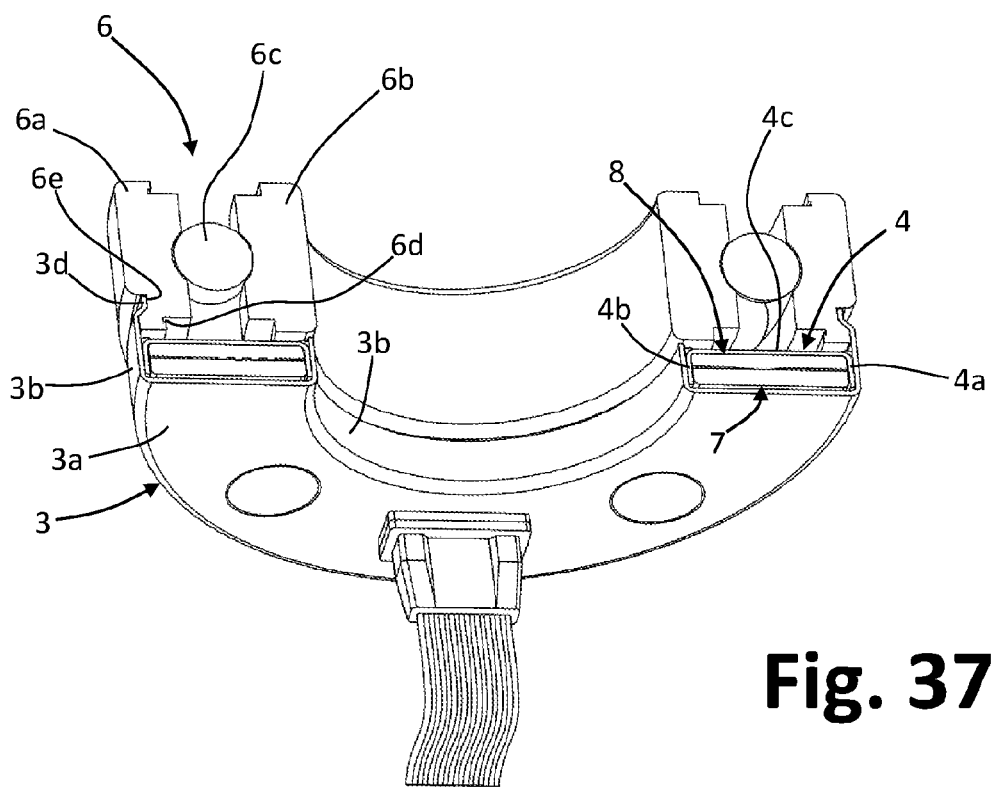

There has previously been exemplified the case of fixing of the housing body 2 at an inner peripheral surface of the ring 6a, but this does not constitute an essential characteristic. For this purpose, FIGS. 36-37 exemplify the case of a housing body shaped for coupling with the outer peripheral surface of the ring 6a, in particular within a corresponding groove or annular seat designated by 6e. For such a case, the outer wall 6a of the lid 3 may be higher than in the cases previously exemplified, and the coupling edge 3d modified accordingly; grooves of the type designated by 6e are provided in various bearings available on the market.

In various embodiments, the sensor means of the detection device according to the invention further comprise a sensor element on the housing body, prearranged for detecting an angular movement of the rotary ring of the bearing or of an element associated to the rotary ring and turning therewith. In embodiments of this type, it is hence possible to obtain also parameters corresponding to rotation of the bearing, such as velocity or acceleration. The aforesaid sensor element, which substantially belongs to an angular-position transducer, is preferably mounted on the sensor unit.

Embodiments of this type are exemplified in FIGS. 38-43. In the case illustrated, mounted on the body 8' of the sensor unit 8 is at least one rotation or angular-movement sensor, designated by 30, which is prearranged for detecting the rotation or angular movement of at least one excitation element, designated by 31, which is rotatable or angularly movable with the rotary ring 6b of the bearing 6.

In the example represented, the aforesaid rotatable element 31 is shaped like an annular disk and may hence be constituted a phonic wheel or the like, but this does not constitute an essential characteristic, the element 31 possibly being replaced by one or more discrete elements (for example, one or more small magnets) designed to excite the rotation sensor 30. The transducer or encoder used may, in fact, be of any type suited to the purpose, for example a capacitive or inductive encoder, or else a magnetic encoder, or else an optical encoder, in which case the rotation sensor 30 may be a proximity sensor, or else a magnetic sensor (for example, a Hall-effect or magnetoresistive sensor), or else an optical sensor, respectively.

In various preferential embodiments, the sensor 30 is a magnetic sensor, such as a Hall-effect sensor or a magnetoresistive sensor, for example in the form of electronic component with a body provided with electrical terminals, such as a component of the SMD (surface-mount device) type. In various embodiments, the sensor 30 comprises two magnetic-detection elements (for example, integrated in a single component or package), in particular provided with two respective terminals or outputs for respective signals, of the type designed to detect also the direction of rotation or of the angular movement. A magnetic sensor 30 designed for installation and/or soldering on the body 8' of the sensor unit 8 may also comprise at least one piezoelectric sensor 10 and/or 20.

Figure 38:
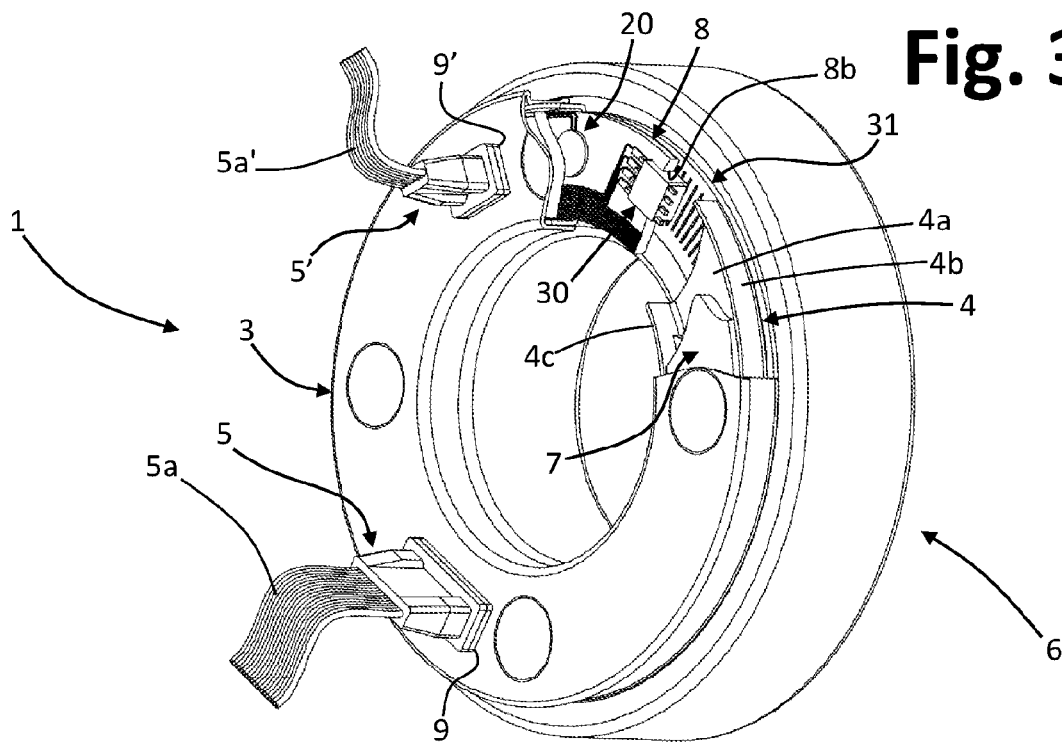
FIG. 38 is a schematic perspective view, partially sectioned, of a detection device according to further possible embodiments of the invention, secured to a corresponding bearing.
Figure 39:
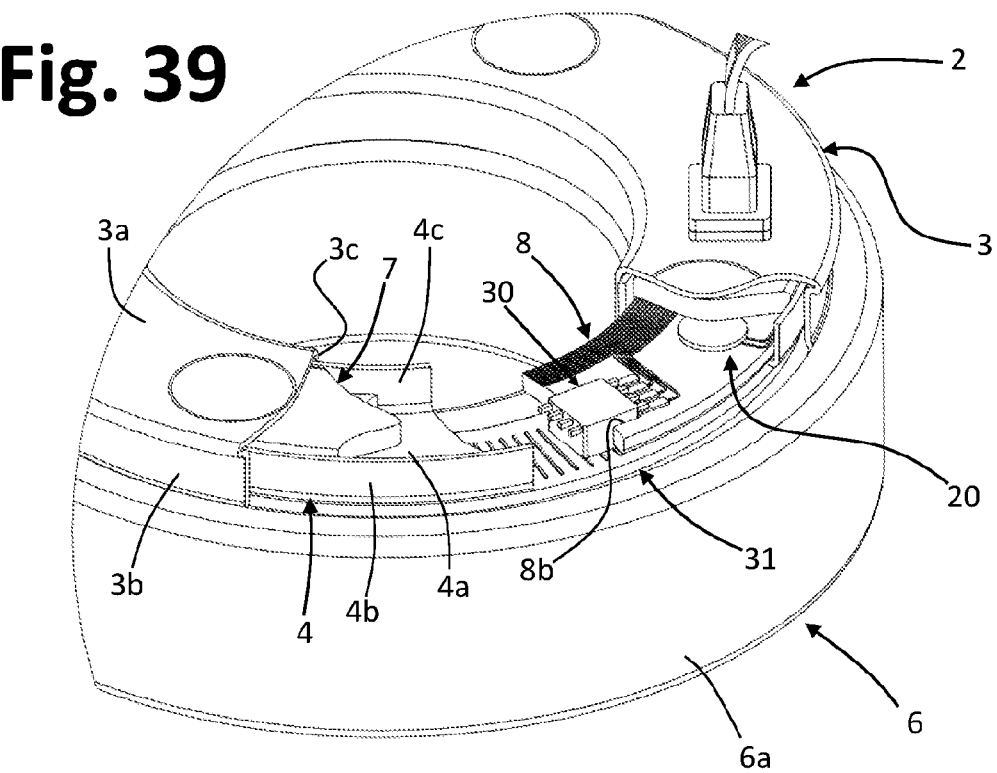
FIG. 39 is a detail of FIG. 38 at a larger scale.
Figure 42:
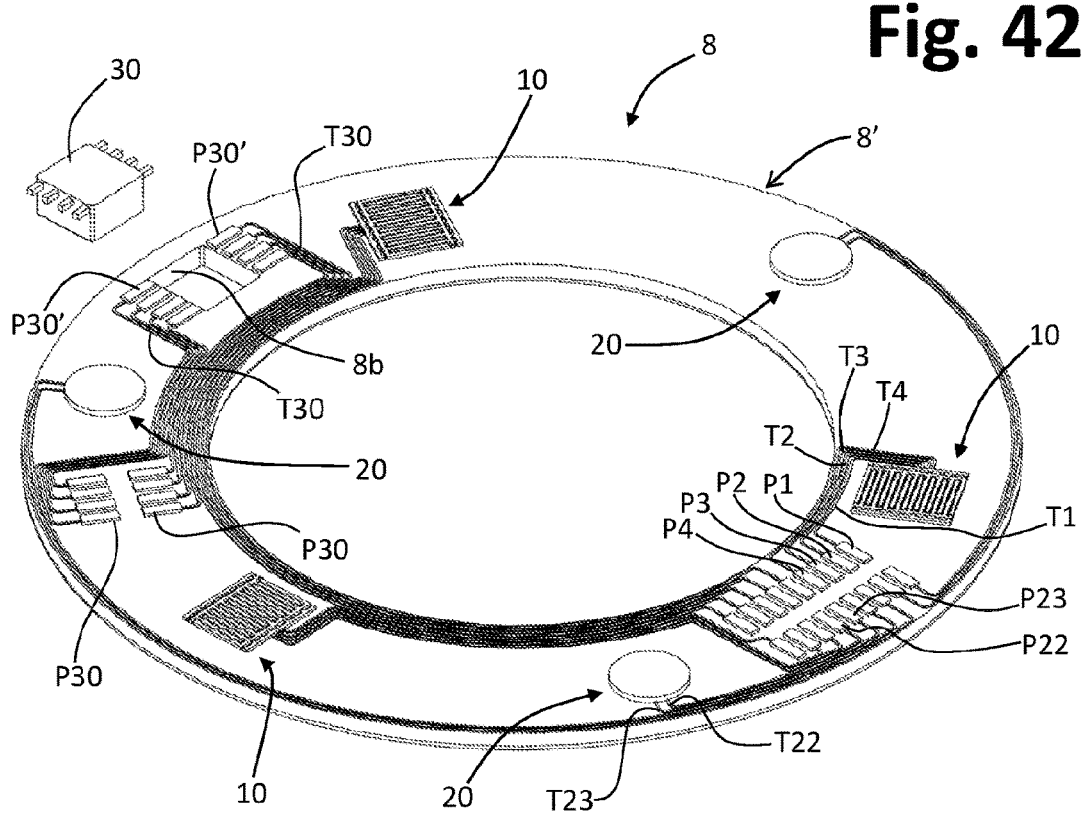
FIG. 42 is a partially exploded schematic perspective view of a sensor unit of a detection device of the type shown in FIG. 38.

The sensor 30 is mounted on the unit 8 preferably at a corresponding through opening, designated by 8b, for example in FIGS. 38, 39, and 42. A similar through opening, designated by 4d, for example in FIGS. 40-41, is defined in the housing body 2 in a corresponding position, here in the bottom wall 4a of the base 4. In this way, a sensitive part of the rotation sensor 30 can directly face the outside of the housing body 2, in particular the excitation element 31 carried by the rotary ring 6b of the bearing (the opening 4d might on the other hand not be indispensable, in the case of a base 4 made of non-metal material and of a sensor 30 of a capacitive or inductive or magnetic type).

In the non-limiting example represented (see, for instance, once again FIGS. 40-41), associated to the sensor unit 8 is a second connector CB' with corresponding terminals C', connected to pads P30 (see FIG. 42) defined at a first end of respective conductive connection tracks T30, on the second ends of these tracks there, instead, being defined pads P30' for connection of the rotation sensor 30.

For such a case, in various embodiments, the floating body 7 is provided with a second passage, designated by 7b in FIGS. 40 and 41, which is located where the connector CB' is to be mounted and is sized so as to prevent any mechanical interference between the floating body 7 and the connector. Also in this case, a similar passage 3e' is provided on the lid 3, where a corresponding frame 9' may be mounted, as has been described previously for the passage 3e and the frame 9 corresponding to the connector CB. Also in this case, to the connector CB' there can then be connected an external connector 5', with corresponding wiring 5a' for carrying the signals supplied by the sensor 30 to an external system.

It is in any case evident that, according to other embodiments (not illustrated), instead of the two connectors CB and CB', the sensor unit 8 may be provided with a single connector, for example a single connector CB, connected to which are all the conductive tracks/pads provided on the body 8', or the tracks/pads corresponding to the stress-sensor means 10 and/or 20 and the tracks corresponding to the rotation sensor 30.

The rotatable excitation element 31—which, as has been said, may be of various types according to the type of rotation sensor 30 used—is fixed to the rotary ring 6b of the bearing, or to an element turning therewith, in a position such that rotation of the element 31 can be detected by the sensor 30. In the case exemplified, the element 31 is mounted on the rotary ring 6b in a position facing the bottom of the housing body, or the wall 4a of the base 4, as may be seen, for example, in FIG. 43 so that—via the passages 8b of the body 8' and 4d of the base 4—the sensitive part of the sensor 30 in turn directly faces the excitation element 31.

Also in this case, a reversed configuration is possible with respect to the one represented, in the case where the stationary ring of the bearing is the inner ring (in which case the element 31 could be fixed to the outer ring 6a, and the device 1 fixed to the inner ring 6b).

Figure 43:
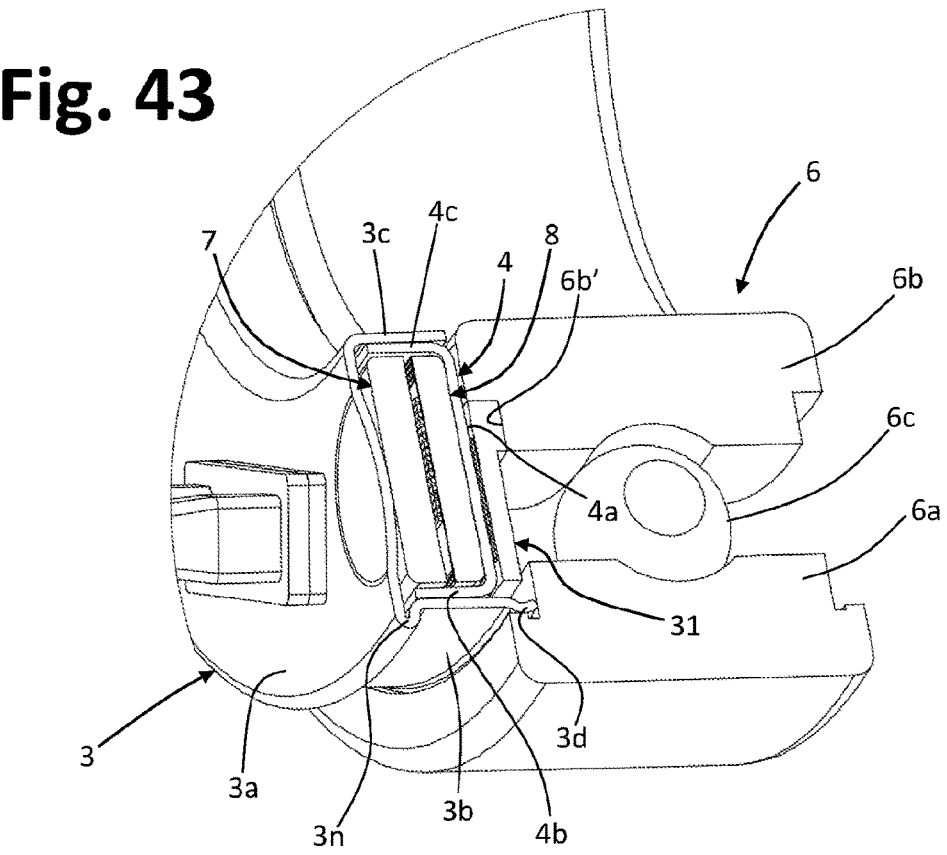
FIG. 43 is a partial and schematic sectioned perspective view of a detection device of the type shown in FIG. 38, secured to a corresponding bearing.

FIG. 43 highlights a possible mode of assembly of the excitation element 31, at a cavity or seat 6b' provided at the outer circumferential side of the ring 6b of the bearing. In the example of FIG. 43, the excitation element 31 extends substantially in a radial direction: however, in other embodiments, this element could also extend in an axial direction or a direction substantially parallel to or coinciding with the axis of rotation.

As has been explained, in various preferential embodiments, the housing body of the detection device according to the invention is secured mechanically to a stationary part of the bearing, in particular by means of a snap-action coupling or the like, in any case in such a way that any possible loads applied to the bearing are transferred also to the housing body. This fixing must necessarily be sturdy and reliable in order to prevent accidental decoupling between the device and the bearing.

For this reason, in the event where it were in any case necessary to separate the two parts in question (for example, for replacement or repair of a device 1) it is convenient to provide an extractor device, purposely configured for separating a detection device from a corresponding bearing. A possible embodiment of such an extractor device is illustrated schematically in FIGS. 44-46.

The extractor device, designated as a whole by 40, comprises a supporting body 41, preferably of a circular shape, having a peripheral region at which a plurality of axial arms 42 are hinged at an intermediate point of the latter, in particular distributed substantially along a circumference. Designated by 43 are some of the pins used for hinging a respective arm 42 to the intermediate body 41.

The device 40 further comprises at least one end body. In various embodiments, the supporting body 41 is set axially between a first end body 44 and a second end body 46, here defined for simplicity also as "lower body" and "upper body", respectively; for this reason, with reference to the example illustrated, the supporting body 41 will also be defined for simplicity as "intermediate body".

The lower body 44 is not strictly indispensable. If present, the lower body 44 is shaped for resting on the inner ring of a bearing 6 and may present, for this purpose, a tip 44a having a generally flared shape and/or a flange part 44b, of dimensions such as to be able to rest on just the inner ring of the bearing. In the example, fixed centrally with respect to the lower body 44 is an at least partially threaded connection rod 45, which extends in an axial direction and engaged on which are both the intermediate body 41 and the upper body 46. For this purpose, the bodies 41 and 46 each have a respective central hole 41a and 46a provided with female thread. As may be appreciated, in this way, the bodies 41 and 46 can be displaced along the connection rod 45, i.e., moved towards or away from the lower body 44 (i.e., the lower end of the rod 45), simply by rotating them with respect to the rod 45.

The upper body 46 preferentially has at least one body portion 46b, which is shaped for facilitating rotation thereof on the rod 45 and, for example, has a hexagonal profile. The upper body 46 has at least an outer-surface portion 46c that is generally flared or frustoconical, in particular in its part facing the intermediate body 41.

The arms 42 are hinged to the intermediate body 41 in positions equidistant with respect to the rod 45 and each have a first end portion 42a, here also referred to as "lower portion", defining a respective tooth, which can engage with an outer circumferential surface of the housing body of the device 1. The opposite end portion of the arms 42, designated by 42b and here also referred to as "upper portion", is, instead, able to co-operate with the aforesaid frustoconical surface 46c of the upper body 46.

Figure 44:
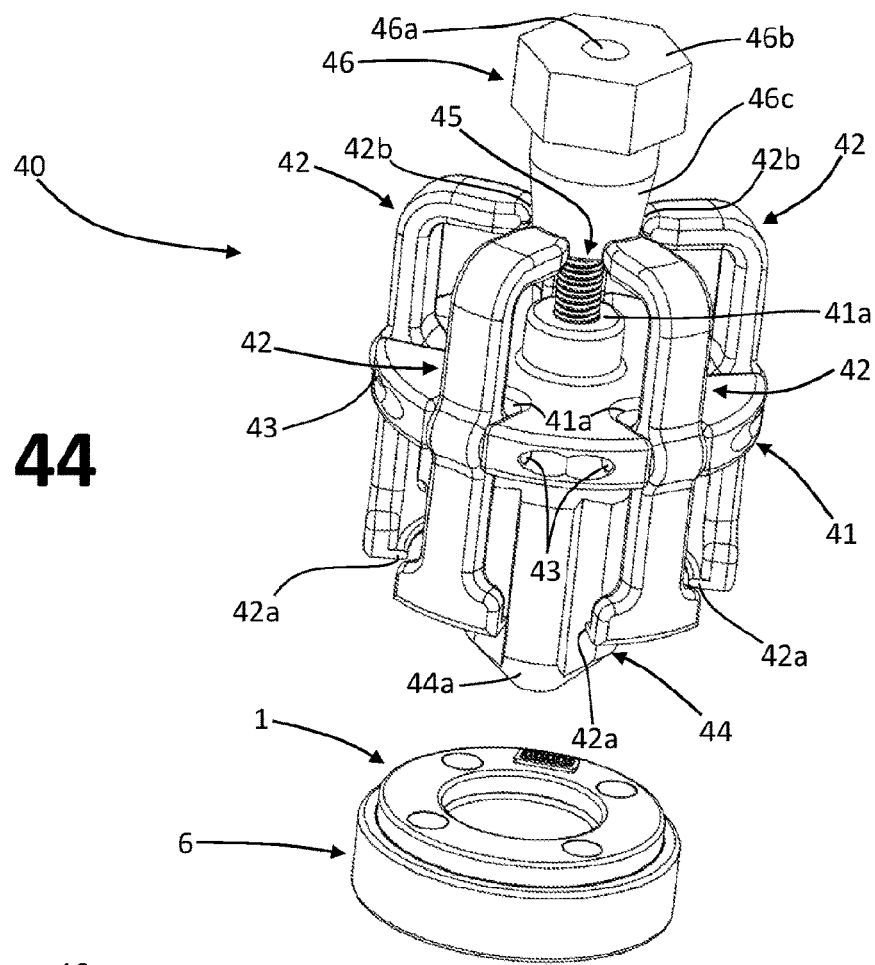
FIGS. 44 and 45 are schematic perspective views aimed at exemplifying a possible mode of use of an extractor device devised for separating a detection device from a corresponding bearing.
Figure 45:
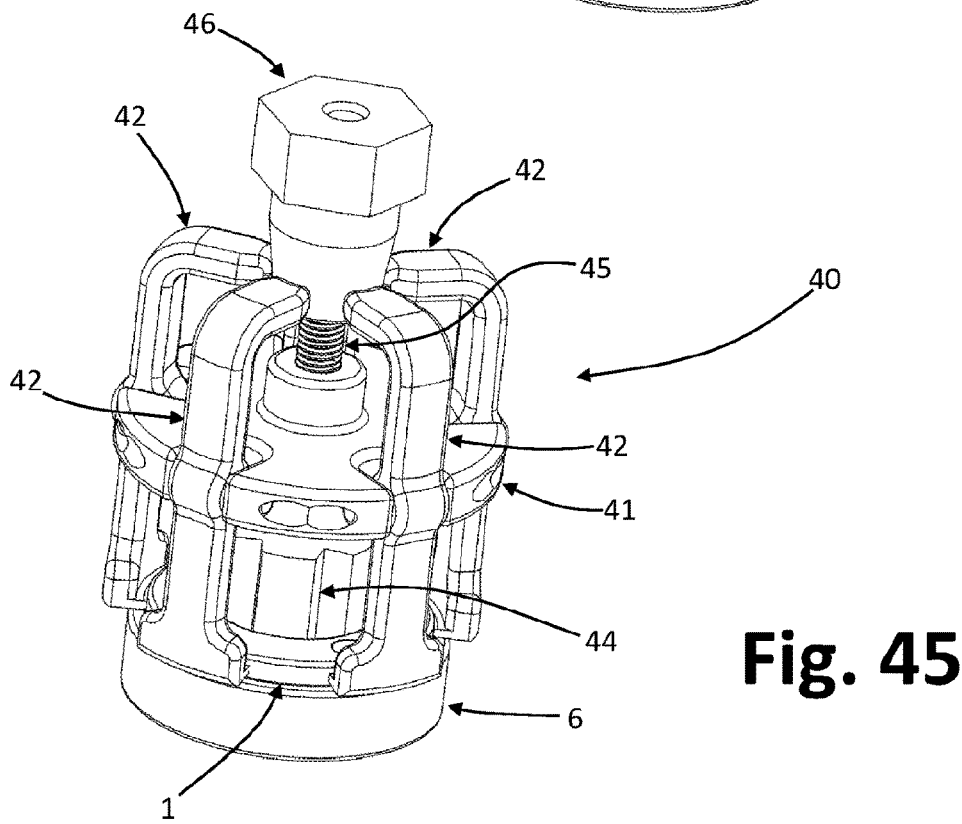
Figure 46:
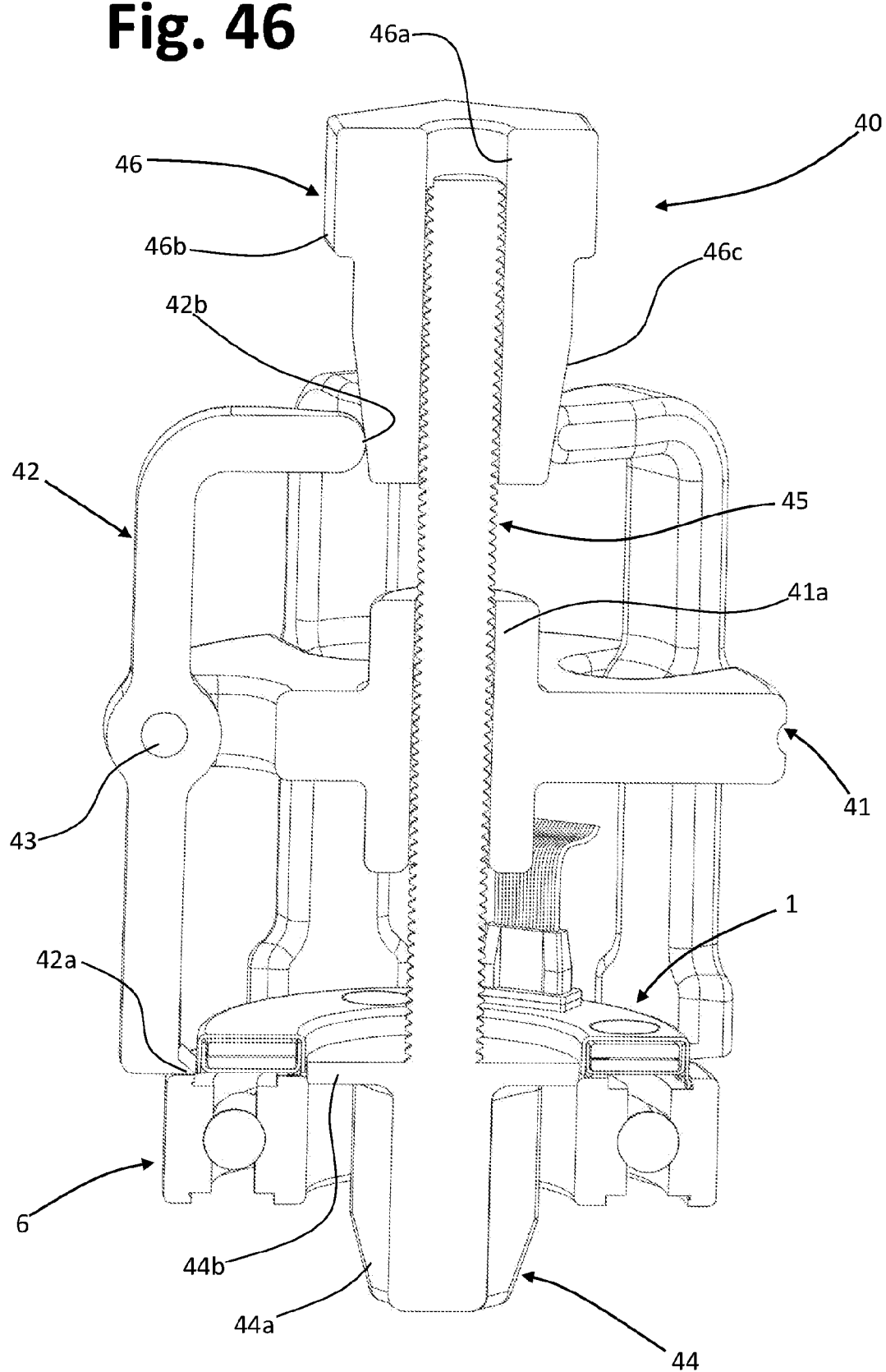
FIG. 46 is a schematic cross-sectional view of an extractor device of the type shown in FIGS. 44-45.

For the purposes of use, the upper body 46 is unscrewed along the rod 45 until it releases the arms 42, or in any case gets them to open in their lower part to an extent such that a device 1 can be received between the lower ends 42a (for this purpose, it may even be sufficient to bring the upper ends 42b into a position corresponding to an area of smaller diameter of the frustoconical surface 46c of the top body 46, as may be seen, for example, in FIGS. 44-46, and in this position the upper ends 42b will be closer to the rod 45 than the lower ends 42a).

Next, the extractor device 40 is centred on the bearing 6; for this purpose, if the lower body 44 is present, it rests on the inner ring of the bearing 6, exploiting the presence of the central passage of the detection device 1, which, as has been said, preferably has a diameter larger than that of the central passage of the inner ring of the bearing. This positioning is rendered possible by the fact that the lower ends 42a of the arms 42 are spread or opened out, such as not to interfere mechanically with the device 1. This step is represented schematically in FIG. 44.

The intermediate body 41 can then be screwed or unscrewed along the rod 45 in order to adjust the position thereof, i.e., bring the teeth defined by the lower portions 42a of the arms into a position substantially corresponding to the front of the outer ring of the bearing (i.e., to the corresponding exposed area of the outer circumferential wall of the housing body of the device 1), as exemplified in FIG. 45.

With the extractor device 40 in the above position, the upper body 46 can then be screwed on the rod 45, i.e., displaced along it so as to approach to the intermediate body 41 (or, more in general, towards the bottom end of the rod 45). As may be appreciated, in this way, the upper body 46 operates substantially like a wedge; i.e., sliding of its frustoconical surface against the upper ends 42b of the arms 41 causes the aforesaid upper ends to move further away from the rod 45 and at the same time, on the opposite side, causes the lower ends 42a of the arms 42 to move closer to the rod 45, with the corresponding teeth that can engage with the outer circumferential surface of the housing body of the device 1, causing it to bend slightly towards the axis of the bearing 6 and thus releasing the coupling edge of the housing body from the corresponding seat on the outer ring of the bearing (see, for reference, FIGS. 6 and 7, where the coupling edge of the housing body 2 is designated by 3d and the corresponding seat on the outer ring 6a of the bearing is designated by 6d), the device 1 being possibly then separated manually from the bearing 6. In an alternative version, the lower ends 42a of the arms 42, having an inclined-plane or wedge shape, can progressively penetrate between the bearing and the detection device, while the upper body 46 is turned, bringing about mutual separation.

It will emerge clearly that the embodiment presented by way of example for the extractor device 40 may undergo various modifications that will appear evident to the person skilled in the art, without prejudice to the functions described. For instance, the threaded rod 45 could be fixed with respect to the upper body 46, and the lower body 44 could have a central hole provided with female thread or else could be omitted, and the intermediate body 41 could also be associated to the rod 45 in a fixed or non-adjustable position. The device 40 could also be modified in such a way that the lower ends of the arms 42 engage with the inner circumferential wall of the housing body of the device 1 if this wall defines the coupling edge used for anchoring the housing body to the bearing (hence, in this case, the extractor device will be devised for getting the lower ends of the arms to move away from one another so as to cause bending outwards of the aforesaid circumferential wall, and hence release from the bearing).

In various embodiments, the housing body of the detection device according to the invention defines one or more surface elements aimed at facilitating gripping of the body itself, for example for the purposes of separation thereof from the bearing, with the surface element or elements that is/are preferably defined at at least one circumferential wall of the housing body. Examples of this type are shown in FIGS. 47-50.

Figure 47:
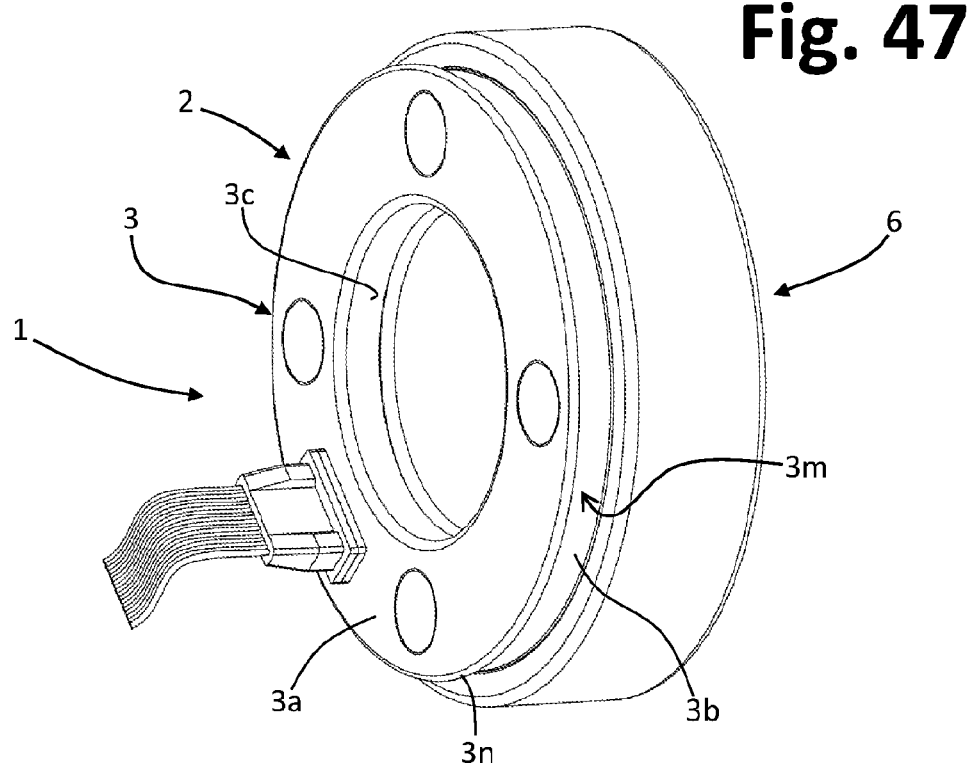
FIGS. 47 and 48 are schematic perspective views of a detection device according to further possible embodiments of the invention, secured to a corresponding bearing, FIG. 48 being a partial and sectioned view.
Figure 48:
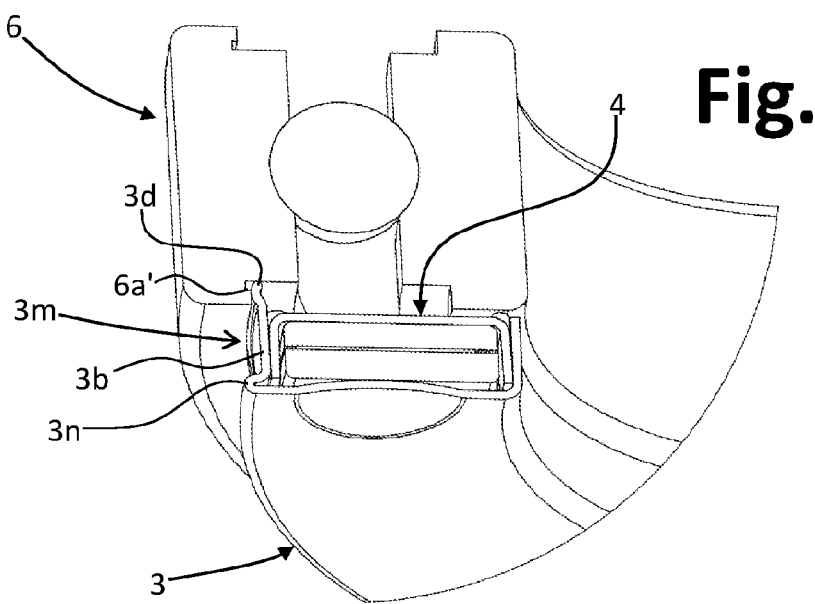
Figure 49:
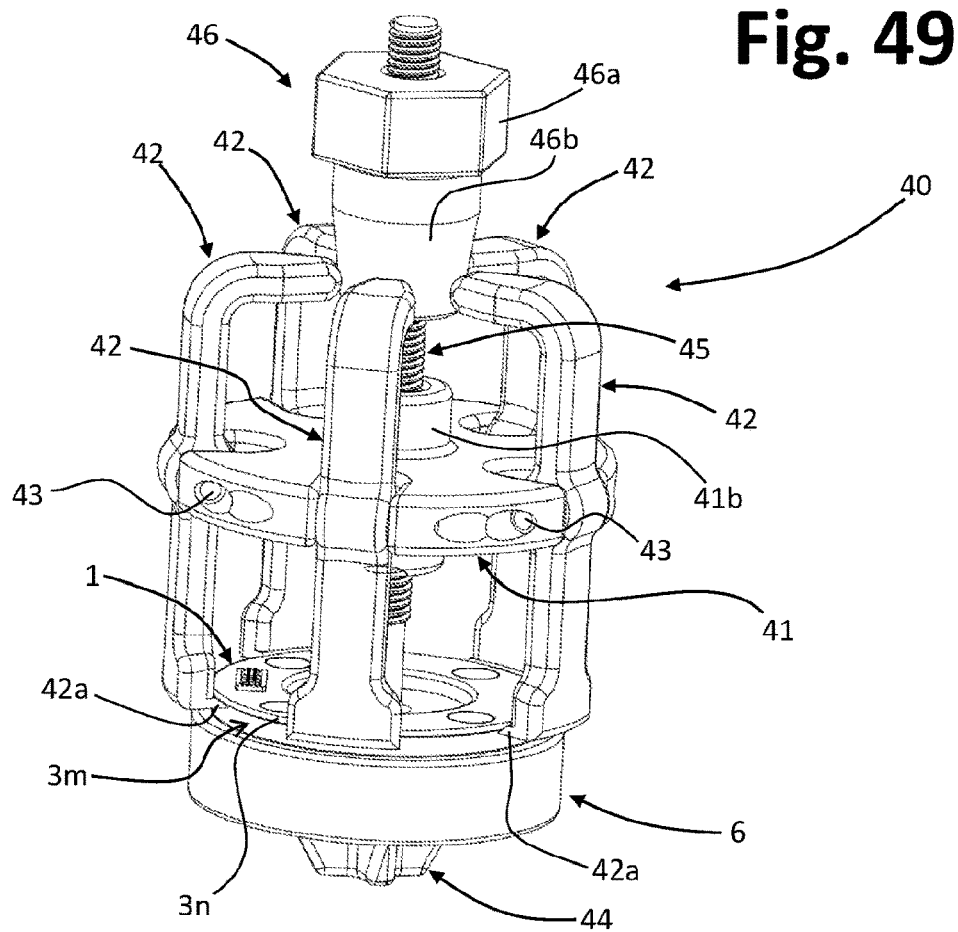
FIG. 49 is a schematic perspective view aimed at exemplifying a possible mode of use of an extractor device of the type shown in FIGS. 45-46 for separating a detection device of the type shown in FIGS. 48-49 from a bearing.

FIGS. 47-48 highlight, for example, how, in possible embodiments, the housing body 2 may be shaped to define an annular relief or step 3*n* and/or an annular recess 3*m*, at a circumferential wall thereof, here an outer wall, and more in particular the outer wall 3*b* of the lid 3 (such an embodiment is visible also in FIG. 43). In the example, the step 3*n* and the recess 3*m* are both obtained by deforming the wall 3*b* during production of the lid 3 in the way shown. As may be appreciated, the presence of the step 3*n* and/or of the recess 3*m* facilitates gripping and subsequent separation of the device 1 from a bearing 6, in particular when it is necessary to exert a traction (pulling action) on the former relative to the latter, such as a traction or force in the axial direction, for example using an extractor device 40, as in FIG. 49 (where the tooth-shaped ends 42*a* of the arms 42 can engage in the recess 3*m*, underneath the step 3*n*).

Figure 50:
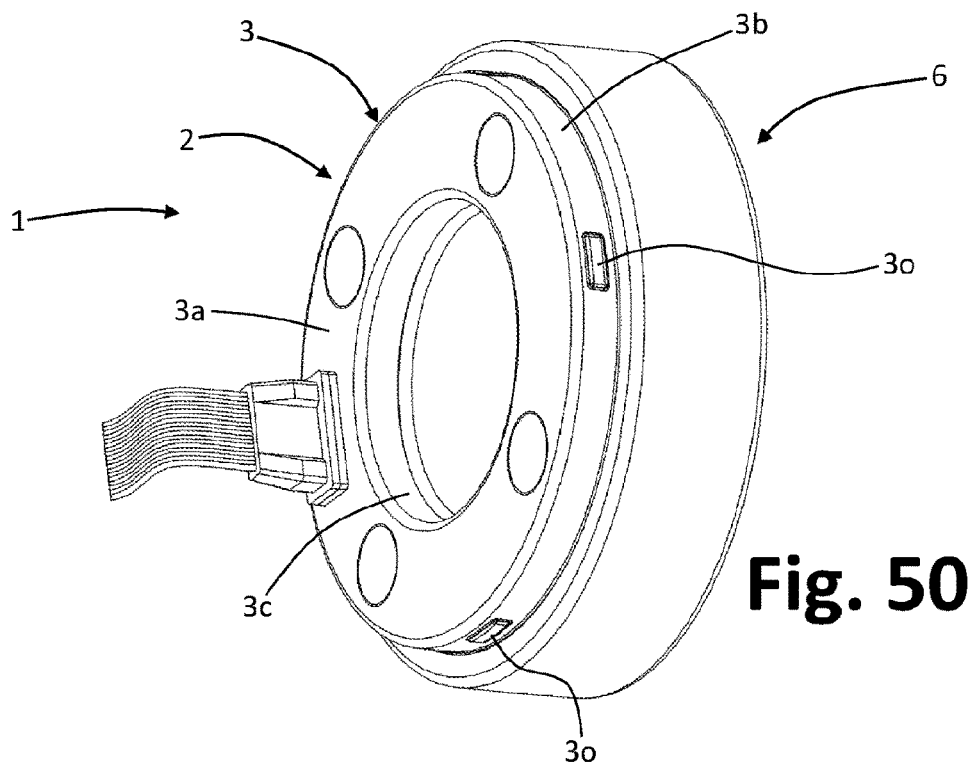
FIG. 50 is a schematic perspective view of a detection device according to further possible embodiments of the invention, secured to a corresponding bearing.

FIG. 50 exemplifies, instead, the case of provision of surface embossings 3*o*, facing radially outwards, which are distributed along the circumference of a peripheral wall of the housing body 2, here an outer wall, and more in particular the outer wall 3*b* of the lid 3. As may be appreciated, also in this case, the embossings 3*o* facilitate gripping and subsequent separation of the device 1 from a bearing 6, in particular when it is necessary to exert a traction on the former relative to the latter.

From what has been described, it may be appreciated how implementation and operation of the detection device according to the invention are simple and reliable.

As has been seen, preferentially provided on the sensor unit are a number of piezoelectric transducers, which make it possible to obtain signals of relatively high potential difference or voltage albeit in the presence of minimal deformations. The transducers may be appropriately distributed according to the detection requirements, and may comprise, for example, two transducers that are designed to detect mutually orthogonal shear stresses, in particular stresses in two directions parallel to the detection surface, and possibly a piezoelectric pressure transducer, in particular for detecting forces in a direction orthogonal to the detection surface. In principle, with a normal-stress transducer of the type designated by 20 and at least two shear-stress transducers of the type designated by 10 (for example, two transducers 10 that are the same as one another but oriented at 90° with respect to one another) it is possible to reconstruct a three-dimensional mapping of the stresses to which the bearing is subjected. Thanks to the presence of the floating body, the piezoelectric transducers proposed enable detection of extremely limited stresses, i.e., displacements of the floating body of the order of nanometres.

In fact, a substantial advantage of the preferred solution is represented by the fact that the detection system proposed enables detection of stresses in bearings, in particular rolling bearings, distinguishing also a directionality in the stress. In this regard, it is to be noted that traditional diagnostics of rolling bearings may also be made by detecting generic vibrations of the housing of the bearing, without being able, however, to identify precisely the spatial directionality thereof: even though the overall level of the vibration may be used for evaluating deterioration of the bearing, in particular for detecting non-cyclic faults, it may not be sufficient for identifying faults or improper uses at an initial stage. Cyclic faults, which may arise in the inner ring, in the outer ring, in the rolling bodies, or in the cage of the bearing, produce components of vibration at specific frequencies. These frequencies are a function of the geometry of the bearings and of the velocity of rotation and can be identified via analysis of vibrations in the frequency domain. The preferential solution proposed according to the invention makes it possible to add to this type of analysis spatial directionality, identifying, for example, a load applied in an improper way.

A spectral analysis in a number of dimensions made in real time, with a sensorized bearing-support device according to the invention, may prove particularly useful in order to have available information on the dynamics of a mechanical system associated to a bearing, for example in a motor vehicle (a stability-control system, a braking system, etc.) or in other contexts (electric-motor drives, industrial apparatuses, electrical household appliances, etc.).

Another advantage of the detection device described, according to preferential embodiments, is represented by the fact that the at least one shear-stress transducer can be prearranged, right from the start, with a given structure of the electrodes, which is exploited both during production, for the purposes of polarization of the material, in a first configuration of electrical connection, and subsequently also during final use for purposes of detection, in a second configuration of electrical connection. In this way, there is no longer the problem of having to provide in a first manufacturing step the polarization electrodes and in a subsequent manufacturing step the detection electrodes; i.e., it is not necessary to resort to complicated assembly operations and replacements of electrodes, which is typical, instead, of the prior art (see, for example, Marcelo Areias Trindade, et al., "*Evaluation of effective material properties of thickness-shear piezoelectric macro-fibre composites*", in Proceedings of COBEM 2011, 21st International Congress of Mechanical Engineering, Oct. 24-28, 2011, Natal, RN, Brazil). The invention hence also affords a simplification of the equipment and/or of the production processes.

The preferred process of production of the at least one shear-stress transducer, based upon successive deposition of layers of material, preferably with screen-printing techniques, makes it possible to obtain in a simple way and at a low cost a very compact sensor unit, with miniaturization of the corresponding sensor means. The fact that the sensor means may be formed on, or in any case associated to, a purposely provided substrate that is configured as part distinct from the housing body of the device facilitates production of the sensor means and reduces the risks linked to damage thereof when the housing body necessarily has to undergo significant mechanical stresses during its installation on a bearing.

It is clear that numerous variations may be made by the person skilled in the art to the device described by way of example, without thereby departing from the scope of the invention as defined by the ensuing claims. It is likewise clear that individual characteristics disclosed with reference to embodiments described previously may be combined with one another in other embodiments.

As has been mentioned, the substantially rectilinear shape of the fingers F, albeit preferable, does not constitute an essential characteristic. The fingers could, in fact, have a development distinguished by stretches that are curved and/or angled with respect to the longitudinal direction L, such as S-shaped or zigzag-shaped electrodes.

The distances mentioned in the examples previously provided, such as the distances $D_1$ and/or $D_2$ and/or $D_3$, are to be understood preferential but non-limiting; i.e., the distances between the fingers of the electrodes and/or the corresponding alignment or staggering of the above elements could be different from those shown to by way of example of example. In the non-limiting examples provided, the polarization and the shear-stress detections have been described with reference to the fingers F, which extend in one and the same direction (here the longitudinal direction L). However, also other portions of the electrodes E could contribute to detection, such as the portions D of the electrodes that join the fingers F, in particular in the case of shear stresses having at least one component in the direction of extension of the fingers (as in the case of FIG. 23). More in general, in various embodiments, the electrodes E may envisage both first portions F that extend in a first direction (here the length direction L) and second portions D that extend in a direction transverse to the aforesaid first portions F (herein the width direction W), with the aforementioned portions D and F of the electrodes E that can participate in polarization and/or in measurement.

The electrodes could be shaped so as to extend, instead of in at least one of a longitudinal direction (L) and a width direction (W) of the layer of piezoelectric material 11, in a direction angled or diagonal with respect to the above two directions.

In various preferred embodiments of the detection device according to the invention, the signals generated by the at least one piezoelectric sensor provided are supplied directly to a corresponding electrical connector so as to be detected by an external system (for example, a control unit), thus avoiding the need to supply the device electrically. However, in further possible embodiments (for example those in which an angular-position transducer is additionally provided), the sensor unit 8 may include a circuit arrangement (e.g., on the body 8' itself), for example for amplification and/or processing and/or transmission of the signals; in this case, the aforesaid circuit arrangement will preferentially comprise a corresponding electrical supply stage for the amplification and/or processing and/or transmission components, it remaining in any case understood that the at least one piezoelectric sensor provided on the sensorized base does not in any case require electrical supply.

The features listed below regard preferred embodiments of the piezoelectric transducers comprising at least four electrodes described previously.

1. A piezoelectric transducer, wherein the portions or fingers (F1, F3) of the first and third electrodes (E1, E3) extend at least in the longitudinal direction (L) substantially at a first distance ($D_1$) from one another, and the portions or fingers (F1) of the first electrode (E1), respectively, the portions or fingers (F3) of the third electrode (E3), are at a distance ($D_2$) apart that is substantially not less than twice the first distance ($D_1$), preferably substantially twice the first distance ($D_1$), the portions or fingers (F2, F4) of the second and fourth electrodes (E2, E4) extend at least in the longitudinal direction (L) substantially at the first distance ($D_1$) from one another, and the portions or fingers (F2) of the second electrode (E2), respectively, the portions or fingers (F4) of the fourth electrode (E4), are at a distance apart ($D_2$) that is substantially not less than twice the first distance ($D_1$), preferably substantially twice the first distance ($D_1$); and preferably each portion or finger (F1) of the first electrode (E1) is in a position substantially superimposed ro, or aligned with, a respective said portion or finger (F2) of the third electrode (E2), and each portion or finger (F3) of the third electrode (E3) is in a position substantially superimposed to, or aligned with, a respective said portion or finger (F4) of the fourth electrode (E4).

2. The piezoelectric transducer as per point 1, wherein the first and third electrodes (E1, E3), or the respective portions or fingers (F1, F3), are electrically connected together (+), and the second and fourth electrodes (E2, E4), or the respective portions or fingers (F2, F4), are electrically connected together (−) and electrically insulated from the first and third electrodes (E1, E3) in such a way that a shear stress (SS) induced in the layer of piezoelectric material (11) at least in the longitudinal direction (L) will generate between the first and third electrodes (E1, E3), on one side, and the second and fourth electrodes (E2, E4), on the other side, a potential difference having a value proportional to said shear stress (SS).

3. A piezoelectric transducer, wherein:
the portions or fingers (F1, F3) of the first and third electrodes (E1, E3) extend in the longitudinal direction (L) substantially at a first distance ($D_1$, $D_3$) from one another, the portions or fingers (F1) of the first electrode (E1) being at a second distance ($D_2$) apart that is greater than twice the first distance ($D_1$, $D_3$), and the portions or fingers (F3) of the third electrode (E3) being substantially at the second distance ($D_2$) apart, the portions or fingers (F2, F4) of the second and fourth electrodes (F2, F4) extend in the longitudinal direction (L) substantially at the first distance ($D_1$, $D_3$) from one another, the portions or fingers (F2) of the second electrode (E2), respectively the portions or fingers (F4) of the fourth electrode (E4), being substantially at the second distance ($D_2$) apart.

4. The piezoelectric transducer as per point 3, wherein:
each said portion or finger (F1) of the first electrode (E1) is in a position substantially superimposed to, or aligned with, a respective said portion or finger (F2) of the second electrode (E2), and each said portion or finger (F3) of the third electrode (E3) is in a position substantially superimposed to, or aligned with, a respective said portion or finger (F4) of the fourth electrode (E4); or else each said portion or finger (F1) of one of the first and third electrodes (E1, E3) is in a position substantially superimposed to, or aligned with, a respective said portion or finger (F2) of one of the second and fourth electrodes (E2, E4), and each said portion or finger (F3) of the other one if the first and third electrodes (E1, E3) is in a position substantially staggered with respect to a respective said portion or finger (F4) of the other one of the second and fourth electrodes (E2, E4).

5. The piezoelectric transducer as per point 4, wherein:
each said portion or finger (F1) of the first electrode (E1) is in a position substantially superimposed to, or aligned with, a respective said portion or finger (F2) of the second electrode (E2), and each said portion or finger (F3) of the third electrode (E3) is in a position substantially superimposed to, or aligned with, a respective said portion or finger (F4) of the fourth electrode (E4), and the first and third electrodes (E1, E3), or the respective said portions or fingers (F1, F3), are electrically connected together (+), and the second and fourth electrodes (E2, E4), or the respective said portions or fingers (F2, F4), are electrically connected to together (−) and electrically insulated from the first and third electrodes (E1, E3) in such a way that a shear stress (SS) induced in the layer of piezoelectric material (11) in a direction (W) transverse to the longitudinal direction (L) will generate between the first and third electrodes (E1, E3), on one side, and the second and fourth electrodes (E2, E4), on the other side, a potential difference having a value proportional to said shear stress (SS); or else each said portion or finger (F1) of one of the first and third electrodes (E1, E3) is in a position substantially superimposed to, or aligned with, a respective said portion or finger (F2) of one of the second and fourth electrodes (E2, E4), and each said portion or finger (F3) of the other one of the first and third electrodes (E1, E3) is in a position substantially staggered with respect to a respective said portion or finger (F4) of the other one of the second and fourth electrodes (E2, E4), and the first and third electrodes (E1, E3), or the respective said portions or fingers (F1, F3), are electrically insulated from one another, and the third and fourth electrodes (E3, E4), or the respective said portions or fingers (F3, F4), are electrically insulated from one another and with respect to the first and third electrodes (E1, E3), in such a way that a shear stress (SS) induced in the layer of piezoelectric material (11) in a direction (W) transverse to the longitudinal direction (L) will generate between one of the first and third electrodes (E1, E3), on one side, and one of the second and fourth electrodes (E2, E4), on the other side, a potential difference having a value proportional to said shear stress (SS), the one of the first and third electrodes (E1, E3) and the one of the second and fourth electrodes (E2, E4) preferably being the electrodes whose said portions or fingers are in a position substantially set on top of, or aligned to, one another.

6. A method for manufacturing a piezoelectric transducer, comprising the steps of:
i) forming the piezoelectric transducer (10), with the first electrode (E1) and the at least one third electrode (E3, E5), or the respective said portions or fingers, at least in part on the first major face (11a) of the layer of piezoelectric material (11), and with the second electrode (E2) and the at least one fourth electrode (E4, E6), or the respective said portions or fingers, at least in part on the second major face (11b) of the first layer of piezoelectric material (11);
ii) obtaining a polarization of the layer of piezoelectric material (11), by applying a potential difference between:
at least one of the first electrode (E1) and the at least one third electrode (E3, E5), or the respective said portions or fingers, on one side, and
at least one of the second electrode (E2) and the at least one fourth electrode (E4, E6), or the respective said portions or fingers, on the other side,
wherein step ii) is carried out with a first configuration of electrical connection of the electrodes, or of the respective said portions or fingers, that differs from a second configuration of electrical connection of the electrodes, or of the respective said portions or fingers, which is used when the piezoelectric transducer (10) is subsequently employed for detecting a shear stress.

The invention claimed is:

1. A bearing detection device, comprising:
a housing body prearranged for being fixed to a stationary ring of a bearing; and
a detection arrangement on the housing body, comprising sensor means, which include at least one piezoelectric transducer,
wherein the detection arrangement comprises:
at least one floating body, mounted on the housing body and suitable for mechanically transmitting vibrations of the bearing,
at least one sensor unit, mounted in a substantially stationary position on the housing body, the at least one sensor unit having at least one detection surface which is configured for receiving thereon, directly or via interposition of at least one further element, a corresponding surface of the at least one floating body,
and wherein the at least one piezoelectric transducer defines at least part of the detection surface and is configured for generating an electrical potential difference that is substantially proportional to the magnitude of a stress or force exerted by the at least one floating body on the at least one piezoelectric transducer.

2. The device according to claim 1, also comprising at least one elastic element prearranged for pushing the at least one floating body towards the at least one sensor unit, or vice versa, in a direction at least approximately parallel to an axis of rotation of the bearing.

3. The device according to claim 1, wherein the at least one piezoelectric transducer comprises a layer of piezoelectric material which extends at least in a longitudinal direction and a transverse direction, and at least one first electrode and one second electrode, between which the layer of piezoelectric material extends at least partially.

4. The device according to claim 3, wherein:
the first electrode and the second electrode of the at least one piezoelectric transducer each have a plurality of portions or fingers that extend at a first major face and a second major face of the layer of piezoelectric material, respectively; and/or
the at least one piezoelectric transducer comprises at least one third electrode and one fourth electrode, which extend at a first major face and a second major face of the layer of piezoelectric material, respectively.

5. The device according to claim 4, wherein:
the at least one piezoelectric transducer comprises the first electrode, the second electrode, the third electrode, and the fourth electrode; and
the third electrode has respective portions or fingers that are in a configuration interdigitated or alternating with the portions or fingers of the first electrode, and the fourth electrode has respective portions or fingers that are in a configuration interdigitated or alternating with the portions or fingers of the second electrode.

6. The device according to claim 3, wherein the layer of piezoelectric material has a polarization axis which extends in a direction transverse to at least one from among:
the longitudinal direction,
the transverse direction,
a plane identified by a supporting body of the at least one sensor unit,
a plane identified by the layer of piezoelectric material.

7. The device according to claim 1, wherein the at least one piezoelectric transducer comprises a first piezoelectric transducer configured for generating a first electrical potential difference representing a first shear stress applied to the at least one floating body, and at least one second piezoelectric transducer configured for generating a second electrical potential difference representing a second shear stress applied to the at least one floating body.

8. The device according to claim 7, wherein the first piezoelectric transducer and the at least one second piezoelectric transducer are arranged in such a way that the first piezoelectric transducer is designed to detect a shear stress in a first direction and the at least one second piezoelectric transducer is suitable to detect a shear stress in a second direction, the first direction and the second direction being generally transverse or inclined with respect to one another.

9. The device according to claim 1, wherein the at least one piezoelectric transducer comprises at least one of a piezoelectric transducer configured for generating an electrical potential difference substantially proportional to a shear stress applied to the at least one floating body and a piezoelectric transducer configured for generating an electrical potential difference substantially proportional to a normal stress applied to the at least one floating body.

10. The device according claim 1, wherein the at least one piezoelectric transducer comprises a deposited layer of piezoelectric material and deposited electrodes of electrically conductive material at two opposite major faces of the deposited layer of piezoelectric material.

11. The device according to claim 1, wherein set between the detection surface and a corresponding surface of the at least one floating body is at least one intermediate element or layer capable to transmit mechanical stresses from the at least one floating body to the at least one sensor unit.

12. The device according to claim 1, wherein the housing body:
comprises at least one first body part and one second body part which are substantially annular, or a first body part and a second body part having a substantially U-shaped cross section, and/or
has a coupling arrangement which extends along at least part of a circumference, configured for coupling with the stationary ring of the bearing, such as at least one from among:
a plurality of at least partially elastically deformable tabs or teeth;
a coupling edge extending according to a circumference;
a coupling configured for quick coupling to and/or quick release from a ring of the bearing;
a coupling configured for fastening, respectively unfastening, via a force or thrust, respectively a traction, substantially in an axial direction with respect to the bearing;
a coupling comprising an edge or tabs having an at least partly curved or inclined profile;
a coupling comprising an elastically flexible portion that extends in the proximity of at least one wall of the supporting body.

13. The device according to claim 1, wherein the sensor means further comprise a sensor element on the housing body, prearranged for detecting an angular movement or a movement of rotation of a rotary ring of the bearing or of an element that is associated to a rotary ring of the bearing and turns therewith.

14. The device according to claim 1, wherein the housing body defines one or more surface elements, such as relieves and/or recesses, to facilitate gripping of the housing body for the purposes of separation thereof from the bearing.

15. A sensorized bearing, which comprises a stationary ring, a rotary ring, and rolling elements between the stationary ring and the rotary ring, to the stationary ring there being fixed the detection device according to claim 1.

16. A method for obtaining the detection device according to claim 1, comprising the steps of:
i) providing a housing body;

ii) providing at least one floating body and at least one sensor unit having a detection surface, by setting on the at least one sensor unit at least one piezoelectric transducer with at least one first electrode at least in part at a first major face of a layer of piezoelectric material, and with at least one second electrode at least in part at a second major face of the layer of piezoelectric material;
iii) performing a polarization of the layer of piezoelectric material;
iv) setting the at least one floating body and the at least one sensor unit on the housing body, with a surface of the former set up against the detection surface of the latter.

17. The method according to claim 16, wherein:
step i) comprises the operation of obtaining two body parts that can be secured to one another; and/or
step ii) is carried out via successive deposition of different material layers; and/or
step iv) comprises the operations of setting the at least one sensor unit and the at least one floating body within a housing defined by a first part of the housing body and subsequently closing the housing via a second part of the housing body.

18. A method for detecting vibrations in a bearing, comprising the steps of:
i) providing the detection device according to claim 1;
ii) securing the detection device with respect to a stationary ring of the bearing;
iii) generating, via the at least one piezoelectric transducer, an electrical potential difference that is substantially proportional to at least one of a shear stress and a normal stress applied to the at least one floating body.

19. The device according to claim 1, wherein at least one from among:
the housing body,
the at least one floating body,
the at least one sensor unit,
has a substantially annular shape.

20. A bearing detection device, comprising:
a housing body, prearranged for being fixed to a stationary ring of a bearing, and
a detection arrangement associated to the housing body, comprising at least one floating body and sensor means;
wherein the at least one floating body is mounted within the housing body and is able to transmit mechanically vibrations generated by the bearing;
wherein the sensor means include at least:
a piezoelectric transducer, which is able to generate an electrical potential difference when at least one corresponding detection surface is stressed by the at least one floating body, and
a sensor element for sensing an angular movement or a movement of rotation, configured for detecting movement or angular position of a rotary ring of the bearing or of an element mobile therewith.

\* \* \* \* \*